US012728401B2

(12) United States Patent
Kim et al.

(10) Patent No.: US 12,728,401 B2
(45) Date of Patent: Sep. 8, 2026

(54) LAYERED FERRIC RUST AND IRON HYDROXIDE NANOPARTICLES INCLUDING THE SAME

(71) Applicant: Korea University Research and Business Foundation, Seoul (KR)

(72) Inventors: Young Keun Kim, Seoul (KR); Bum Chul Park, Seoul (KR); Dae Bum Lee, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 633 days.

(21) Appl. No.: 18/133,184

(22) Filed: Apr. 11, 2023

(65) Prior Publication Data

US 2023/0347315 A1 Nov. 2, 2023

(30) Foreign Application Priority Data

Apr. 29, 2022 (KR) ........................ 10-2022-0053803

(51) Int. Cl.

*B01J 20/22* (2006.01)
*B01J 20/28* (2006.01)
*B09C 1/08* (2006.01)

(52) U.S. Cl.

CPC ....... *B01J 20/223* (2013.01); *B01J 20/28007* (2013.01); *B09C 1/08* (2013.01); *B01J 2220/46* (2013.01)

(58) Field of Classification Search

CPC ................ B01J 20/223; B01J 20/28007; B01J 2220/46; B01J 20/0229; B01J 20/06; B01J 20/3085; B09C 1/08; C01P 2002/20; C01P 2002/72; C01P 2002/76; C01P 2002/77; C01P 2002/78; C01P 2004/04; C01P 2004/24; C01G 49/02; C09C 1/22

See application file for complete search history.

(56) References Cited

FOREIGN PATENT DOCUMENTS

| | | | |
|---|---|---|---|
| CN | 103464065 | A | 12/2013 |
| JP | 2015-78137 | A | 4/2015 |
| JP | 2022-80364 | A | 5/2022 |
| KR | 10-1501113 | B1 | 3/2015 |
| KR | 10-1771005 | B1 | 8/2017 |

OTHER PUBLICATIONS

Usman, M., "Magnetite and Green Rust: Synthesis, Properties, and Environmental Applications of Mixed-Valent Iron Minerals", Chemical Reviews, Issue 118, pp. 3251-3304 (Year: 2018).*

(Continued)

*Primary Examiner* — Anthony J Zimmer
*Assistant Examiner* — Jaanzeb C Raja
(74) *Attorney, Agent, or Firm* — NSIP Law

(57) ABSTRACT

Disclosed are layered ferric rust and iron hydroxide nanoparticles including the same, wherein the layered ferric rust has a novel crystal structure that satisfies conditions (a) to (c) below:

(a) a crystal system belongs to a monoclinic system;
(b) a space group belongs to Pn (No. 7); and
(c) unit cell parameters are a=3.854±0.002 Å, b=11.491±0.007 Å, c=9.818±0.004 Å, and β=88.47±0.005° (b is the distance between layers in the axial direction).

12 Claims, 35 Drawing Sheets

(56) References Cited

OTHER PUBLICATIONS

Japanese Office Action issued on Apr. 2, 2024, in counterpart Japanese Patent Application No. 2023-071586 (4 pages in English, 4 pages in Japanese).
Huang, Li-Zhi, et al. "Oxidation of Dodecanoate Intercalated Iron (II)-Iron (III) Layered Double Hydroxide to Form 2D Iron (III) (Hydr)-oxide Layers." European Journal of Inorganic Chemistry 2013.33 (2013): 5718-5727.
Partial European search report issued on Jan. 26, 2024, in counterpart European Patent Application No. 23169845.7 (10 pages).

* cited by examiner

[FIG. 1A]
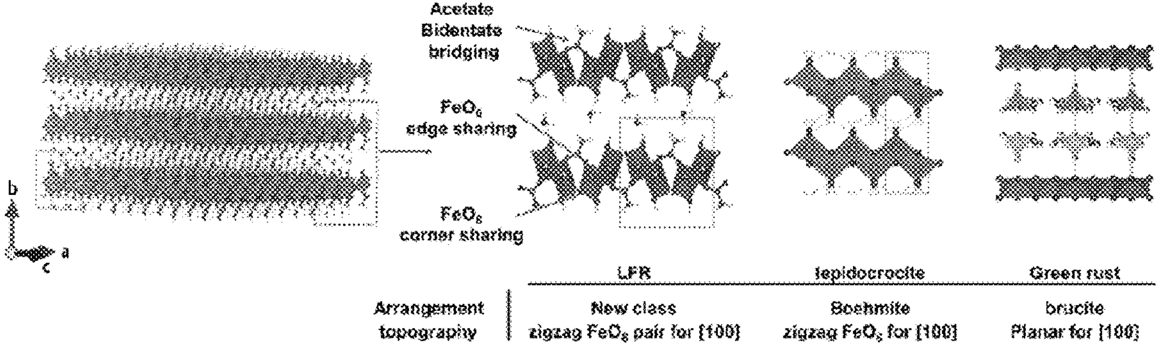
[FIG. 1B]
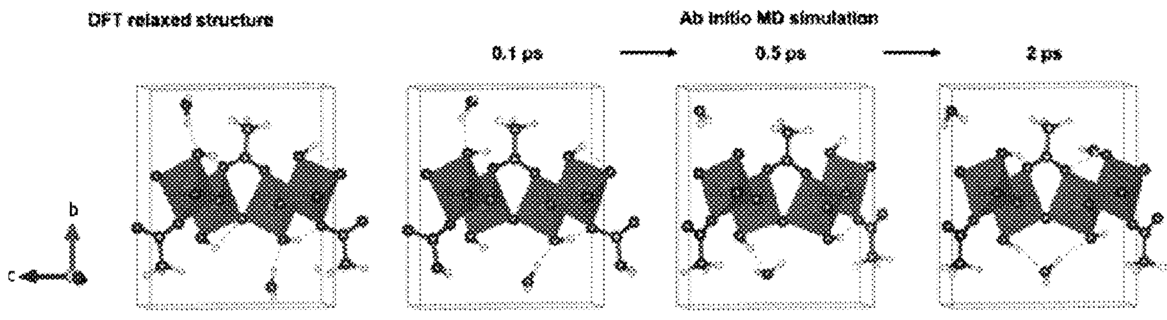
[FIG. 2]
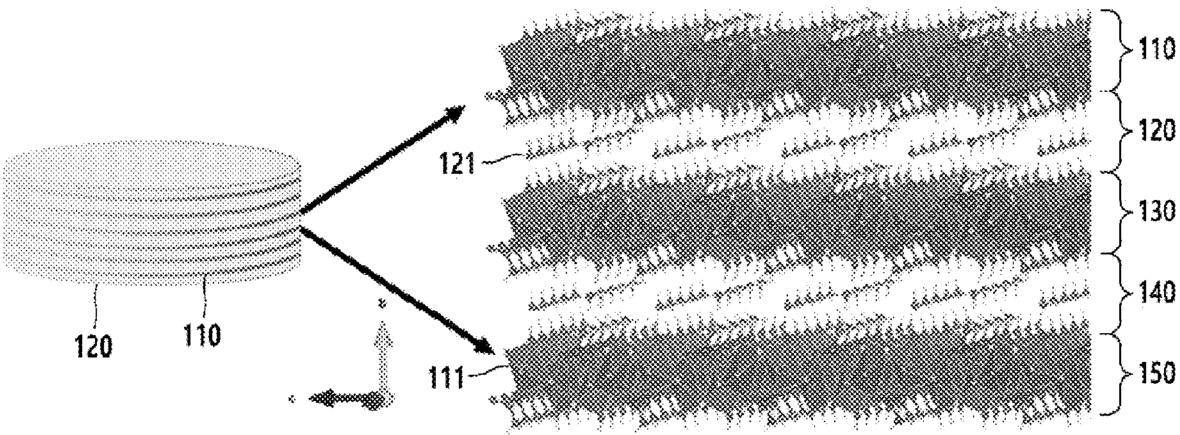

[FIG. 3]
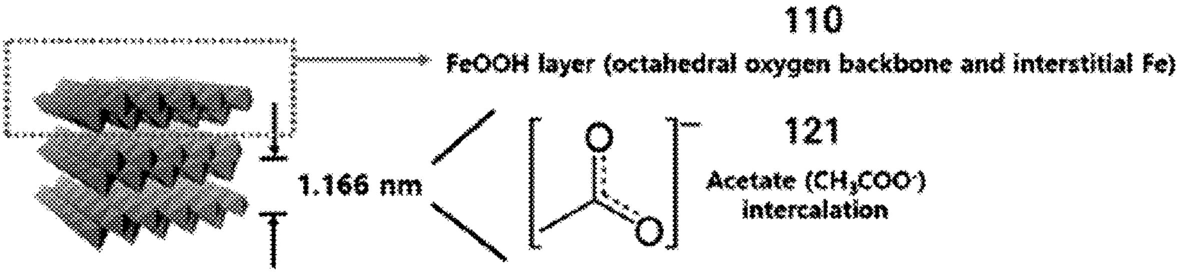
[FIG. 4]
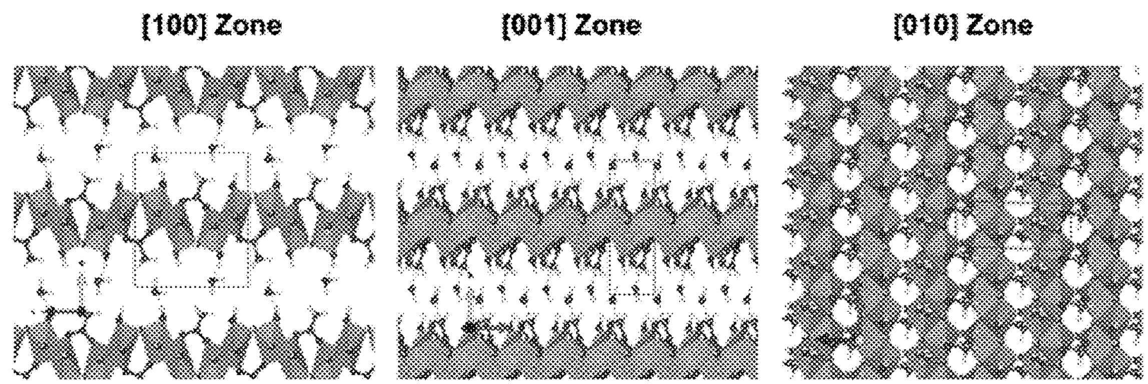
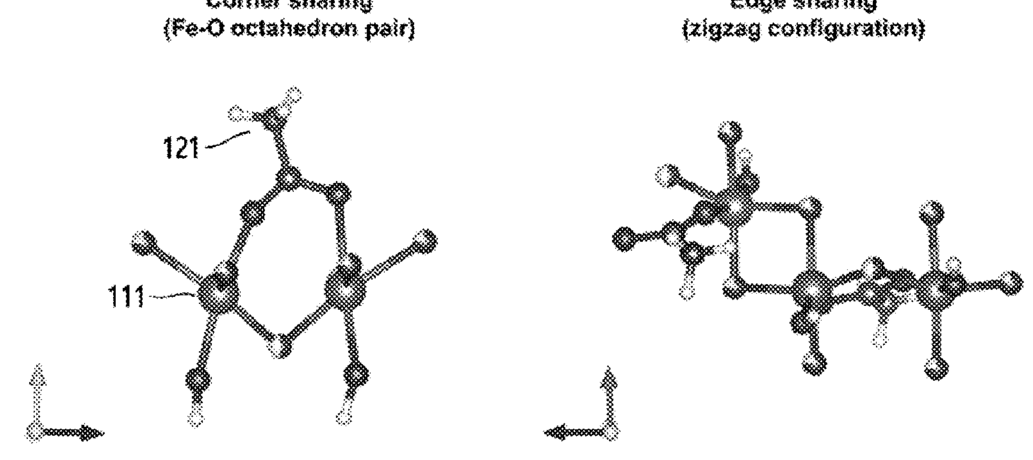

[FIG. 5]
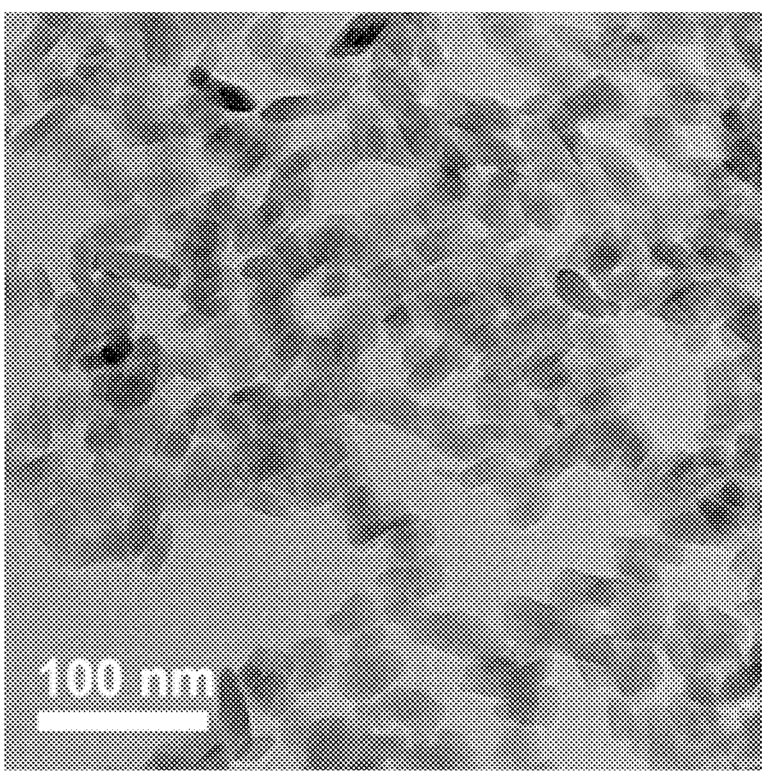
[FIG. 6]
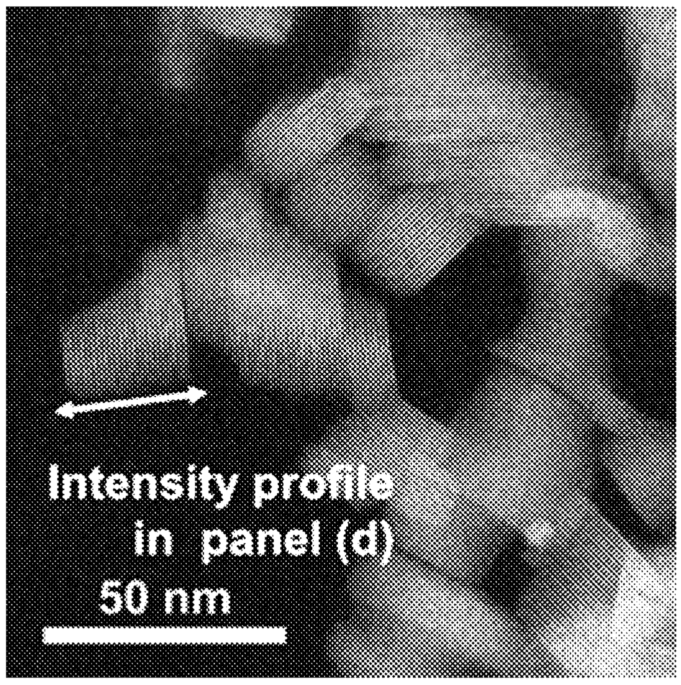

[FIG. 7]
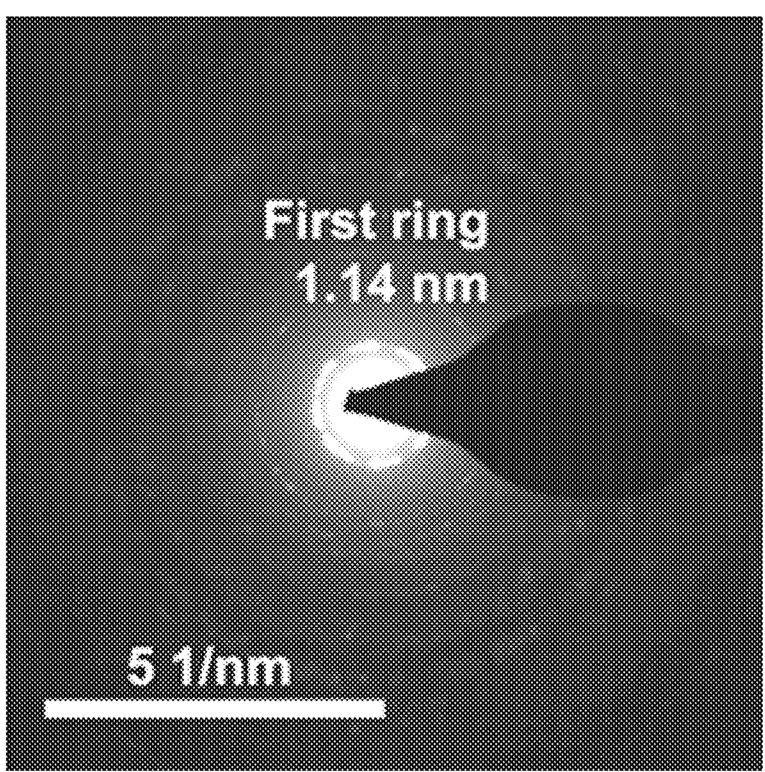
[FIG. 8]
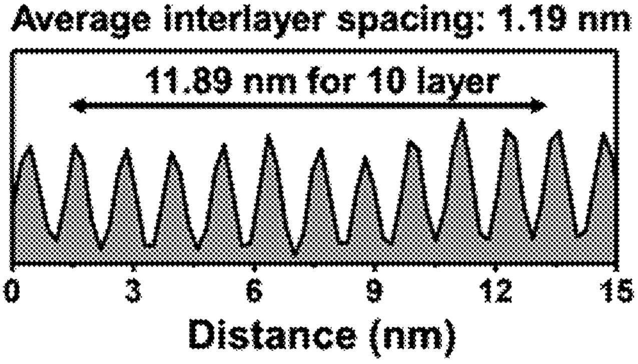

[FIG. 9]
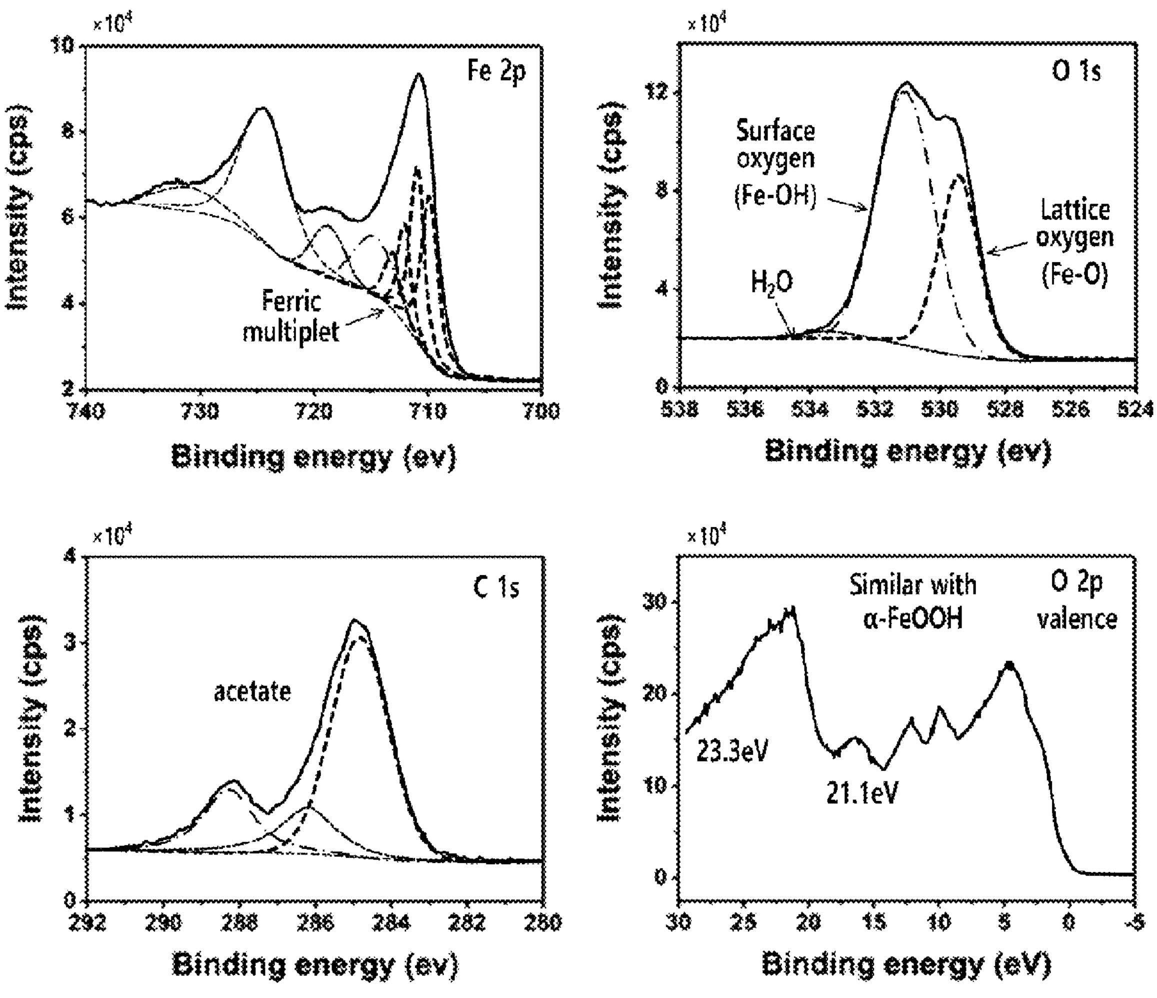

[FIG. 10]
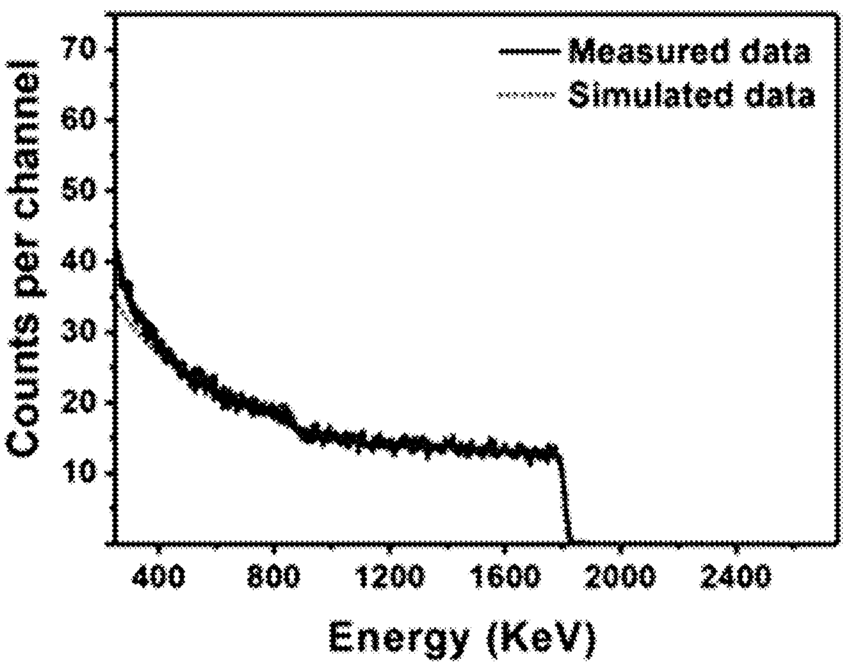
[FIG. 11]
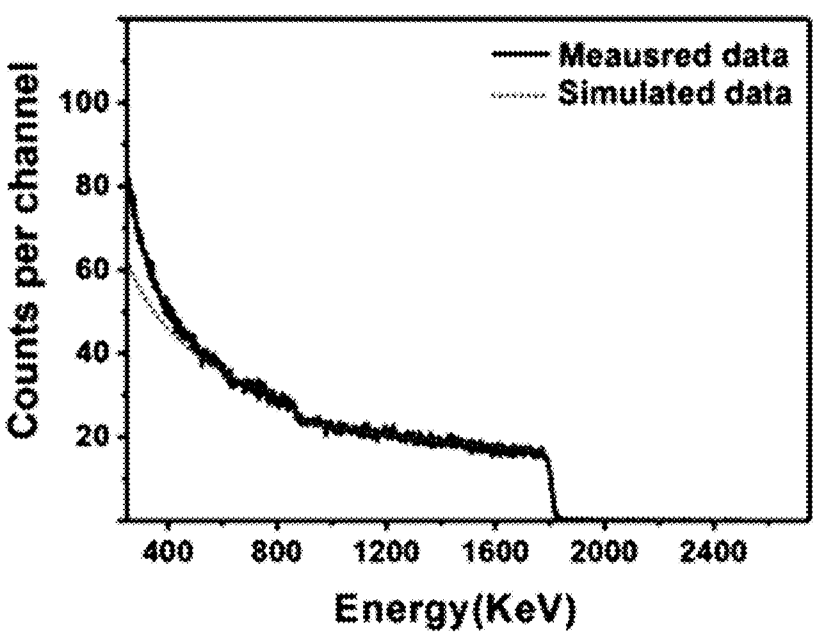

[FIG. 12]
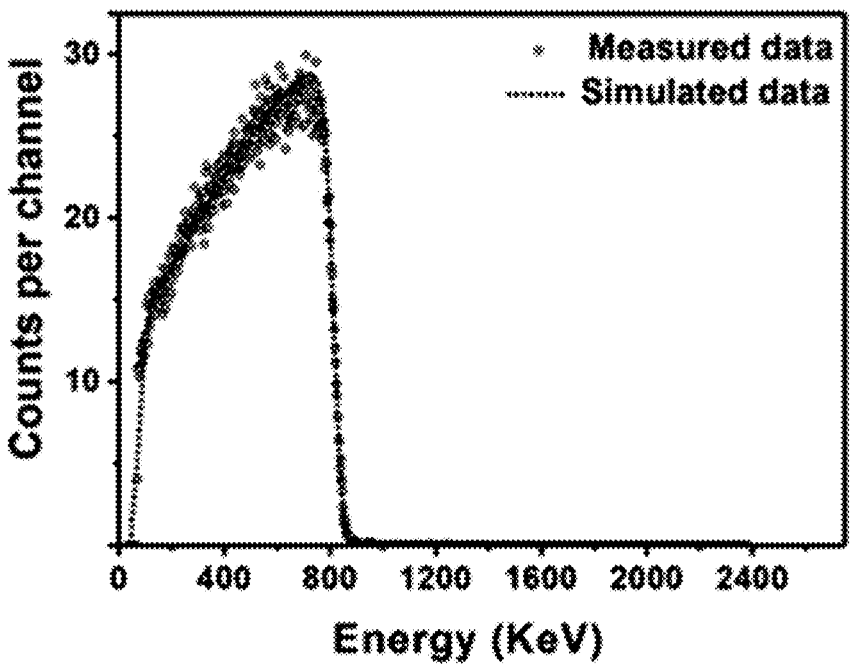
[FIG. 13]
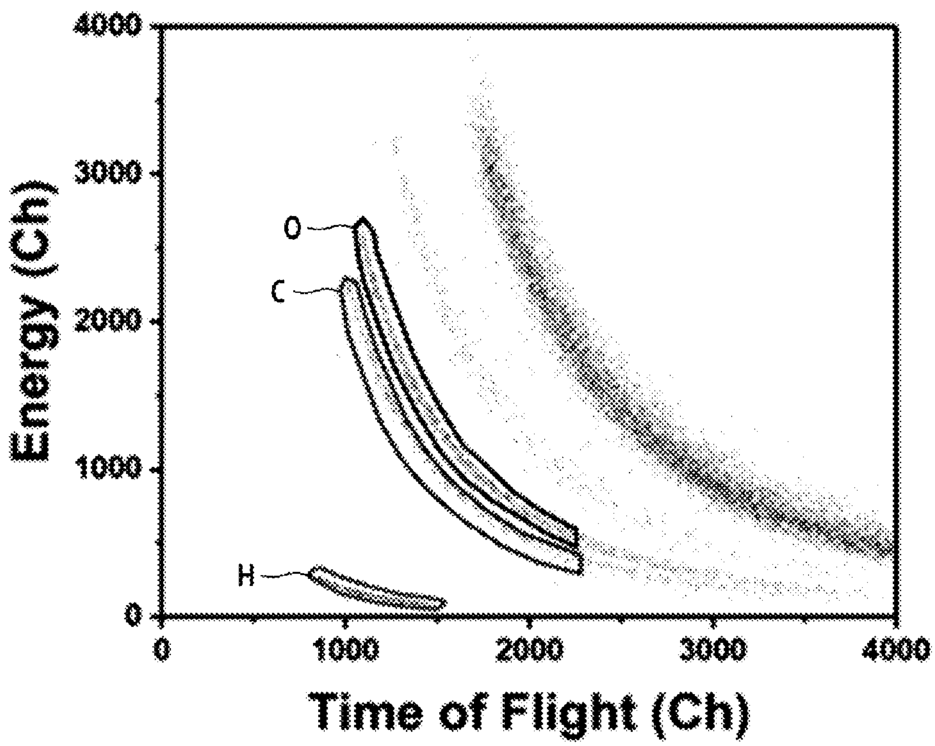

[FIG. 14]
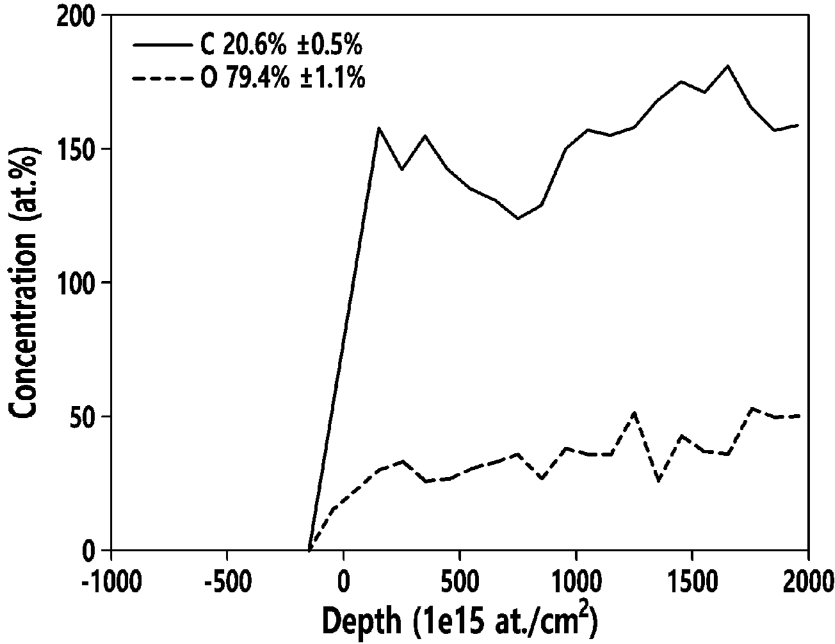
[FIG. 15]
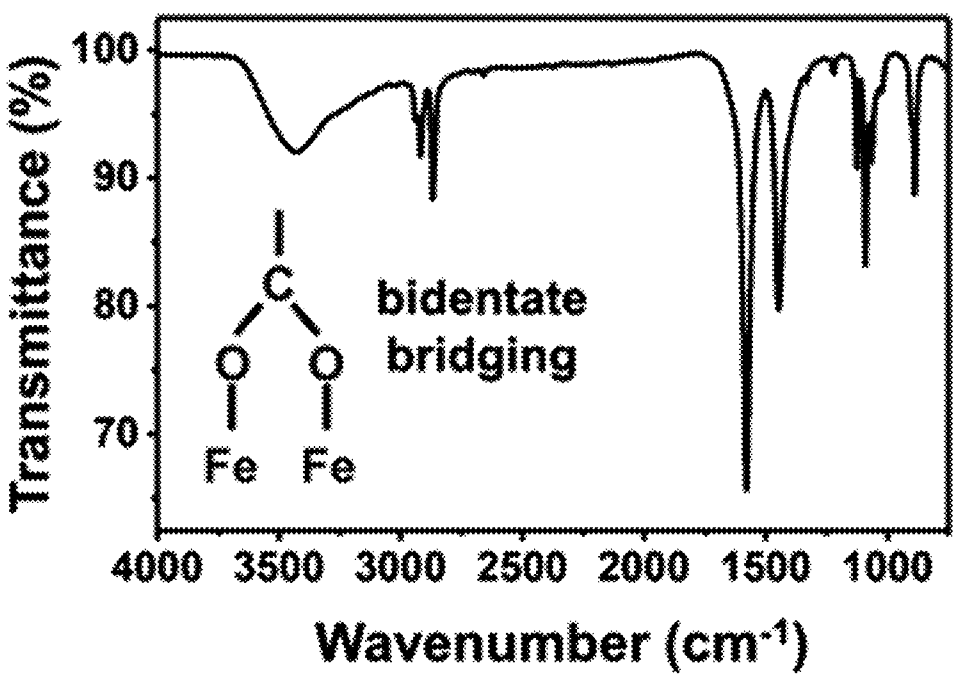

[FIG. 16]
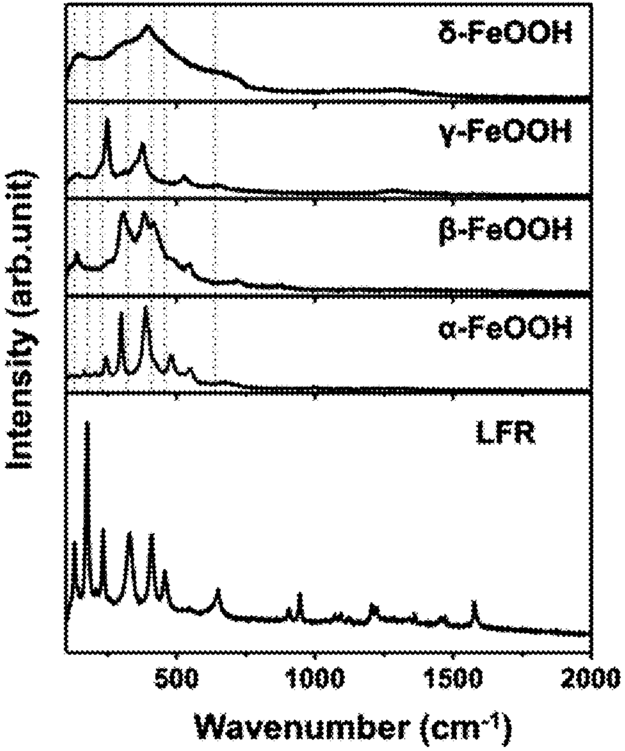
[FIG. 17]
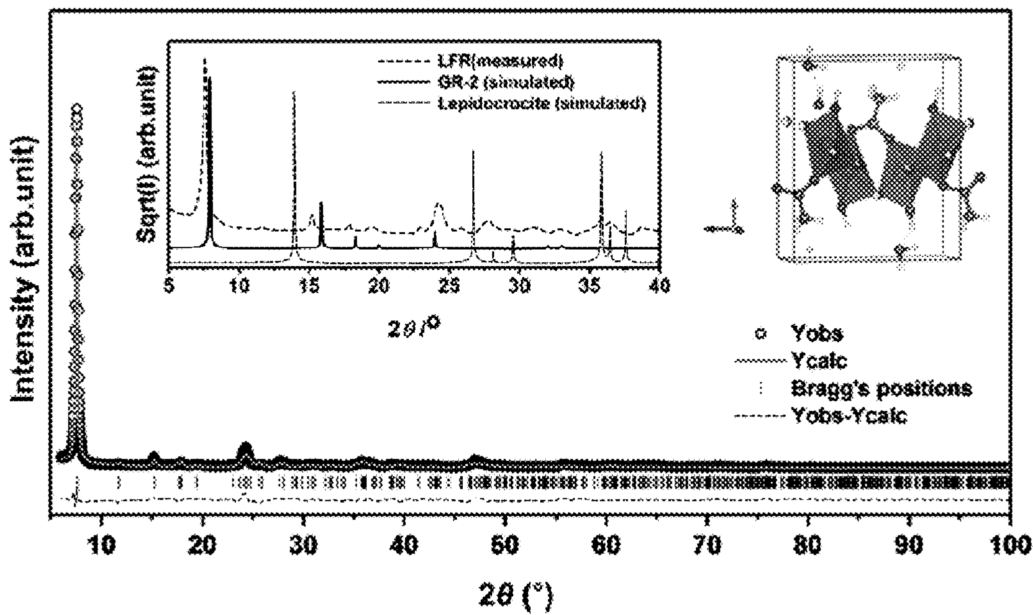

[FIG. 18]
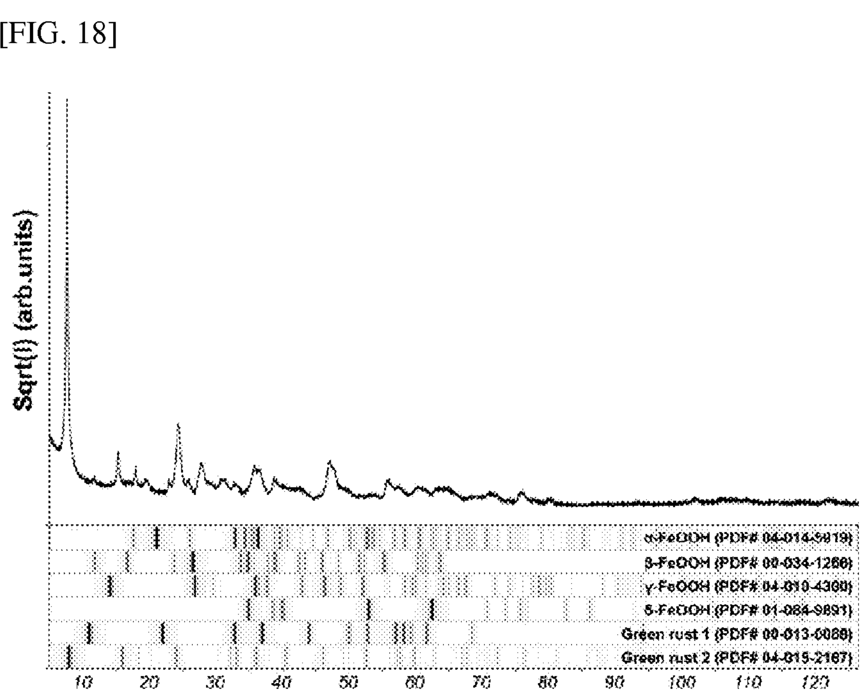
[FIG. 19A]
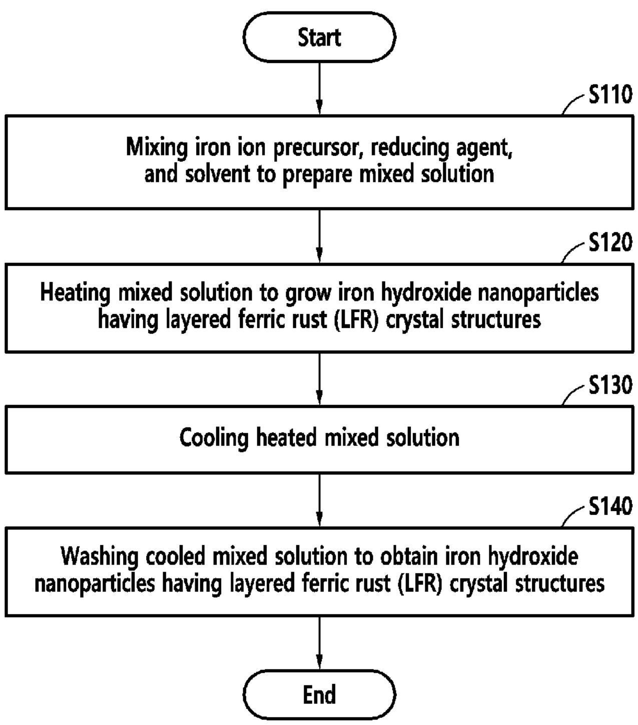

[FIG. 19B]
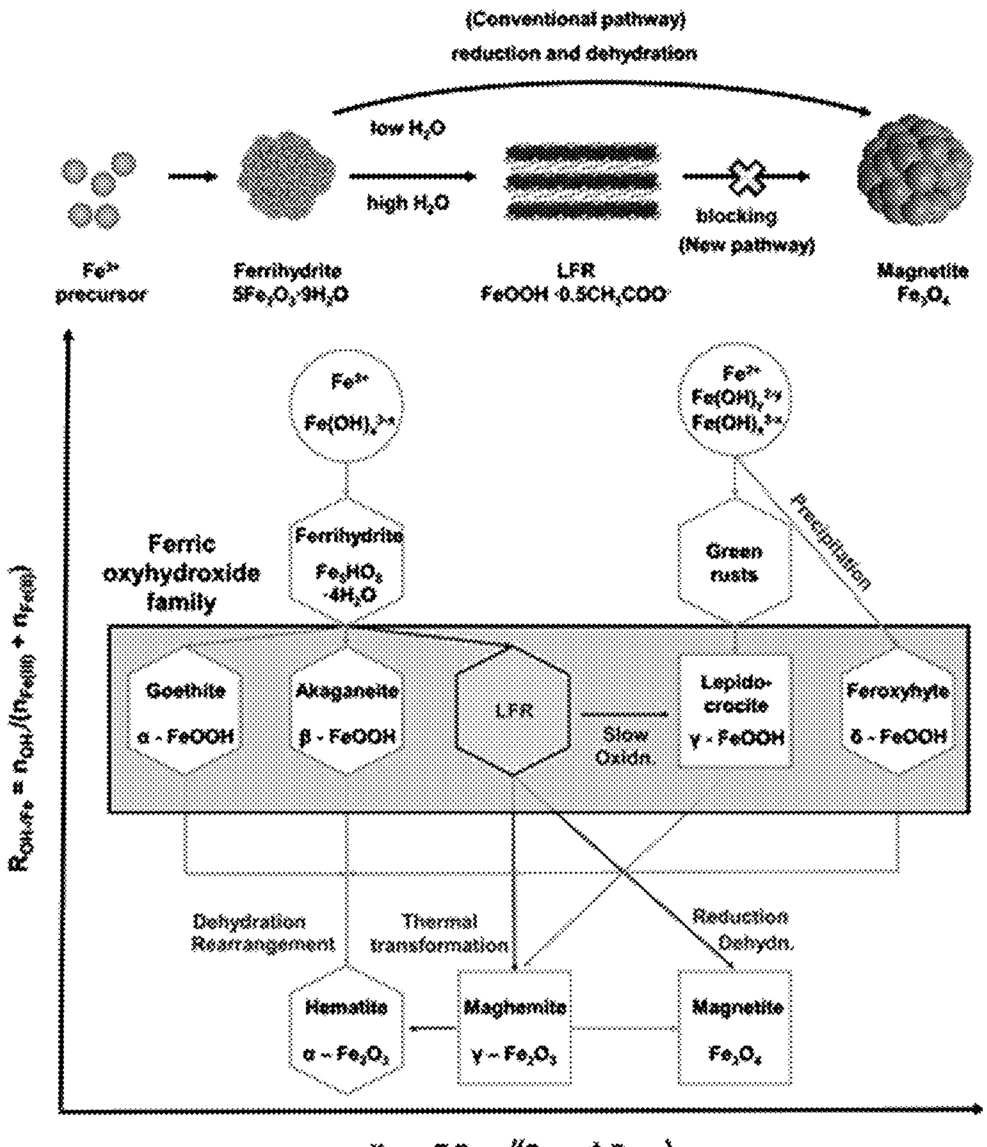

[FIG. 20]
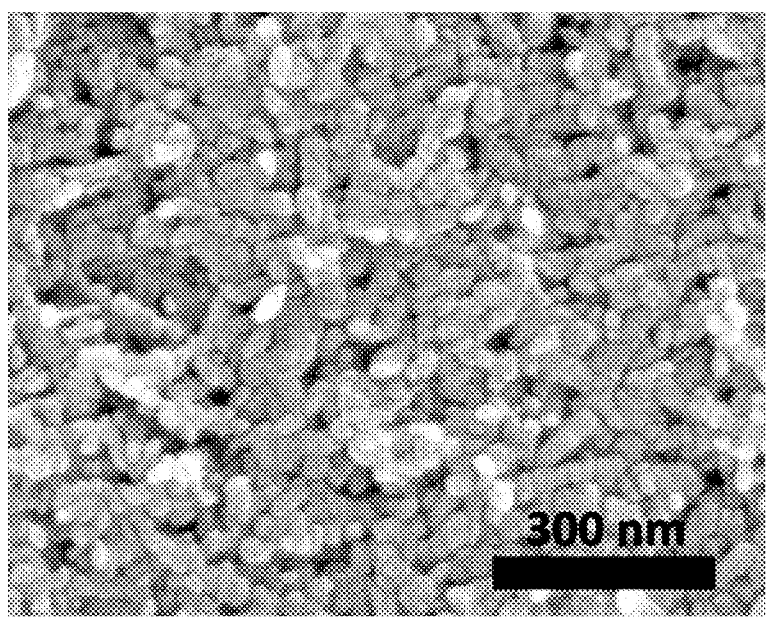
[FIG. 21]
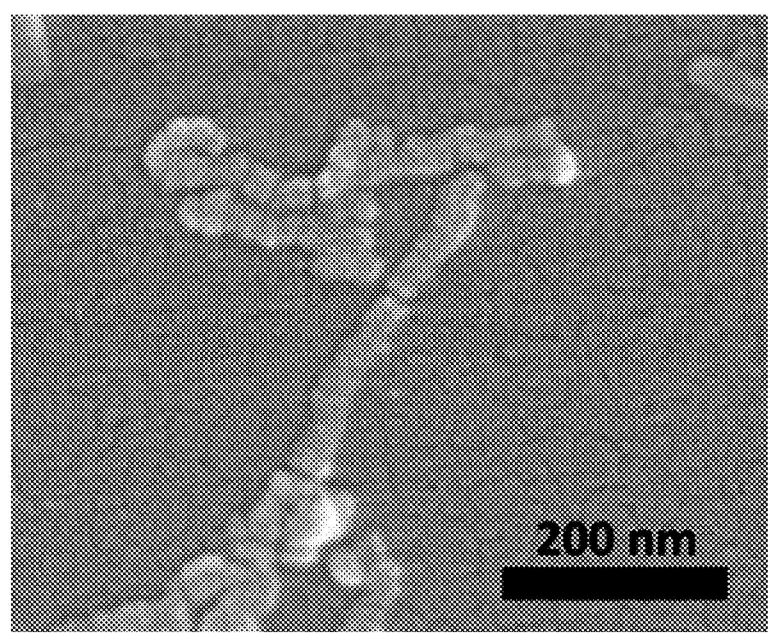

[FIG. 22]
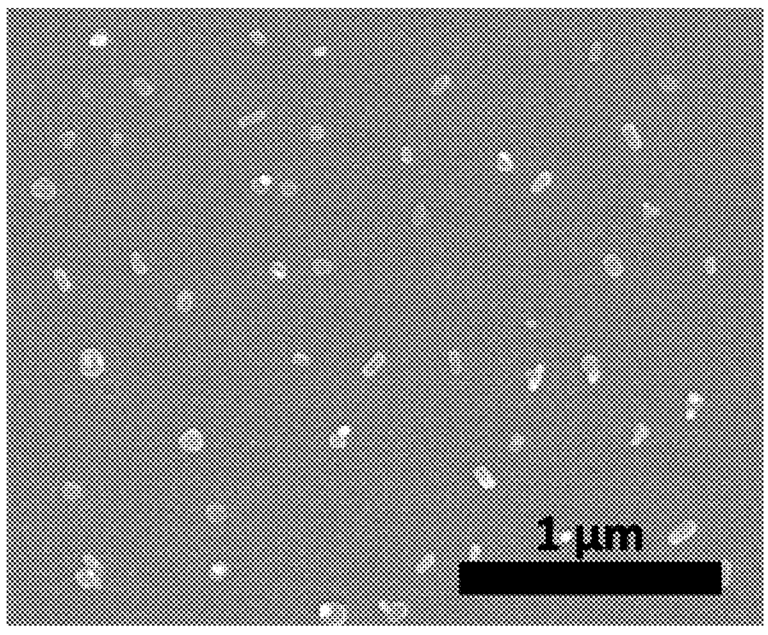
[FIG. 23]
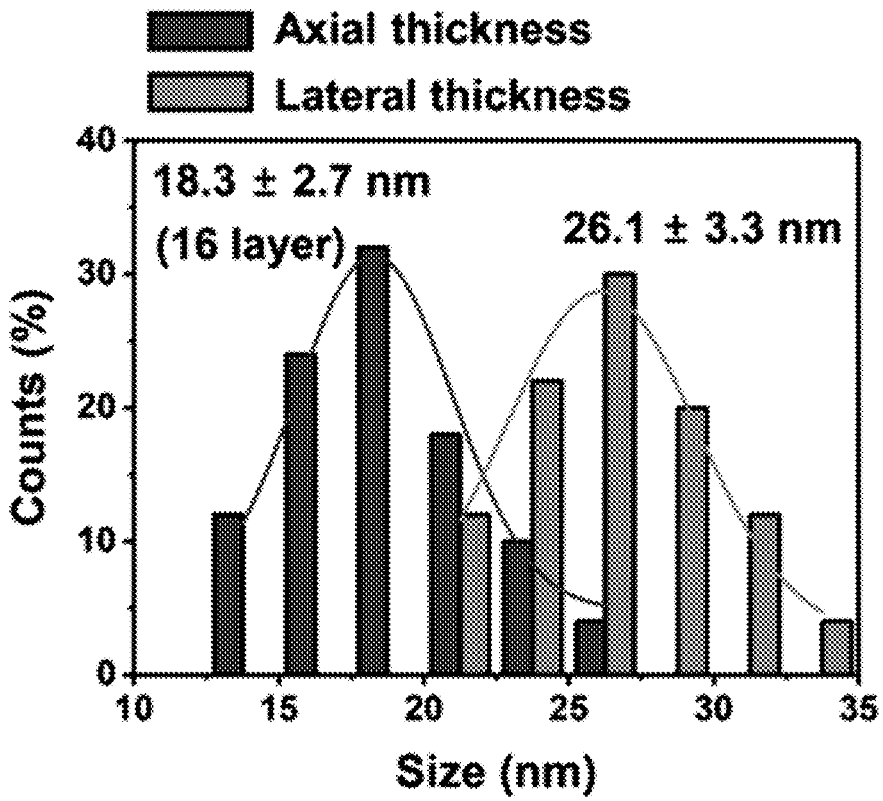

[FIG. 24]
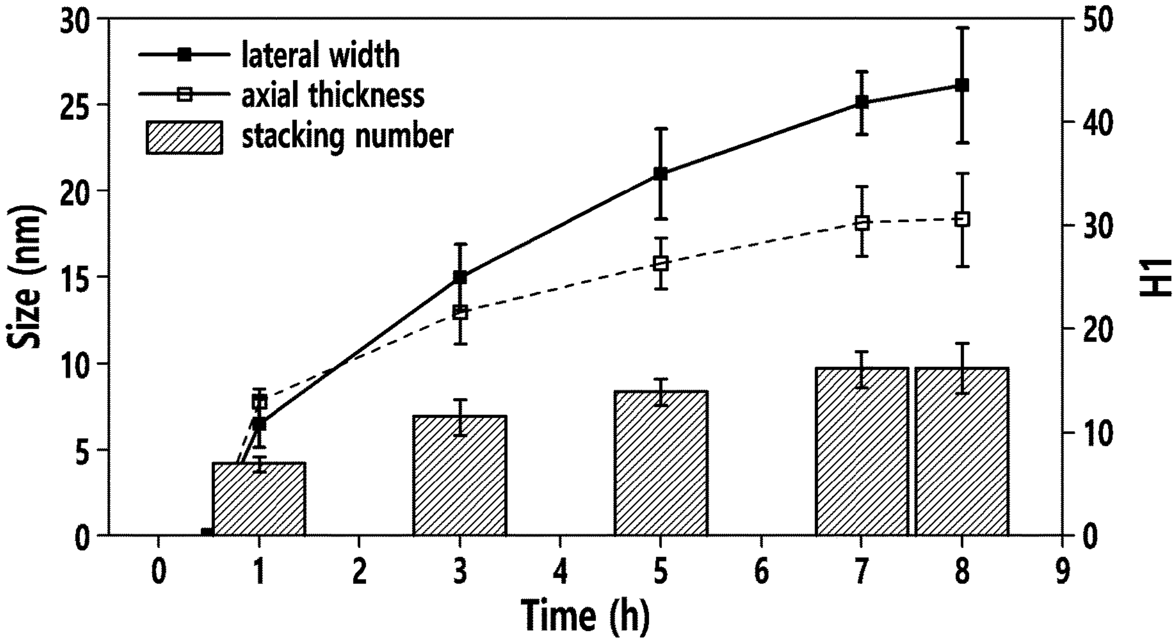
[FIG. 25]
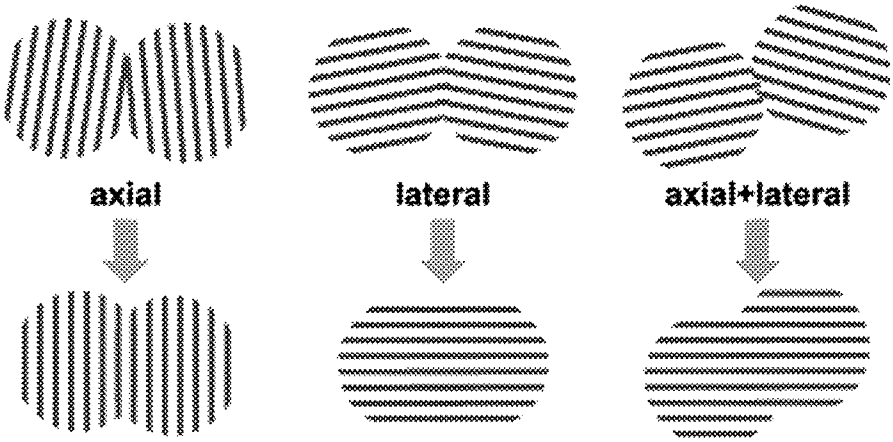

[FIG. 26]
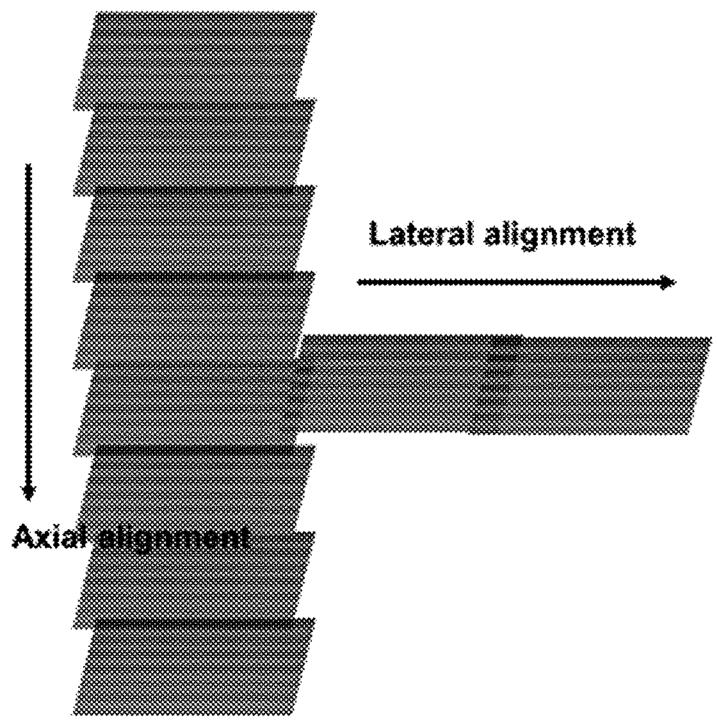
[FIG. 27]
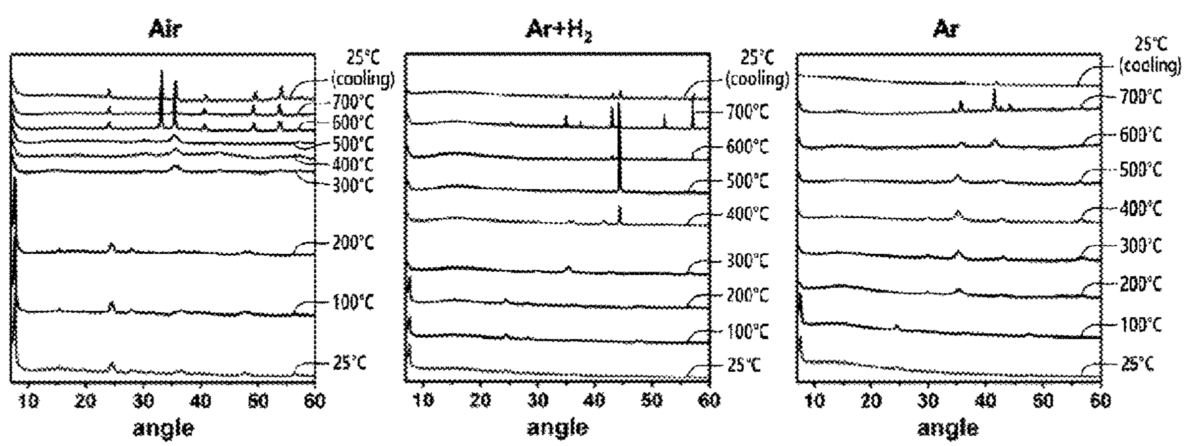

[FIG. 28]
Temperature →
| Atmosphere | 25 °C | 100 °C | 200 °C | 300 °C | 400 °C | 500 °C | 600 °C | 700 °C | 25 °C (cooling) |
|---|---|---|---|---|---|---|---|---|---|
| Air | LFR | | | $\gamma$-$Fe_2O_3$ | | | $\alpha$-$Fe_2O_3$ | | |
| Ar+$H_2$ | LFR | | | $Fe_3O_4$ | FeO+ Fe | Fe | | | |
| Ar | LFR | | $Fe_3O_4$ | | | | FeO | FeO + Fe | |
[FIG. 29]
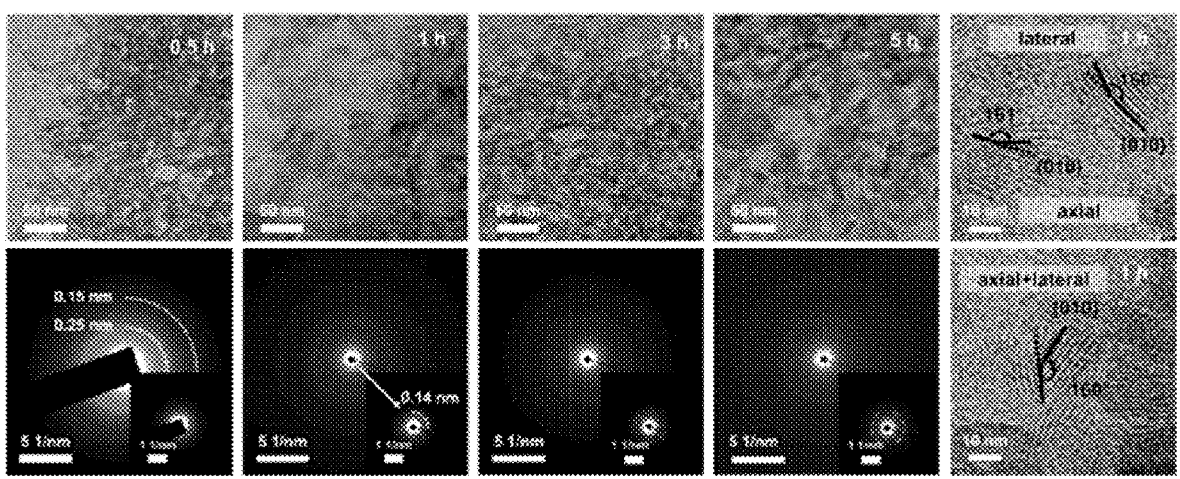

[FIG. 30]
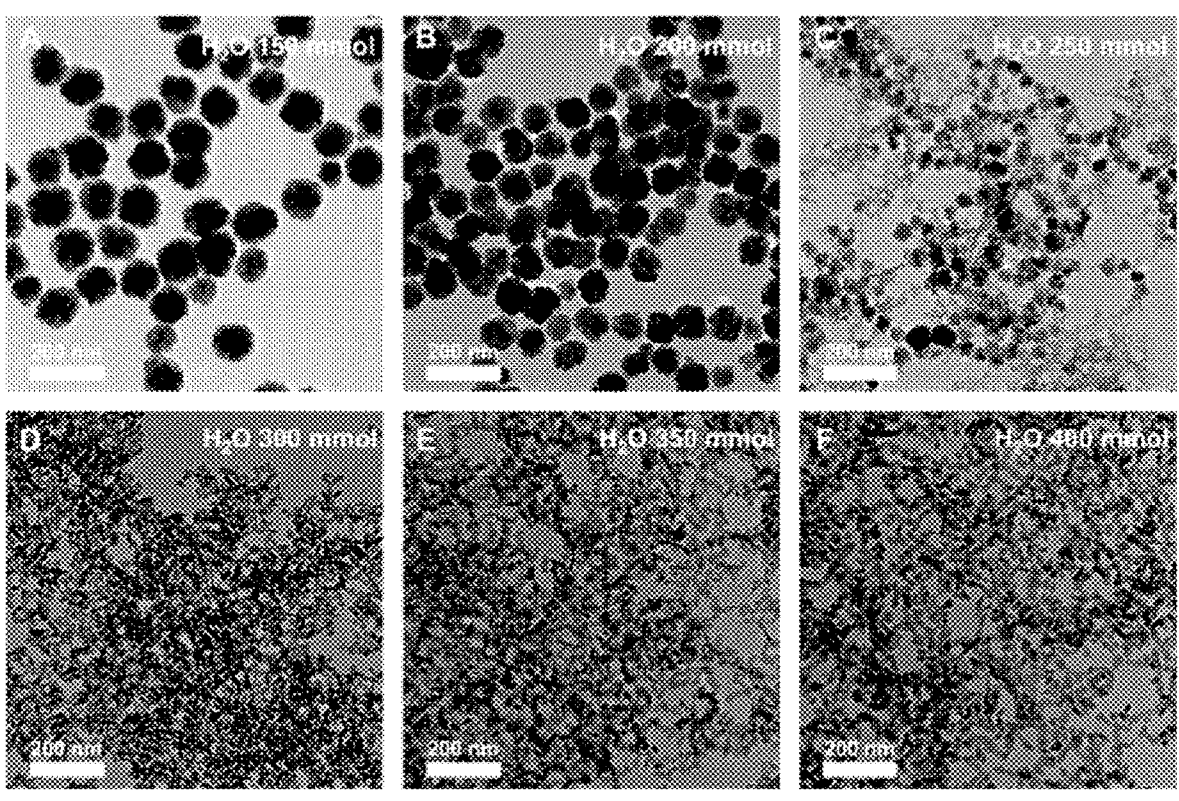
[FIG. 31]
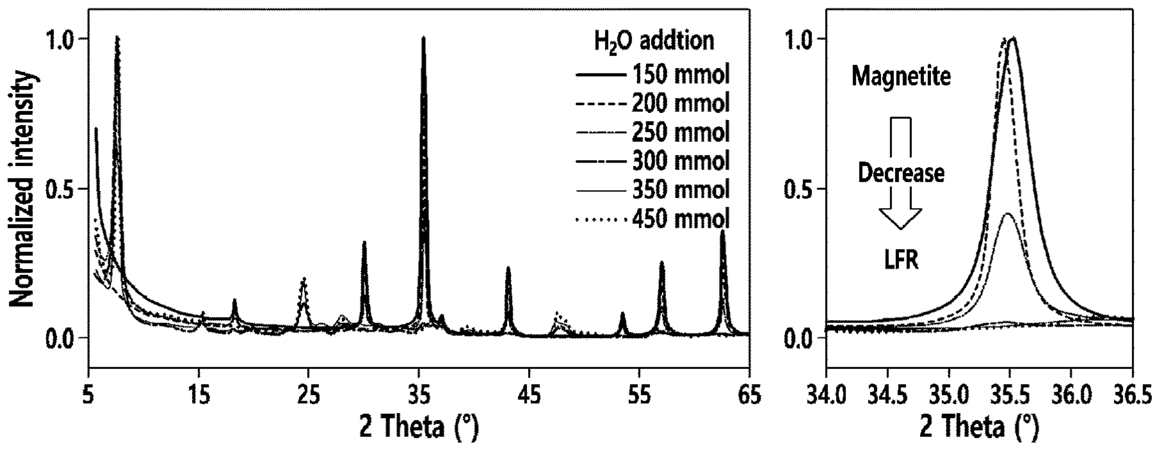

[FIG. 32]
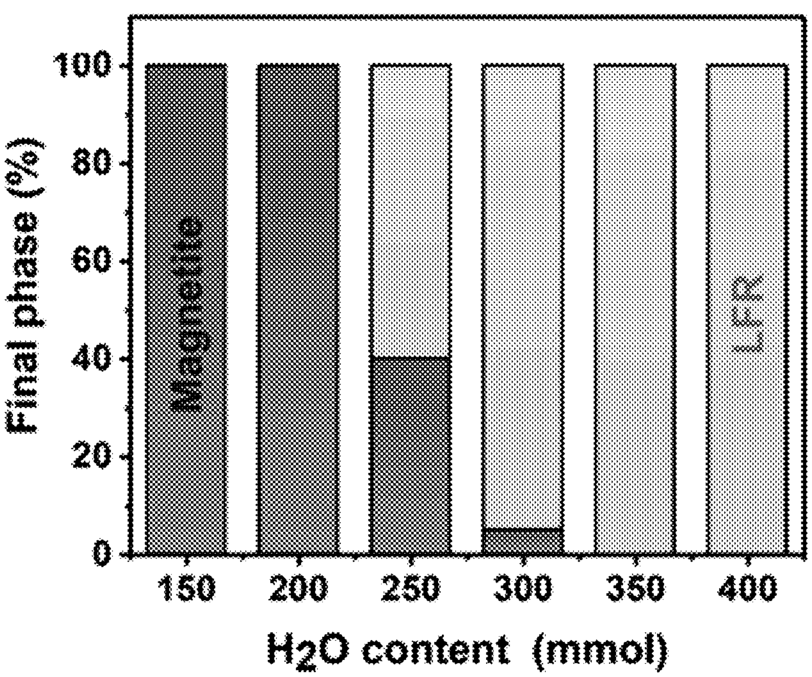
[FIG. 33]
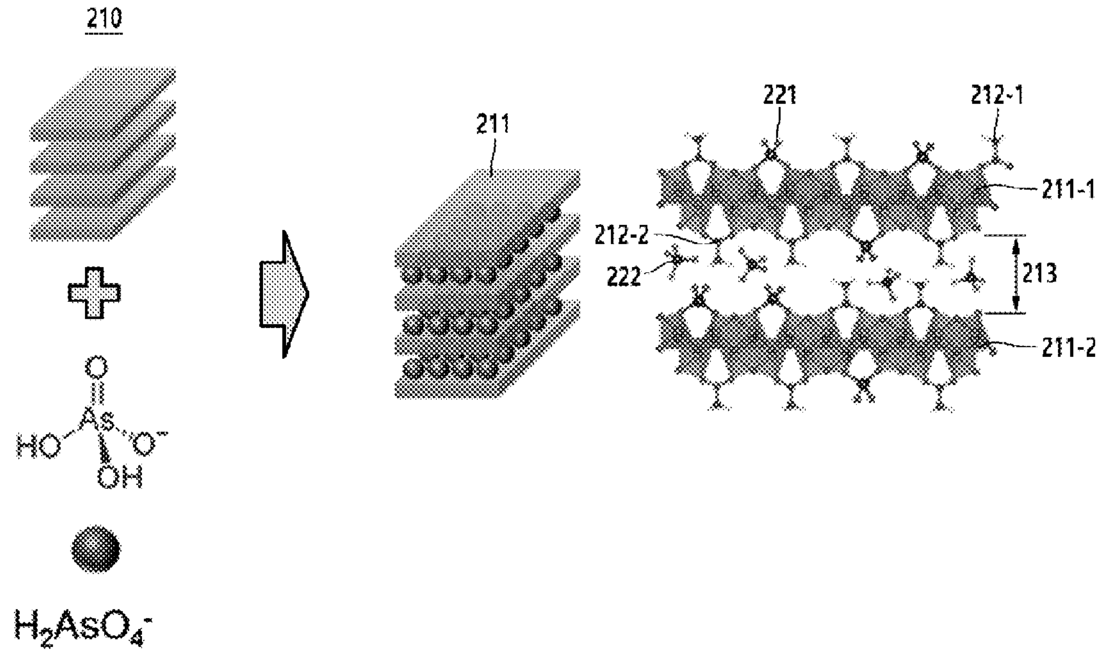

[FIG. 34]
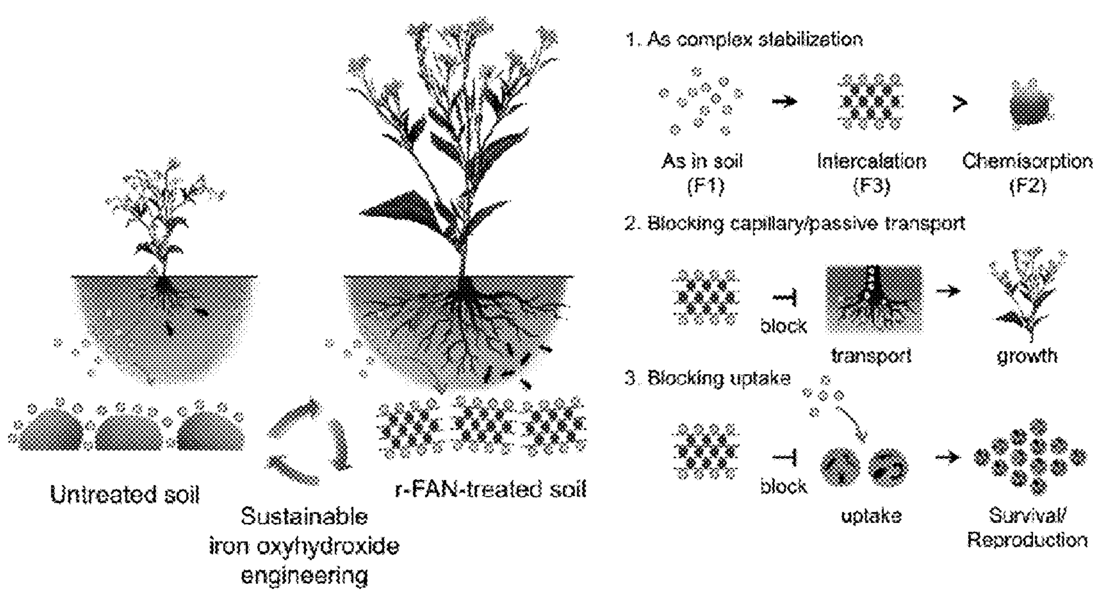
[FIG. 35]
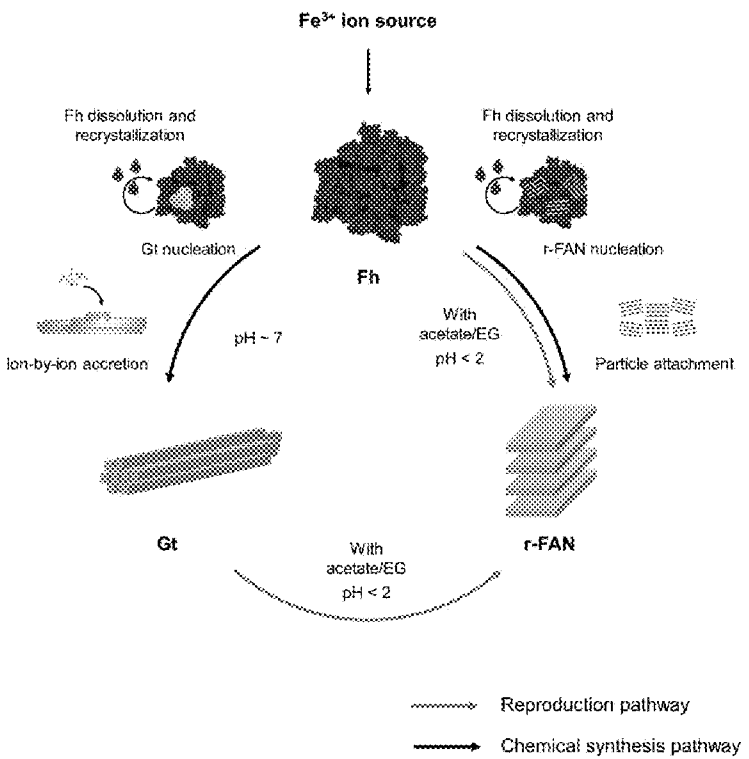

[FIG. 36]
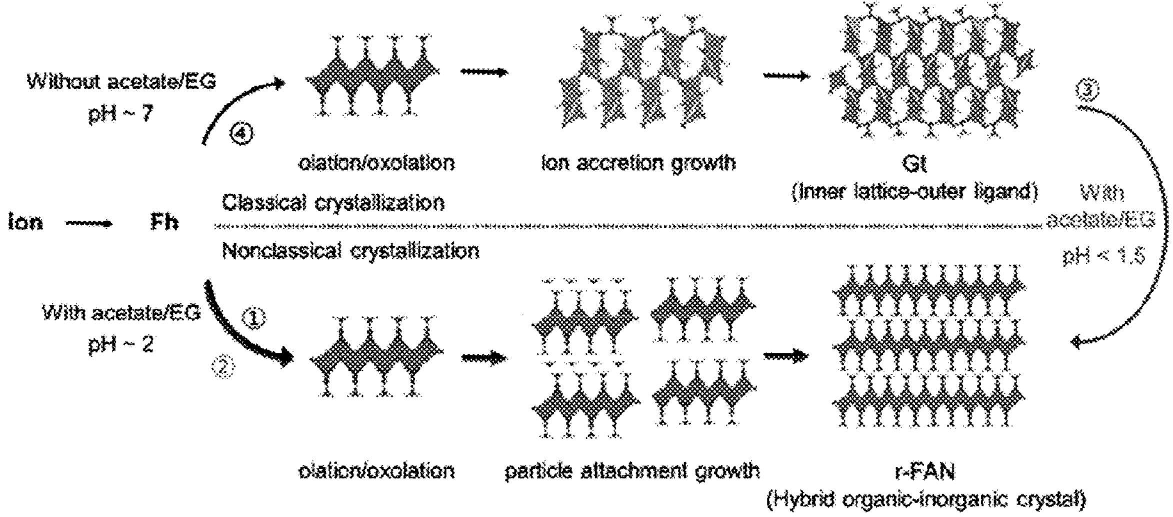
[FIG. 37]
(Canceled)

[FIG. 38]
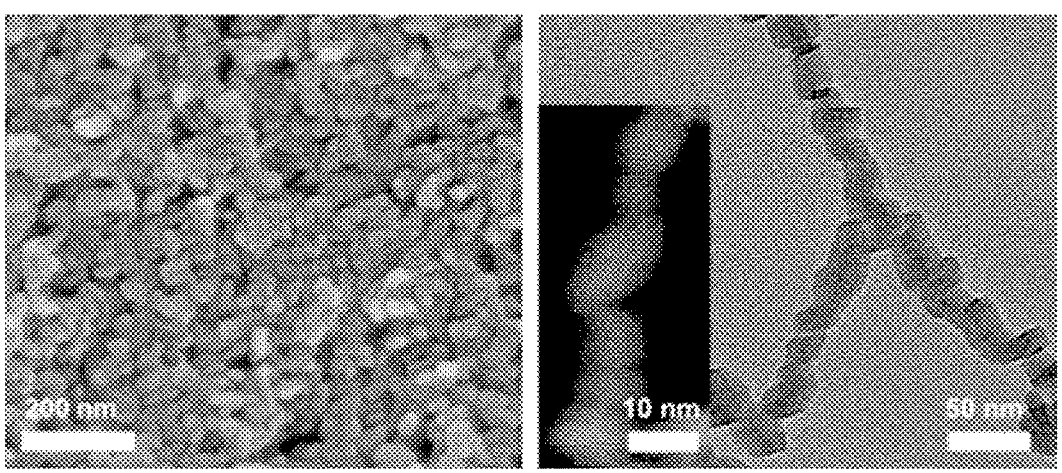
[FIG. 39]
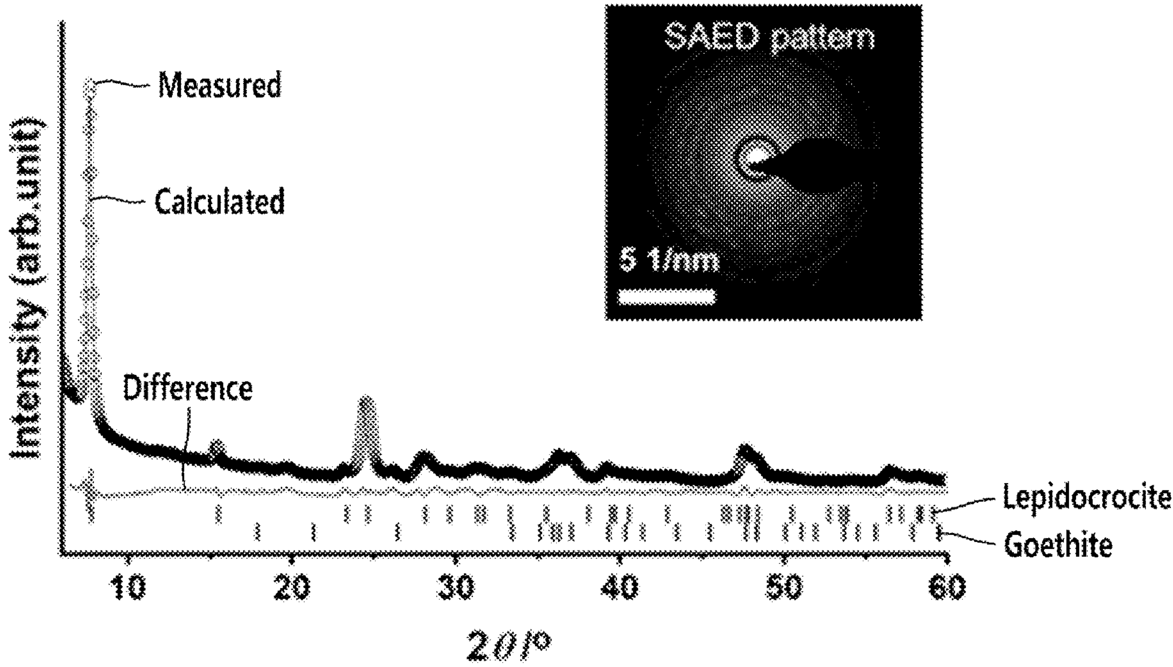

[FIG. 40]
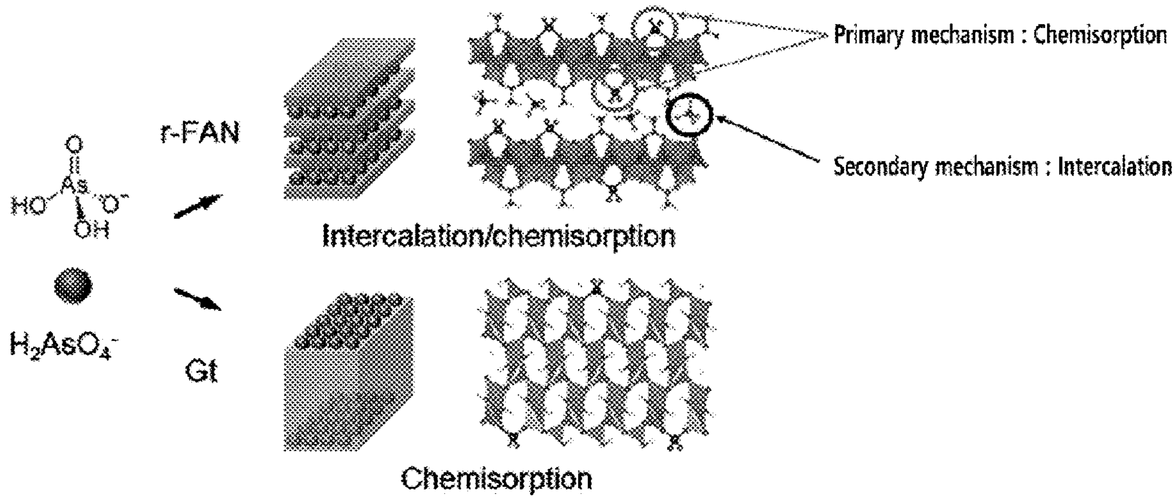
[FIG. 41]
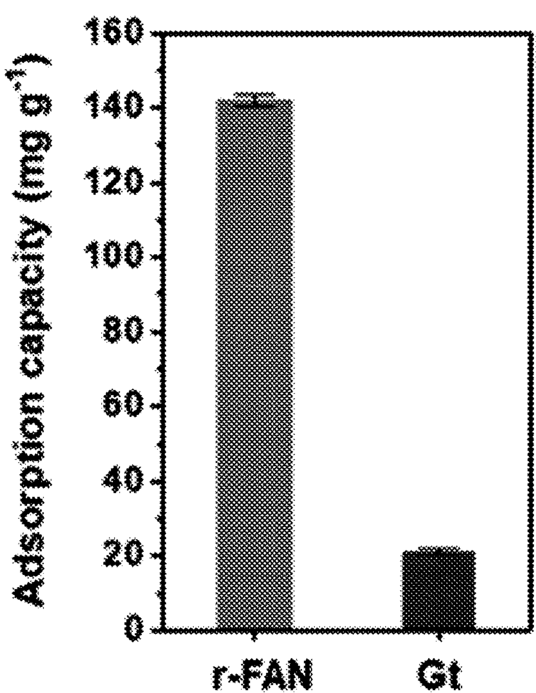

[FIG. 42]
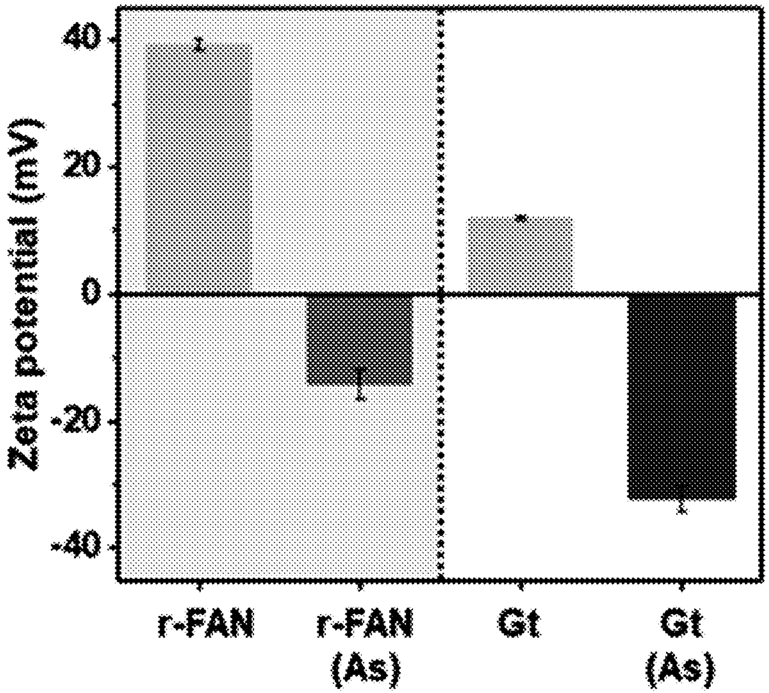
[FIG. 43]
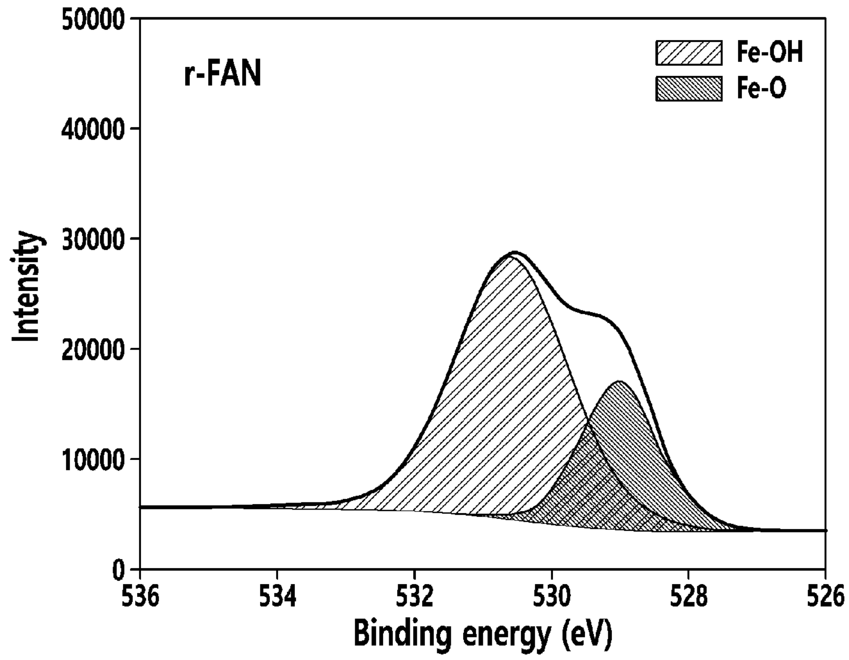

[FIG. 44]
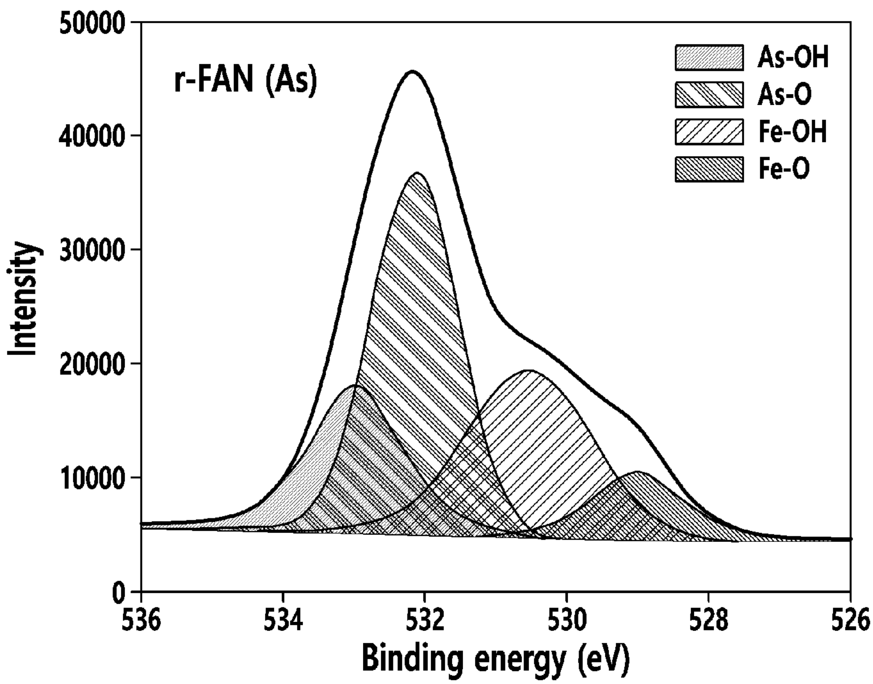
[FIG. 45]
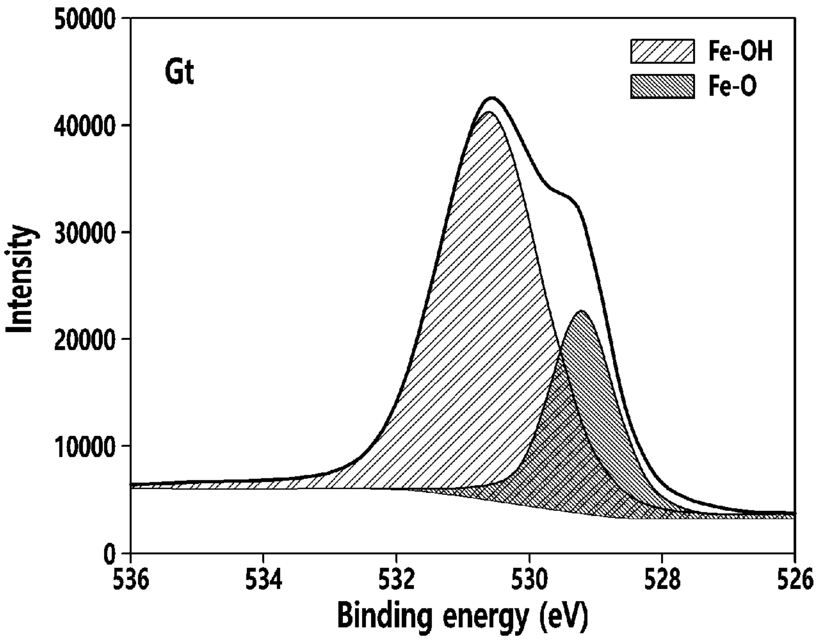

[FIG. 46]
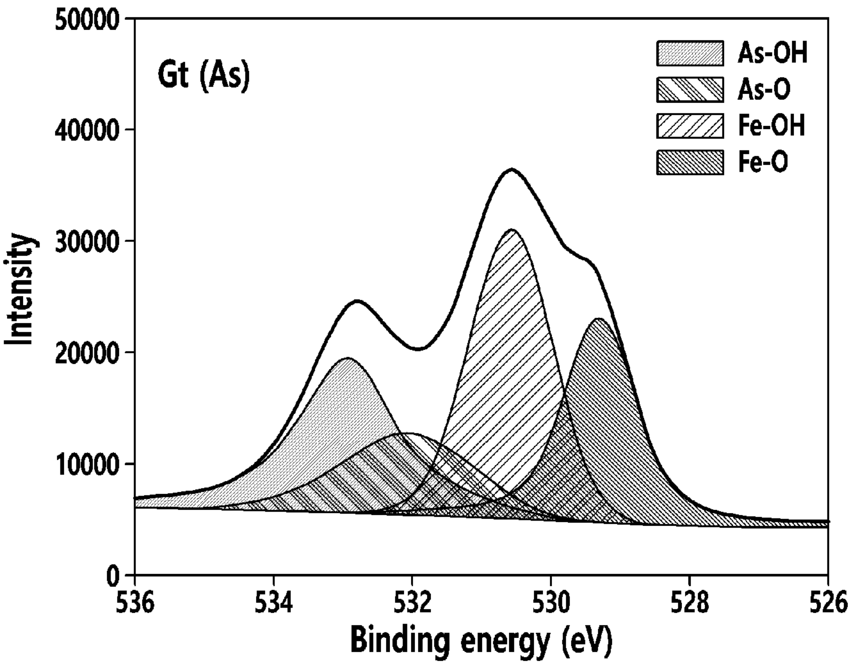
[FIG. 47]
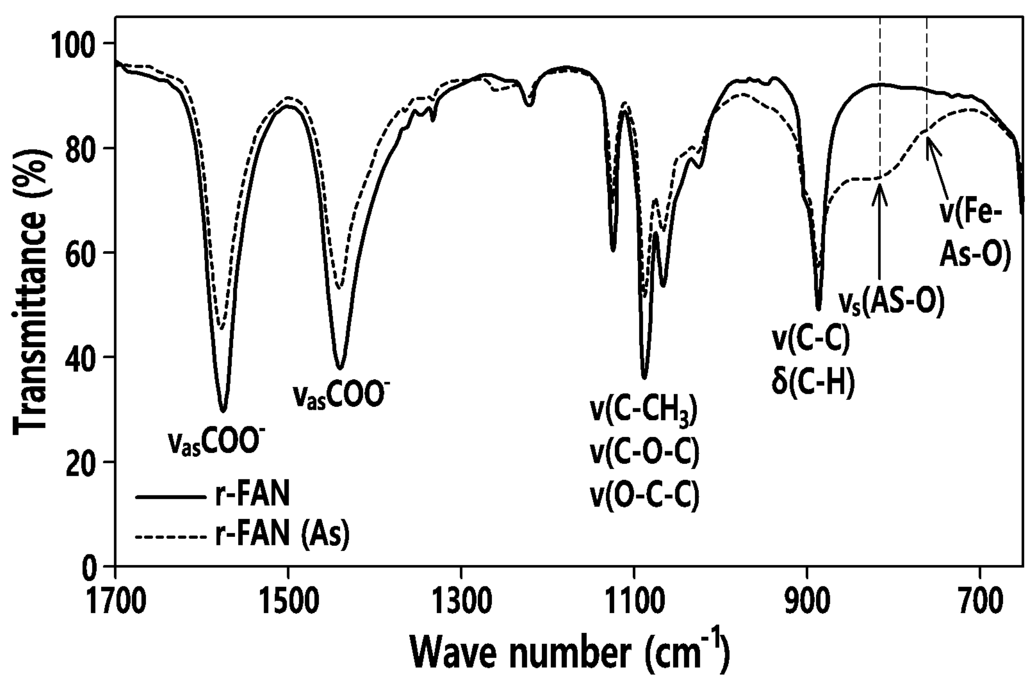

[FIG. 48]
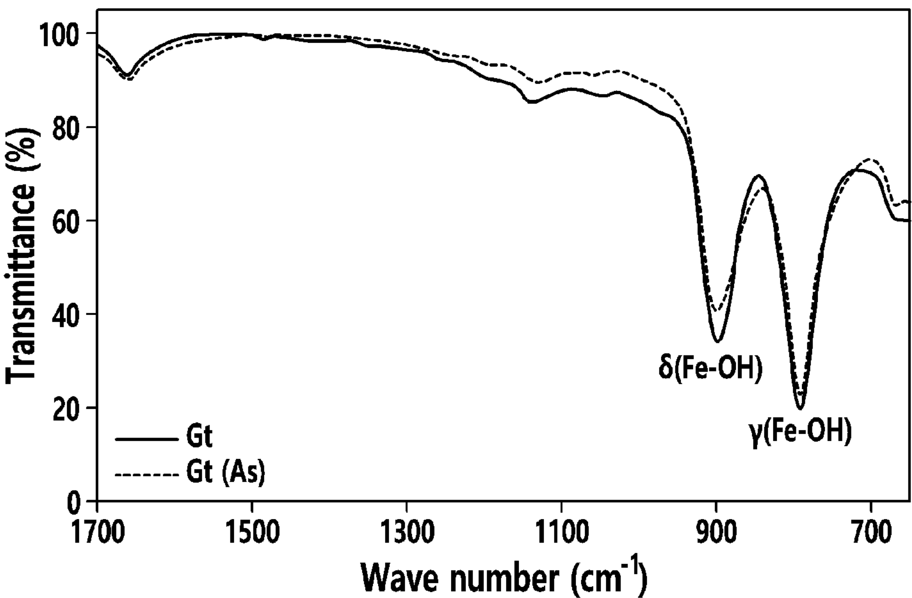
[FIG. 49]
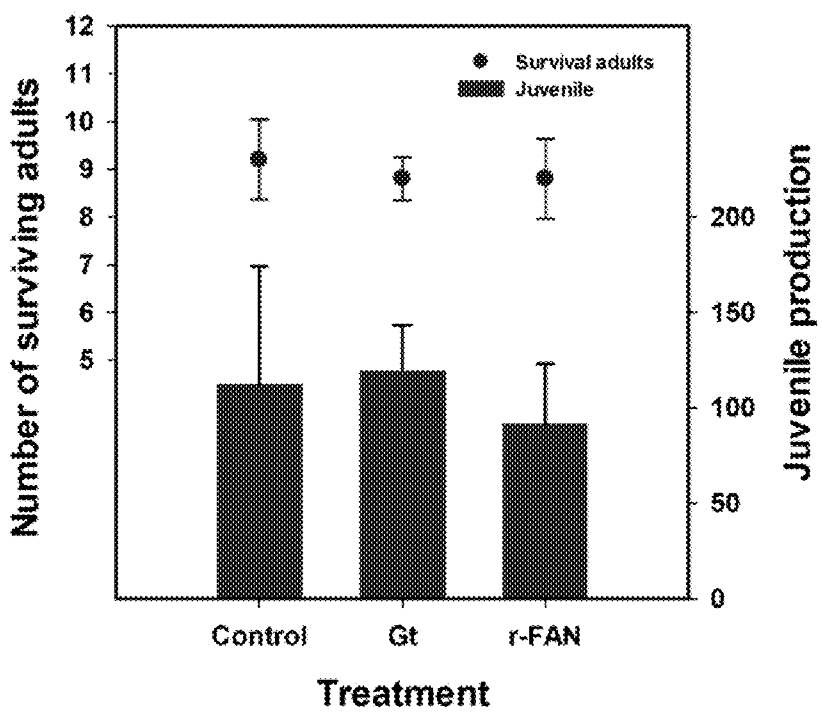

[FIG. 50]
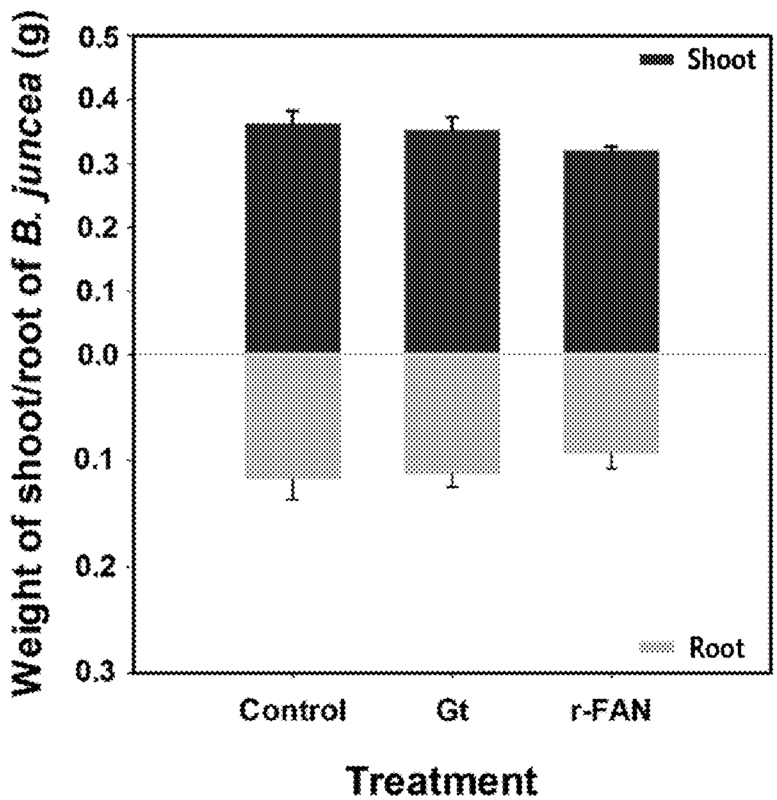
[FIG. 51]
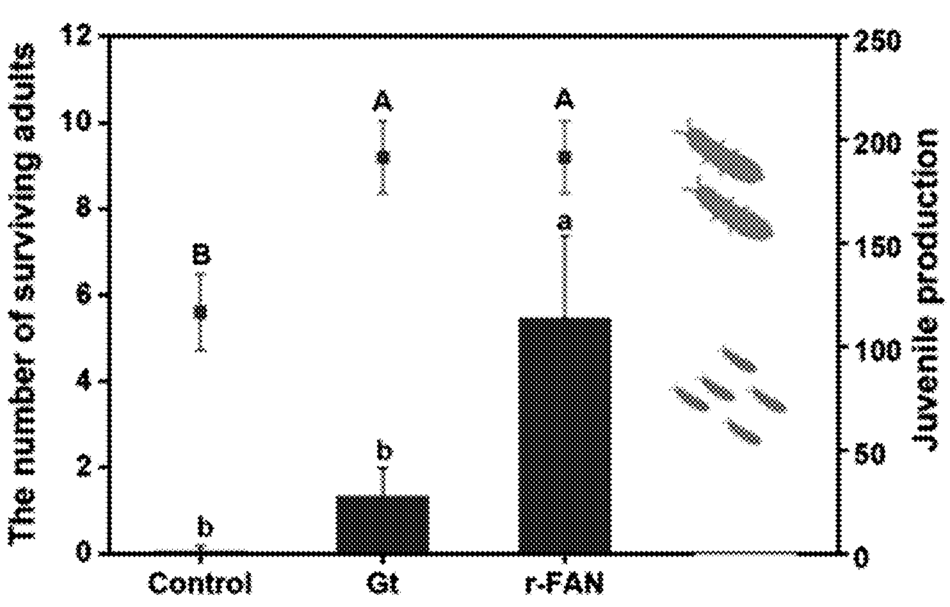

[FIG. 52]
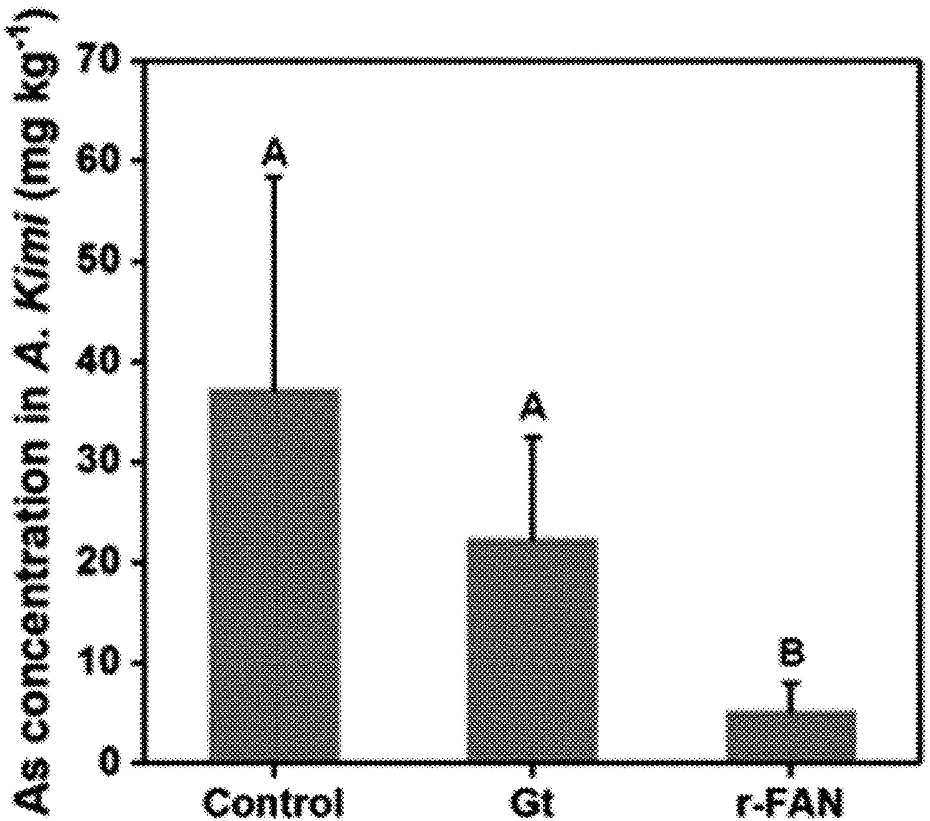
[FIG. 53]
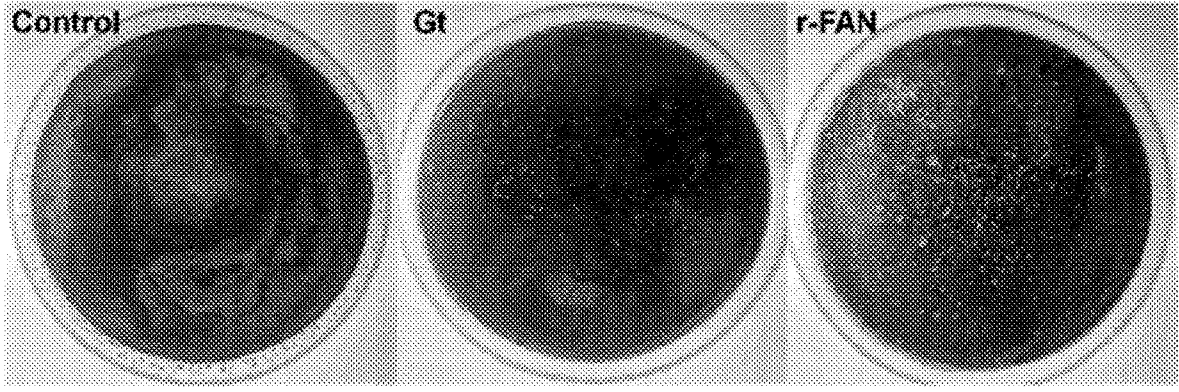

[FIG. 54]
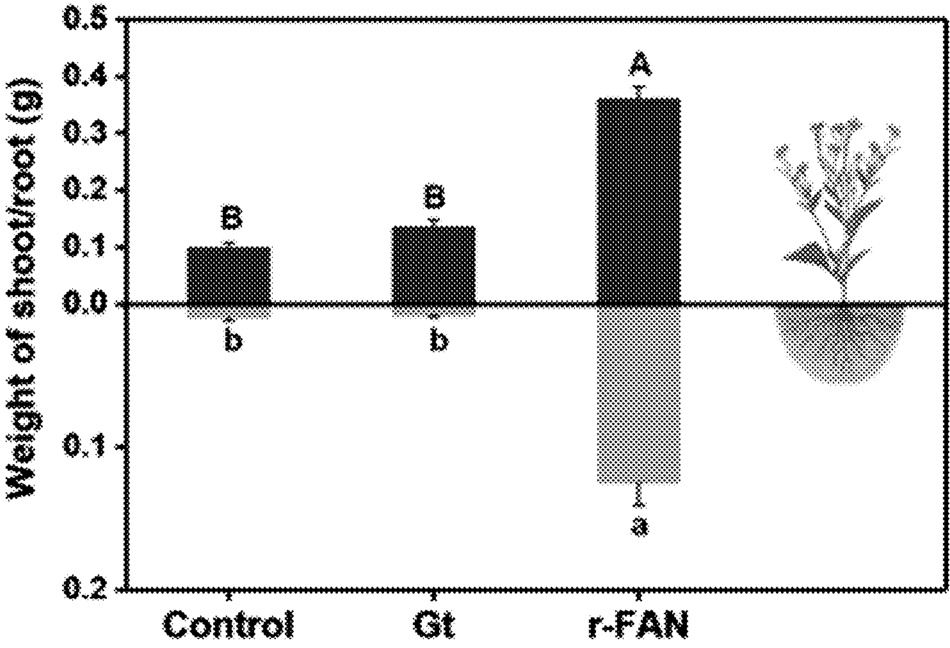
[FIG. 55]
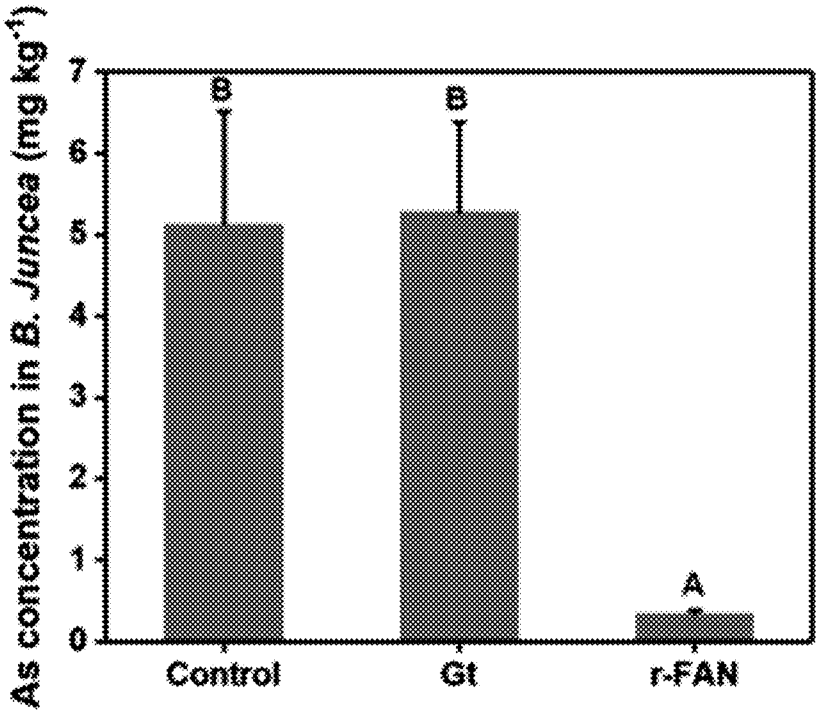

[FIG. 56]
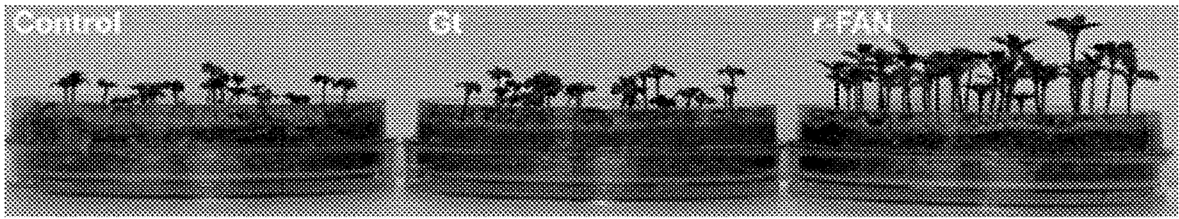
[FIG. 57]
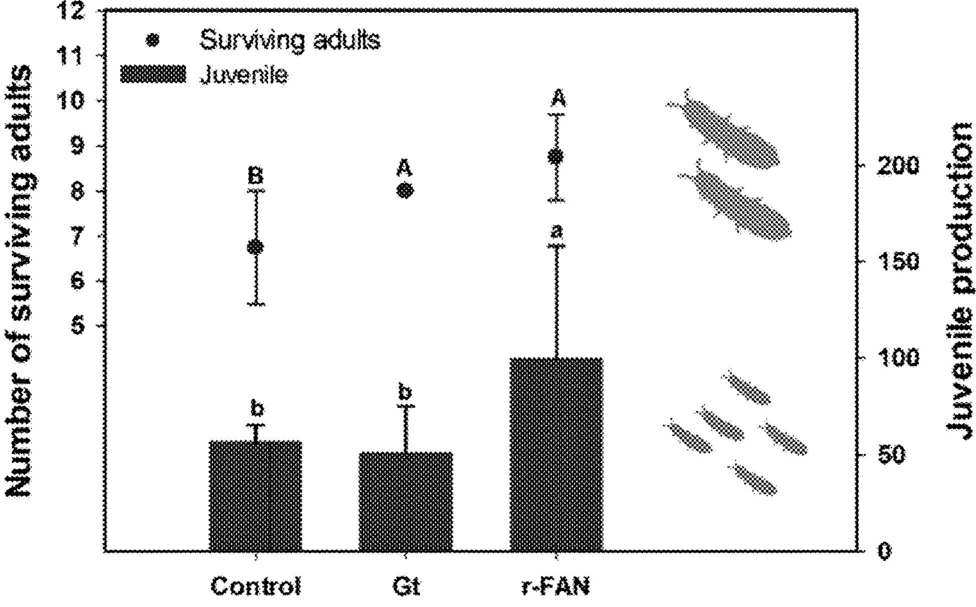

[FIG. 58]
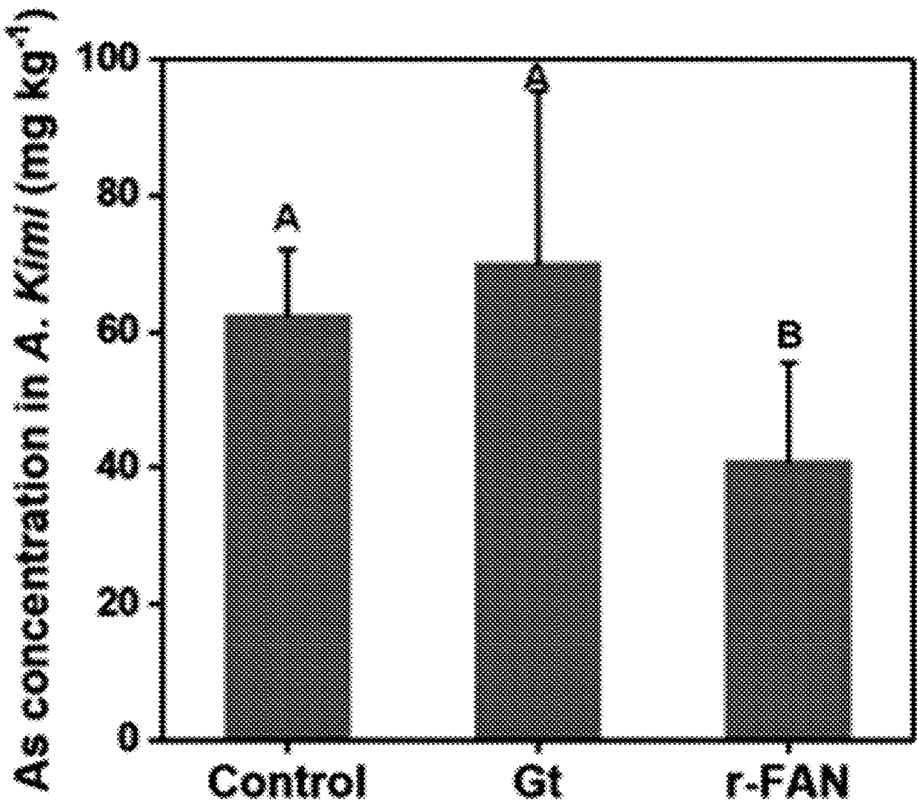
[FIG. 59]
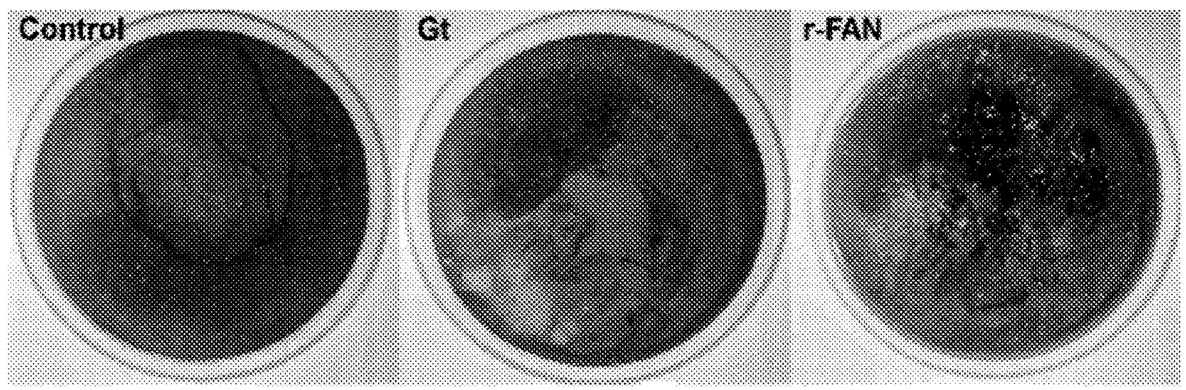

[FIG. 60]
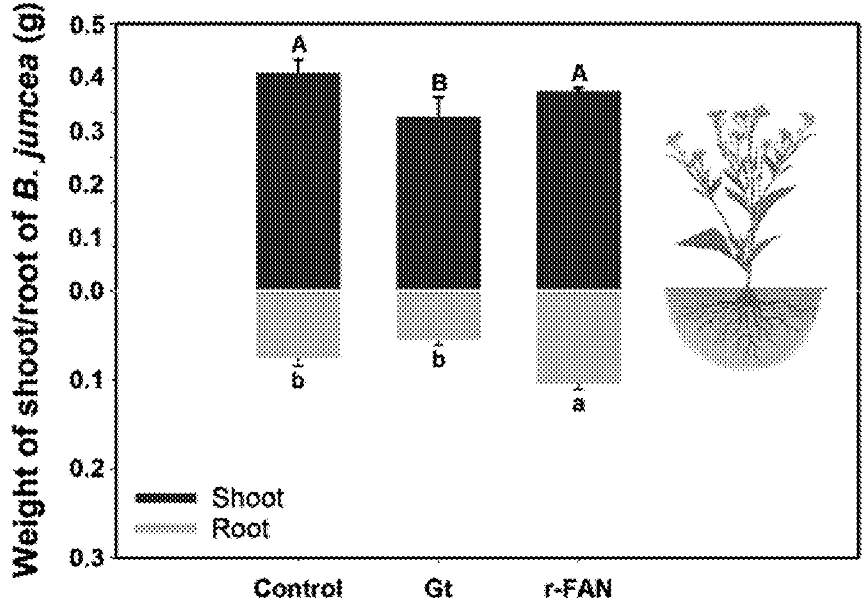
[FIG. 61]
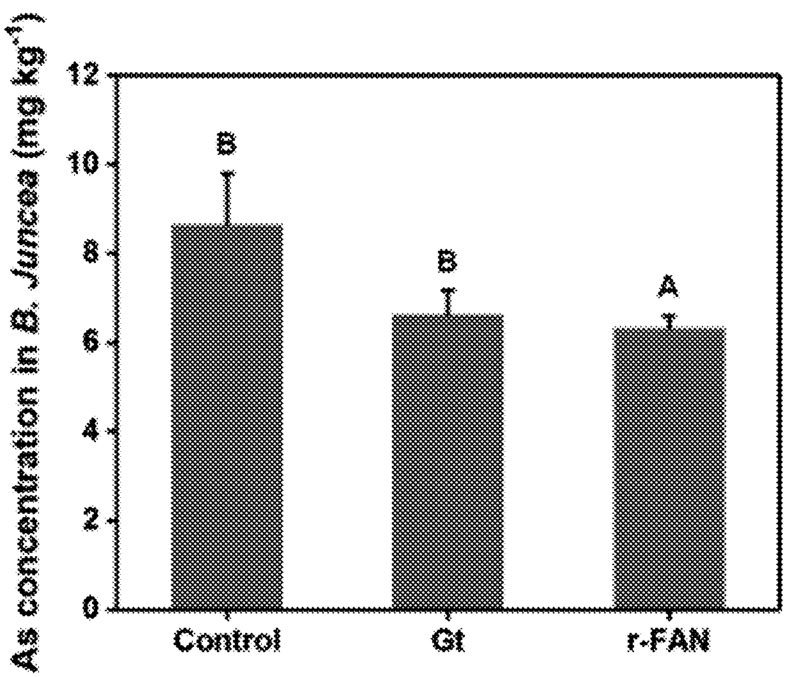

[FIG. 62]
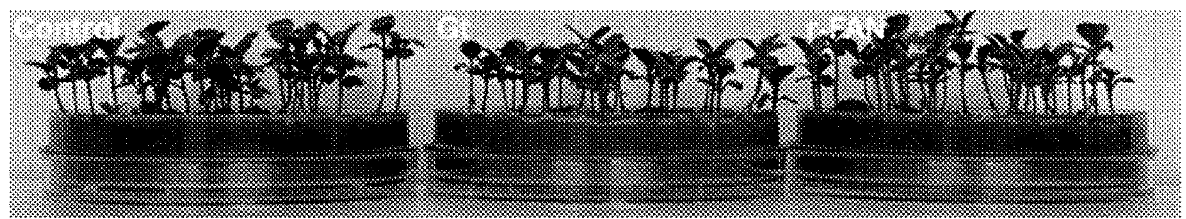
[FIG. 63]
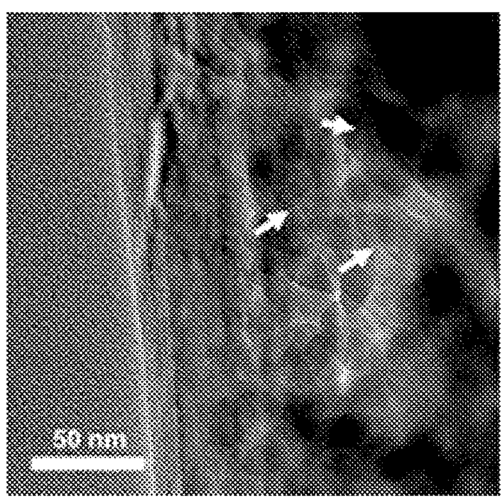
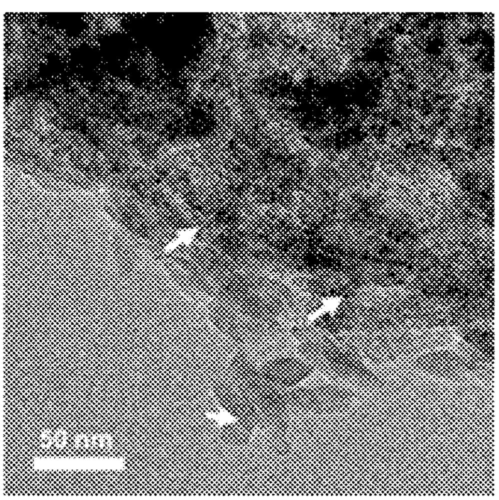

[FIG. 64]
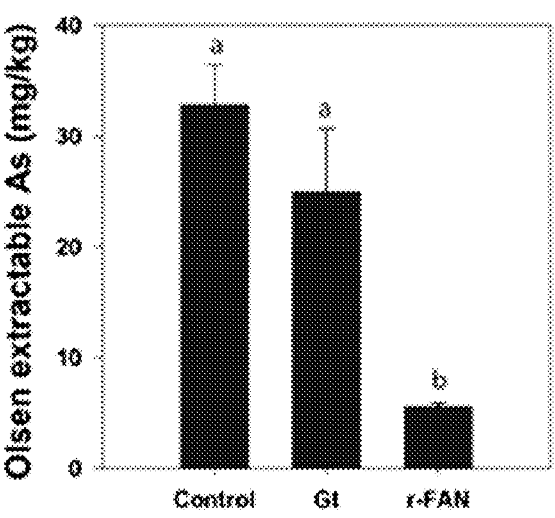
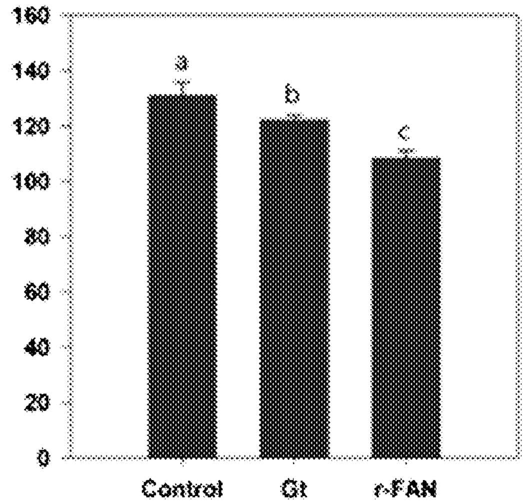
Treatment
[FIG. 65]
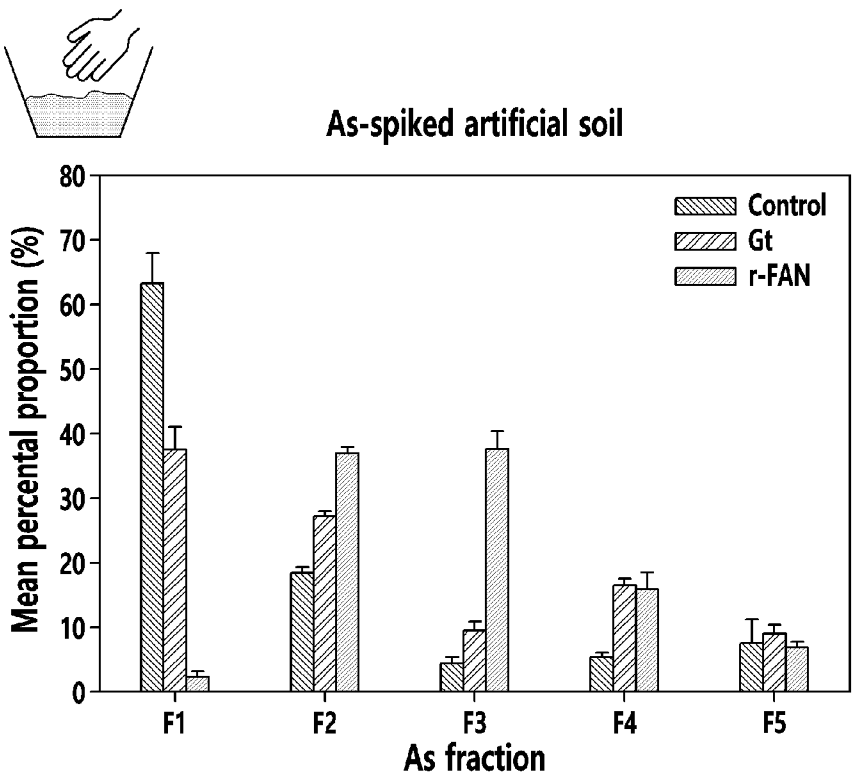

[FIG. 66]
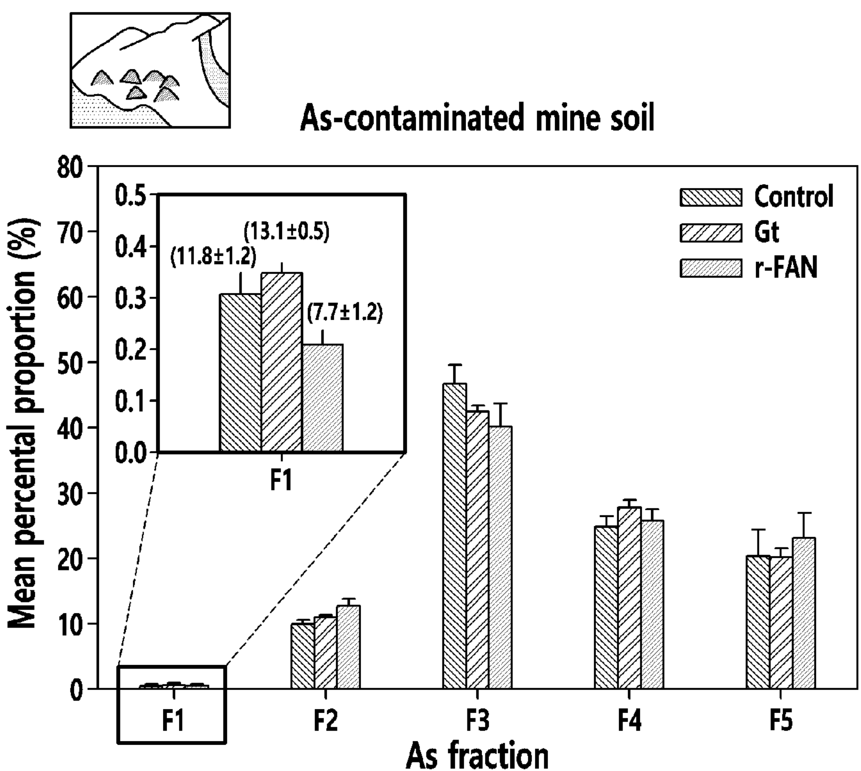

LAYERED FERRIC RUST AND IRON HYDROXIDE NANOPARTICLES INCLUDING THE SAME

CROSS-REFERENCE TO RELATED APPLICATION

This application claims priority to Korean Patent Application No. 10-2022-0053803, filed on Apr. 29, 2022, in the Korean Intellectual Property Office, the disclosure of which is incorporated herein by reference.

BACKGROUND OF THE DISCLOSURE

Field of the Disclosure

The present disclosure relates to layered ferric rust and iron hydroxide nanoparticles including the same, and more particularly, to layered ferric rust having a new crystal structure due to anion organic matter intercalated between layered structures of iron oxide/ferric hydroxide and iron hydroxide nanoparticles including the layered ferric rust.

Description of the Related Art

Iron hydroxide is an abundant mineral that makes up 4% of the Earth's crust, plays an important role in biogeochemical cycles and ecosystem maintenance, and is attracting attention in various fields such as metallurgy, water purification, energy conversion and storage. Naturally occurring iron hydroxide includes ferrihydrite, ferric hydroxide (FeOOH) polymorphs (goethite, akaganetie, lepidocorcite, and feroxyhyte), and green rust (types 1 and 2).

In particular, to obtain a ceramic pigment with a vivid color, it is important to synthesize a nano pigment capable of controlling the shape and size of the pigment. When using iron hydroxide, various shapes from rod to spindle shapes may be implemented. At this time, depending on the shape, α-FeOOH (goethite), β-FeOOH (akaganeite), and γ-FeOOH (lepidocrocite) are used separately.

Therefore, there is a demand for a preparation method capable of imparting diversity to surface area characteristics while enabling shape and size control through a simple process for iron hydroxide used for these various purposes.

In addition, naturally occurring iron hydroxide is used as a precursor for formation of relatively thermodynamically stable iron oxide and plays an important role in the crystallization process of iron oxide. Accordingly, an iron hydroxide material with a new crystal structure may provide important information about the iron oxide crystallization process beyond basic understanding and technical impact thereof.

Arsenic is an ingredient harmful to the human body and has been used as a material for poison in the past. Surprisingly, such arsenic is a substance that is commonly encountered in the surroundings. Arsenic is not only produced by production activities such as mining and smelting, but also occurs naturally.

However, chronic exposure to arsenic may cause serious health problems, so inorganic arsenic is classified as a carcinogen. In addition, soil contaminated with arsenic (As) inevitably exists in nature, and removing arsenic is a global challenge for a sustainable environment.

Accordingly, conventionally, attempts have been made to remove arsenic using nanomaterials having increased adsorption capacity and affinity. However, due to complex reasons including mass synthesis of nanomaterials, toxicity to the soil environment, and environmental problems, use of nanomaterials in soil is limited.

Specifically, an adsorbent prepared by mixing iron oxide, iron oxyhydroxide, or a mixture thereof known as an arsenic-adsorbing material with a cation-selective binder resin is used to increase mechanical strength and arsenic adsorption efficiency.

Despite these conventional techniques, purification techniques for arsenic contamination are still ineffective, and effective removal techniques for arsenic contamination are still required.

RELATED ART DOCUMENTS

Patent Documents

Korean Patent No. 1771005, "METHOD OF PREPARING IRON HYDROXIDE POWDER"

Korean Patent Application Publication No. 2019-0085902, "METHOD OF PREPARING HOLLOW FIBER ARSENIC ADSORBENT"

SUMMARY OF THE DISCLOSURE

Therefore, the present disclosure has been made in view of the above problems, and it is an object of the present disclosure to provide layered ferric rust having a novel crystal structure in which organic anions are intercalated between nanoplatelet layers to have a relatively wide interlayer spacing compared to a nanoparticle size, and iron hydroxide nanoparticles including the layered ferric rust.

It is another object of the present disclosure to provide layered ferric rust in which organic anions induce distortion in the arrangement of $FeO_6$ octahedrons included in nanoplatelets and form a stacked structure of the nanoplatelets, and iron hydroxide nanoparticles including the layered ferric rust.

It is still another object of the present disclosure to provide iron hydroxide nanoparticles having a layered ferric rust crystal structure that forms a stacked structure of nanoplatelets by a mechanism in which solvent molecules participate in a dehydration process during a chemical reaction of converting metastable ferrihydrite into stable magnetite by adjusting the amounts of organic anions and a solvent when preparing iron hydroxide nanoparticles, and a method of preparing the iron hydroxide nanoparticles.

It is still another object of the present disclosure to provide an arsenic adsorbent including natural-friendly and economical organic-inorganic composite iron hydroxide nanoparticles capable of immobilizing arsenic using iron hydroxide, which is a mineral abundant in the earth, and a method of preparing the arsenic adsorbent.

It is still another object of the present disclosure to provide an arsenic adsorbent capable of immobilizing arsenic through a primary adsorption mechanism that adsorbs arsenic by chemical adsorption through the surfaces of nanoplatelets and a secondary adsorption mechanism that intercalates/immobilizes arsenic by electrostatic intercalation through interlayer spacings formed by organic ligands intercalated between layers of nanoplatelets, and a method of preparing the arsenic adsorbent.

It is yet another object of the present disclosure to provide an arsenic adsorbent capable of preparing organic-inorganic composite iron hydroxide nanoparticles including organic ligands intercalated between layers of nanoplatelets through colloidal assembly of nano-scale building blocks through a particle-directed attachment process, and a method of preparing the arsenic adsorbent.

In accordance with one aspect of the present disclosure, provided is layered ferric rust having a novel crystal structure that satisfies conditions (a) to (c) below:

(a) a crystal system belongs to a monoclinic system; (b) a space group belongs to Pn (No. 7); and (c) unit cell parameters are a=3.854±0.002 Å, b=11.491±0.007 Å, c=9.818±0.004 Å, and β=88.47±0.005° (b is a distance between layers in a axial direction).

Atomic coordinates and equivalent isotropic displacement parameters in a lattice of the layered ferric rust may satisfy Table 1 below:

TABLE 1

| Element | x | y | z | $B_{eq}$ | Occ. |
|---|---|---|---|---|---|
| Fe(1) | 0.4096(19) | 0.4207(15) | 0.293(7) | 1 | 1 |
| Fe(2) | 0.409(2) | 0.4391(16) | 0.606(7) | 1 | 1 |
| C(1) | 0.318(2) | 0.669(5) | 0.455(5) | 2 | 1 |
| C(2) | 0.220(3) | 0.789(5) | 0.411(7) | 2 | 1 |
| O(1) | 0.507(3) | 0.239(8) | 0.252(10) | 2 | 1 |
| O(2) | 0.2716(16) | 0.638(4) | 0.577(5) | 2 | 1 |
| O(3) | 0.899(5) | 0.451(7) | 0.298(17) | 2 | 0.75 |
| O(4) | 0.426(4) | 0.521(6) | 0.104(17) | 2 | 0.75 |
| O(5) | 0.424(3) | 0.593(7) | 0.371(5) | 2 | 1 |
| O(6) | 0.258(2) | 0.257(8) | 0.637(10) | 2 | 1 |
| O(7) | 0.563(3) | 0.044(5) | 0.322(5) | 2 | 1 |
| O(8) | 0.584(2) | 0.320(9) | 0.454(14) | 2 | 0.5 |
| H(1) | 0.343(4) | 0.846(5) | 0.461(8) | 2 | 1 |
| H(2) | 0.267(4) | 0.799(7) | 0.317(7) | 2 | 1 |
| H(3) | 0.56(3) | 0.05(6) | 0.227(8) | 2 | 1 |
| H(4) | 0.63(3) | −0.04(2) | 0.32(6) | 2 | 1 |
| H(5) | −0.026(3) | 0.801(7) | 0.428(8) | 2 | 1 |
| H(6) | 0.42905 | 0.17156 | 0.64026 | 2 | 1 |
| H(7) | 0.50683 | 0.18654 | 0.19587 | 2 | 1 |

The layered ferric rust may be represented by Chemical Formula 1 below:

[Chemical Formula 1]

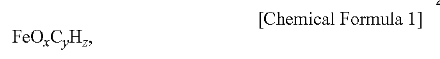

$$FeO_xC_yH_z,$$

wherein x is a prime number between 3 and 3.5 (3≤x≤3.5), y is a prime number between 0.67 to 1 (0.67≤y≤1), and z is a prime number between 1.94 to 3.5 (1.94≤z≤3.5).

The layered ferric rust may include two or more nanoplatelet layers including one or more $FeO_6$ octahedral structures; and organic anions intercalated between the two or more nanoplatelet layers, wherein, in the two or more nanoplatelet layers, an interlayer spacing is created by the organic anions.

The nanoplatelets and the organic anions may be bonded to each other by bidentate bridging.

The nanoplatelets may include corner-sharing and edge-sharing of the adjacent $FeO_6$ octahedral structures in a zigzag pattern by the organic anions.

The number of the two or more nanoplatelet layers may be 2 to 16.

The nanoplatelets may include iron (III) oxide-hydroxide (FeOOH).

The organic anions may include an acetate ($CH_3COO^-$)-based compound.

In accordance with another aspect of the present disclosure, provided are iron hydroxide nanoparticles including the layered ferric rust according to an embodiment of the present disclosure.

The iron hydroxide nanoparticles may be included in at least one of a pollutant adsorbent, a battery catalyst, an oxygen evolution reaction (OER) catalyst, a thermal therapy material, bioplastics, a construction material, a pigment, and a dye.

In accordance with yet another aspect of the present disclosure, provided is an arsenic adsorbent including organic-inorganic composite iron hydroxide nanoparticles, wherein the organic-inorganic composite iron hydroxide nanoparticles include two or more nanoplatelet layers including one or more $FeO_6$ octahedral structures; and organic ligands intercalated between the two or more nanoplatelet layers, wherein the organic-inorganic composite iron hydroxide nanoparticles adsorb arsenic by chemisorption by surfaces of the nanoplatelets and by electrostatic intercalation by an interlayer spacing between the nanoplatelets.

The interlayer spacing of the two or more nanoplatelet layers may be 1.14 nm to 1.19 nm.

The nanoplatelets and the organic ligands may be bonded to each other by bidentate bridging.

In the nanoplatelets, the adjacent $FeO_6$ octahedral structures may be corner-shared and edge-shared in a zigzag pattern by the organic ligands.

The number of the two or more nanoplatelet layers may be 2 to 16.

The nanoplatelets may include iron (III) oxide-hydroxide (FeOOH).

The organic ligands may include an acetate ($CH_3COO^-$)-based compound.

The arsenic may be included in soil.

BRIEF DESCRIPTION OF THE DRAWINGS

The above and other objects, features and other advantages of the present disclosure will be more clearly understood from the following detailed description taken in conjunction with the accompanying drawings, in which:

FIGS. 1A and 1B schematically show layered ferric rust (LFR) according to an embodiment of the present disclosure, which a novel crystal structure of iron hydroxide, and conventional crystal structures of iron hydroxide;

FIG. 2 schematically shows layered ferric rust according to an embodiment of the present disclosure, and FIG. 3 schematically shows an example of nanoplatelets and organic anions included in layered ferric rust according to an embodiment of the present disclosure;

FIG. 4 schematically shows a combined structure of nanoplatelets and organic anions included in layered ferric rust according to an embodiment of the present disclosure;

FIG. 5 shows a bright-field transmission electron microscope image of layered ferric rust according to an embodiment of the present disclosure, FIG. 6 shows a scanning transmission electron microscope image of layered ferric rust according to an embodiment of the present disclosure taken at a low voltage of 80 kV, and FIG. 7 shows a selected-area electron diffraction analysis image of layered ferric rust according to an embodiment of the present disclosure;

FIG. 8 is an intensity profile representing the interlayer spacing of layered ferric rust according to an embodiment of the present disclosure, FIG. 9 includes graphs showing the surface properties of layered ferric rust according to an embodiment of the present disclosure, FIGS. 10 to 14 are graphs showing the compositional analysis of layered ferric rust according to an embodiment of the present disclosure, FIG. 15 shows a Fourier transform infrared spectrum representing the coordination of acetate of layered ferric rust according to an embodiment of the present disclosure, and FIG. 16 shows Raman analysis spectra of layered ferric rust according to an embodiment of the present disclosure and ferric hydroxide polymorphs;

FIG. 17 shows Rietveld analysis of synchrotron high-resolution powder neutron diffraction analysis that analyzes the crystal structure of layered ferric rust according to an embodiment of the present disclosure and an LFR crystal structure image thereof, and FIG. 18 is a graph showing the Rietveld analysis results of synchrotron high-resolution powder neutron diffraction analysis of layered ferric rust according to an embodiment of the present disclosure compared to a conventional crystal structure;

FIG. 19A is a flowchart for explaining a method of preparing layered ferric rust according to an embodiment of the present disclosure, and FIG. 19B is a schematic diagram showing a process of forming an LFR crystal structure;

FIG. 20 is a transmission electron microscope image of powder containing a high concentration of layered ferric rust according to an embodiment of the present disclosure on a glass substrate, FIG. 21 is a transmission electron microscope image of powder containing a medium concentration of layered ferric rust according to an embodiment of the present disclosure on a glass substrate, FIG. 22 is a transmission electron microscope image of powder containing a low concentration of layered ferric rust according to an embodiment of the present disclosure on a glass substrate, and FIG. 23 is a graph showing a Gaussian distribution of the width and the average length of thickness in a lamination direction of layered ferric rust according to an embodiment of the present disclosure measured using particles (n=200) obtained through a transmission electron microscope;

FIG. 24 is a graph showing the growth kinetics of layered ferric rust according to an embodiment of the present disclosure in lateral and axial directions, FIG. 25 is a schematic diagram showing growth modes observed using a scanning transmission electron microscope, and FIG. 26 is a schematic diagram showing lateral and axial alignment observed using a scanning transmission electron microscope;

FIG. 27 includes graphs showing in-situ thermal XRD patterns for powder including layered ferric rust according to an embodiment of the present disclosure under air (oxidizing), Ar+$H_2$ (reducing), and Ar (inert) atmospheres, and FIG. 28 is a graph showing a phase change diagram for FIG. 27;

FIG. 29 shows transmission electron microscope images and electron diffraction patterns showing changes depending on second heat treatment time (reaction time) for layered ferric rust according to an embodiment of the present disclosure;

FIG. 30 includes transmission electron microscope (TEM) images of layered ferric rust according to an embodiment of the present disclosure depending on the contents of a solvent ($H_2O$), FIG. 31 includes graphs showing the powder X-ray diffraction (XRPD) of layered ferric rust according to an embodiment of the present disclosure depending on the contents of a solvent ($H_2O$), and FIG. 32 is a graph showing the proportion of phase change from magnetite to layered ferric rust according to an embodiment of the present disclosure depending on the contents of a solvent ($H_2O$);

FIG. 33 is a schematic diagram showing an arsenic adsorbent according to an embodiment of the present disclosure, and FIG. 34 is a schematic diagram showing the mechanism of arsenic adsorption in soil using an arsenic adsorbent according to an embodiment of the present disclosure;

FIG. 35 is a schematic diagram showing a method of preparing an arsenic adsorbent according to an embodiment of the present disclosure, and FIG. 36 is a schematic diagram showing a method of preparing an arsenic adsorbent according to an embodiment of the present disclosure in detail;

FIG. 38 includes scanning electron microscope (SEM) and transmission electron microscope (TEM) images showing the layer structure of an arsenic adsorbent according to Example 2 of the present disclosure;

FIG. 39 includes an image showing the selected-area electron diffraction (SAED) pattern of an arsenic adsorbent according to Example 2 of the present disclosure and a graph showing powder X-ray diffraction (XRPD) results;

FIG. 40 is a schematic diagram showing an arsenic (As) adsorption mechanism, FIG. 41 is a graph showing inductively coupled plasma mass spectroscopy (ICP-MS) results showing the adsorption capacity of an arsenic adsorbent according to Comparative Example 1 and an arsenic adsorbent according to Example 2 of the present disclosure, and FIG. 42 is a graph showing electrokinetic potential before and after arsenic adsorption;

FIG. 43 is a graph showing the X-ray photoelectron spectroscopy (XPS) results of an arsenic adsorbent according to Comparative Example 1 before arsenic adsorption, FIG. 44 is a graph showing the X-ray photoelectron spectroscopy results of an arsenic adsorbent according to Comparative Example 1 after arsenic adsorption, FIG. 45 is a graph showing the X-ray photoelectron spectroscopy results of an arsenic adsorbent according to Example 2 of the present disclosure before arsenic adsorption, FIG. 46 is a graph showing the X-ray photoelectron spectroscopy results of an arsenic adsorbent according to Example 2 of the present disclosure after arsenic adsorption, FIG. 47 is a graph showing the Fourier-transform infrared spectroscopy (FT-IR) results of an arsenic adsorbent according to Example 2 of the present disclosure before and after arsenic adsorption, and FIG. 48 is a graph showing the Fourier-transform infrared spectroscopy results of an arsenic adsorbent according to Comparative Example 1 before and after arsenic adsorption;

FIG. 49 is a graph showing the bioassay results of *A. kimi* in the absence of arsenic in artificial soil, and FIG. 50 is a graph showing the bioassay results of *B. juncea* in artificial soil that is not treated with arsenic;

FIG. 51 is a graph showing the bioassay results of *A. kimi* in artificial soil treated with arsenic (Circles represent adults, and bars represent larvae), FIG. 52 is a graph showing arsenic contents in artificial soil treated with arsenic, FIG. 53 includes images of *A. kimi* in artificial soil treated with arsenic, FIG. 54 is a graph showing *B. juncea* in artificial soil, FIG. 55 is a graph showing the contents of arsenic in *B. juncea* in artificial soil, and FIG. 56 includes images of *B. juncea* in artificial soil;

FIGS. 57 to 62 are graphs and images showing biological test results for treatment of an arsenic adsorbent (Gt) according to Comparative Example 1, an arsenic adsorbent (Control) according to Comparative Example 2, and an arsenic adsorbent (r-FAN) according to Example 2 of the present disclosure as modifiers for As-contaminated mine soil in Collembolan breeding (*A. kimi*) and phytotoxicity (*B. juncea*) tests;

FIG. 63 includes images showing the morphological characteristics of an arsenic adsorbent according to Example 2 of the present disclosure in artificial soil (a) and arsenic-contaminated soil (b);

FIG. 64 includes graphs showing Olsen extraction results in arsenic-contaminated artificial soil (a) and arsenic-contaminated mine soil (b) according to treatment of an arsenic adsorbent (Gt) according to Comparative Example 1, an arsenic adsorbent (Control) according to Comparative Example 2, and an arsenic adsorbent (r-FAN) according to Example 2 of the present disclosure; and FIG. 65 is a graph showing average percentage ratios for different forms of arsenic in artificial soil, and FIG. 66 is a graph showing average percentage ratios for different forms of arsenic in mine soil.

DETAILED DESCRIPTION OF THE DISCLOSURE

The present disclosure will now be described more fully with reference to the accompanying drawings and contents disclosed in the drawings. However, the present disclosure should not be construed as limited to the exemplary embodiments described herein.

The terms used in the present specification are used to explain a specific exemplary embodiment and not to limit the present inventive concept. Thus, the expression of singularity in the present specification includes the expression of plurality unless clearly specified otherwise in context. It will be further understood that the terms "comprise" and/or "comprising", when used in this specification, specify the presence of stated components, steps, operations, and/or elements, but do not preclude the presence or addition of one or more other components, steps, operations, and/or elements thereof.

It should not be understood that arbitrary aspects or designs disclosed in "embodiments", "examples", "aspects", etc. used in the specification are more satisfactory or advantageous than other aspects or designs.

In addition, the expression "or" means "inclusive or" rather than "exclusive or". That is, unless mentioned otherwise or clearly inferred from context, the expression "x uses a or b" means any one of natural inclusive permutations.

In addition, as used in the description of the disclosure and the appended claims, the singular form "a" or "an" is intended to include the plural forms as well, unless context clearly indicates otherwise.

Although terms used in the specification are selected from terms generally used in related technical fields, other terms may be used according to technical development and/or due to change, practices, priorities of technicians, etc. Therefore, it should not be understood that terms used below limit the technical spirit of the present disclosure, and it should be understood that the terms are exemplified to describe embodiments of the present disclosure.

Also, some of the terms used herein may be arbitrarily chosen by the present applicant. In this case, these terms are defined in detail below. Accordingly, the specific terms used herein should be understood based on the unique meanings thereof and the whole context of the present disclosure.

Unless defined otherwise, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In addition, in the following description of the present disclosure, a detailed description of known functions and configurations incorporated herein will be omitted when it may make the subject matter of the present disclosure unclear. The terms used in the specification are defined in consideration of functions used in the present disclosure, and can be changed according to the intent or conventionally used methods of clients, operators, and users. Accordingly, definitions of the terms should be understood on the basis of the entire description of the present specification.

According to a method of preparing hydroxide, hydroxide is mainly formed through a particle-directed attachment process and grown through colloidal assembly of nano-scale building blocks. The particle-directed attachment process is known as a new growth model that is related to anisotropy or formation of a complex structure with an organic material.

FIGS. 1A and 1B schematically show layered ferric rust (LFR) according to an embodiment of the present disclosure, which a novel crystal structure of iron hydroxide, and conventional crystal structures of iron hydroxide.

Layered ferric rust according to an embodiment of the present disclosure is a novel crystal structure material having a relatively wide interlayer spacing compared to the size of particles due to acetate intercalated between layers of ferric hydroxide, and acetate, which is an organic anion, may form a layered ferric rust (LFR) structure by distorting the arrangement of $FeO_6$ octahedrons and creating a lamination of hydroxide layers.

In addition, water molecules added in excess in the process of synthesizing hydroxide may play a decisive role in formation of acetate and a novel crystal structure by participating in a dehydration process during a chemical reaction of converting metastable ferrihydrite into stable magnetite.

The layered ferric rust according to an embodiment of the present disclosure has a novel crystal structure different from lepidocrocite and green rust having the known ferric hydroxide layered structure.

The layered ferric rust according to an embodiment of the present disclosure has a novel crystal structure that satisfies the following conditions (a) to (c).

(a) A crystal system belongs to a monoclinic system, (b) a space group belongs to Pn (No. 7), and (c) unit cell parameters are a=3.854±0.002 Å, b=11.491±0.007 Å, c=9.818±0.004 Å, and β=88.47±0.005° (b is the distance between layers in the axial direction).

"a" means one side of a unit cell in the axial direction, "c" means one side of a unit cell in the axial direction, and "B" means an angle between the ac plane and the b axis.

When a material has one or more crystal structures, it is called polymorphism. The crystal structure is the internal structure of six crystal systems, and the properties of a material vary depending on the crystal structure thereof. The layered ferric rust according to an embodiment of the present disclosure has a novel crystal structure different from the crystal structures of existing FeOOH polymorphs through synchrotron HRPD and Raman analysis. The layered ferric rust according to an embodiment of the present disclosure preferably has a novel crystal structure that satisfying the following conditions: a crystal system belongs to a monoclinic system, a space group belongs to Pn (No. 7), and unit cell parameters are a=3.854 (2) Å, b=11.491 (7) Å, c=9.818 (4) Å, and β=88.47 (5)° (b is a distance between layers in the axial direction).

More specifically, the crystallographic data of the layered ferric rust according to an embodiment of the present disclosure is shown in Table 2 below.

TABLE 2

| $Fe_2O_4H_2$•$(CH_3COO)$•$H_2O$ | |
|---|---|
| Crystal system, space group | Monoclinic system, Pn (No.7) |
| α, Å | 3.854(2) |
| b, Å | 11.491(7) |
| c, Å | 9.818(4) |
| β | 88.47(5)° |
| Volume, $Å^3$ | 434.6(4) |
| Z | 2 |
| Formula weight (Mr) | 254.78 |
| Density, calc. g/$cm^3$ | 0.973 |
| Temperature, K | 298 |
| Wavelength, Å | 1.5225 |
| Step scan increment, 2θ | 0.02° |
| 2θ range, ° | 5-146.5 |
| $R_p$ | 14.11 |
| $R_{wp}$ | 19.65 |
| $R_{exp}$ | 5.03 |
| $R_{bragg}$ | 7.43 |
| G.O.F | 3.91 |

In Table 2, the volume means the volume of a unit cell, Z means proton number, the formula weight means a sum of the atomic weights of elements included in a chemical formula, the density means a value obtained through weight/volume—TGA measurement, the temperature means a measurement temperature in synchrotron high-resolution powder neutron diffraction analysis, and the wavelength means the wavelength of X-ray used in synchrotron high-resolution powder neutron diffraction analysis.

XRD is measured by scanning a diffraction angle (2θ) while an X-ray source and a detector move along the circumference. At this time, the 2θ range means a range to be scanned, step scan increment means increment of an incident angle, and an R-factor is a reliable factor for refinement results and expresses the difference between a calculated value and a measured value in %, indicating the reliability of the calculated value.

$R_p$ may be calculated by Equation 1 below, $R_{wp}$ may be calculated by Equation 2 below, $R_{exp}$ may be calculated by Equation 3 below, and $R_{bragg}$ may be calculated by Equation 4 below.

$$R_p = 100\frac{\sum_{i=1,n}|y_i - y_{i,j}|}{\sum_{i=1,n} y_i}$$ [Equation 1]

$$R_{wp} = \left\{\sum_i w_i\{y_i(obs) - y_i(calc)\}^2 / \sum_i w_i y_i(obs)^2\right\}^{1/2}$$ [Equation 2]

$$R_{exp} = \left\{(N - P + C) / \sum_i w_i y_i(obs)^2\right\}^{1/2}$$ [Equation 3]

$$R_I = \left(\sum_{hkl}|I_{hkl}(obs) - I_{hkl}(calc)| / \sum_{hkl} I_{hkl}(obs)\right)$$ [Equation 4]

When measuring the electron density of a sample with XRD, the electron density is actually distorted in a three-dimensional direction rather than a sphere due to the bonding or arrangement of atoms. In powder XRD, the electron density is assumed to be spherical and the extent to which the electron density diverges from the original is calculated. At this time, B is a thermal factor, and eq is a variable assuming a spherical shape.

G.O.F. is good of fitness and a reduced chi-square test, and means a goodness-of-fit test that determines whether an observed ratio value is the same as an expected value.

Table 2 shows the crystallographic data of LFR obtained from synchrotron high-resolution powder neutron diffraction analysis, including crystal systems, space groups, the length of each side of a unit cell, angle, volume, molecular weight, density, and information used for analysis, and the crystallographic data shows the reliability of the above analysis.

Atomic coordinates and equivalent isotropic displacement parameters in the lattice of the layered ferric rust according to an embodiment of the present disclosure may satisfy Table 1 below.

TABLE 1

| Elements | x | y | z | $B_{eq}$ | Occ. |
|---|---|---|---|---|---|
| Fe(1) | 0.4096(19) | 0.4207(15) | 0.293(7) | 1 | 1 |
| Fe(2) | 0.409(2) | 0.4391(16) | 0.606(7) | 1 | 1 |
| C(1) | 0.318(2) | 0.669(5) | 0.455(5) | 2 | 1 |
| C(2) | 0.220(3) | 0.789(5) | 0.411(7) | 2 | 1 |
| O(1) | 0.507(3) | 0.239(8) | 0.252(10) | 2 | 1 |
| O(2) | 0.2716(16) | 0.638(4) | 0.577(5) | 2 | 1 |
| O(3) | 0.899(5) | 0.451(7) | 0.298(17) | 2 | 0.75 |
| O(4) | 0.426(4) | 0.521(6) | 0.104(17) | 2 | 0.75 |
| O(5) | 0.424(3) | 0.593(7) | 0.371(5) | 2 | 1 |
| O(6) | 0.258(2) | 0.257(8) | 0.637(10) | 2 | 1 |
| O(7) | 0.563(3) | 0.044(5) | 0.322(5) | 2 | 1 |
| O(8) | 0.584(2) | 0.320(9) | 0.454(14) | 2 | 0.5 |
| H(1) | 0.343(4) | 0.846(5) | 0.461(8) | 2 | 1 |
| H(2) | 0.267(4) | 0.799(7) | 0.317(7) | 2 | 1 |
| H(3) | 0.56(3) | 0.05(6) | 0.227(8) | 2 | 1 |
| H(4) | 0.63(3) | −0.04(2) | 0.32(6) | 2 | 1 |
| H(5) | −0.026(3) | 0.801(7) | 0.428(8) | 2 | 1 |
| H(6) | 0.42905 | 0.17156 | 0.64026 | 2 | 1 |
| H(7) | 0.50683 | 0.18654 | 0.19587 | 2 | 1 |

In Table 1, x, y, and z represent the coordinates of each atom in a unit cell, and Occ. is site occupancy, and means site occupancy (e.g., when one exists, it means 1) in which the corresponding atom exists at an atomic site in a unit cell. In addition, in Table 1, the number in parentheses is the standard deviation of a result value, and 0.4096 (19) may mean 0.4096±0.019.

In addition, when measuring electron density with XRD, a thermal factor is calculated for each 3-dimensional direction. Atoms, due to bonding or arrangement thereof, have a contorted shape rather than a sphere. At this time, $B_{eq}$ is a value obtained by calculating a thermal factor assuming that the shape is spherical (eq).

In addition, Occ. is occupancy (site occupancy), and is a value indicating a degree to which atoms occupy a unit cell when one oxygen atom is assumed to be 1.

Table 1 shows the coordinates of all atoms in a unit cell in 3D space.

The layered ferric rust according to an embodiment of the present disclosure may be represented by Chemical Formula 1 below.

[Chemical Formula 1]

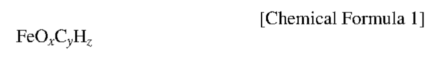

$FeO_xC_yH_z$

In Chemical Formula 1, x is a prime number between 3 and 3.5 (3≤x≤3.5), y is a prime number between 0.67 to 1 (0.67≤y≤1), and z is a prime number between 1.94 to 3.5 (1.94≤z≤3.5).

For example, the layered ferric rust according to an embodiment of the present disclosure may be $FeO_{3.5}CH_{3.5}$ or $Fe_2O_4H_2 \cdot (CH_3COO) \cdot H_2O$.

The layered ferric rust according to an embodiment of the present disclosure may be synthesized by a particle-directed deposition process and may have a novel crystal structure due to organic anions intercalated between two or more nanoplatelet layers (e.g., ferric hydroxide).

In particular, since organic anion molecules grafted onto building blocks (two or more nanoplatelet layers) are closely related to intermolecular interaction in an assembly process, by controlling organic anions (e.g., acetate), which are organic molecules, the crystal structure of hydroxide (e.g., ferric hydroxide) may be controlled in a wide range from the atomic level to the micro level.

For example, γ-FeOOH and green rust (GR-2) may have boehmite arranged in a zigzag arrangement along the ac plane and brucite having a planar $FeO_3(OH)_3$ arrangement along the ab plane.

However, in the layered ferric rust according to an embodiment of the present disclosure, an $FeO_6$ octahedral structure is connected by edge-sharing in the a-axis direction by organic anions, and in the c-axis direction, edge-sharing is broken and corner-sharing is formed in the organic anions 121. Thus, the layered ferric rust has a completely different crystal structure.

Hereinafter, the layered ferric rust according to an embodiment of the present disclosure will be described in detail with reference to FIG. 2.

FIG. 2 schematically shows layered ferric rust according to an embodiment of the present disclosure, and FIG. 3 schematically shows an example of nanoplatelets and organic anions included in layered ferric rust according to an embodiment of the present disclosure.

The layered ferric rust according to an embodiment of the present disclosure includes two or more nanoplatelet layers 110 including one or more $FeO_6$ octahedral structures 111 and the organic anions 121 intercalated between the two or more nanoplatelet layers 110. Due to the organic anions 121, the two or more nanoplatelet layers 110 have an interlayer spacing 120, which is a distance between the layers.

That is, in the layered ferric rust according to an embodiment of the present disclosure, since the organic anions 121 are intercalated between the nanoplatelet layers 110, the layered ferric rust may have the relatively wide interlayer spacing 120 compared to the size of nanoparticles.

Since the layered ferric rust has a crystal structure different from other FeOOH (green rust, lepidocrocite) materials having a conventional layered structure, by discovering new pathways and intermediates that form $Fe_3O_4$, contaminants may be adsorbed and removed by using the wide interlayer spacing 120, and the layered ferric rust may be used as a battery catalyst.

The nanoplatelets 110 and the organic anions 121 may be connected by bidentate bridging. Accordingly, the nanoplatelets 110 may have a zigzag structure due to edge-sharing of the adjacent $FeO_6$ octahedral structures 111 and corner-sharing by the organic anions 121.

For example, the a-axis direction is similar to other FeOOH having a conventional layered structure due to edge-sharing of Fe atoms in the $FeO_6$ octahedrons. In the c-axis direction, the LFR has a wide interlayer spacing due to distortion caused by the organic anions 121. In addition, since edge-sharing is broken and Fe atoms are attached by corner-sharing, the LFR may have a crystal structure different from other FeOOH having a conventional layered structure. The combined structure will be described in more detail in FIG. 3.

The interlayer spacing 120 of the two or more nanoplatelet layers 110 may be 1.14 nm to 1.19 nm.

The number of the two or more nanoplatelet layers 110 is not particularly limited, but the number of the two or more nanoplatelet layers 110 may be preferably 2 to 16.

In addition, since the interlayer spacing 120 of the two or more nanoplatelet layers 110 and the number of the two or more nanoplatelet layers 110 are proportional to the synthesis time of LFR, as the heating time of a synthesis solution increases, the number of layers increases. After 8 hours, the speed at which the size of particles increases gradually slows down, and may reach a critical point at about 8 hours (average number of layers is 16).

The nanoplatelets 110 may have a disk shape.

The nanoplatelets 110 may include iron (III) oxide-hydroxide (FeOOH).

The organic anions 121 may preferably include an acetate ($CH_3COO$)-based compound, without being limited thereto.

For example, the acetate-based compound may include at least one of sodium acetate, potassium acetate, and ammonium acetate.

According to an embodiment, the layered ferric rust according to an embodiment of the present disclosure may be included in iron hydroxide nanoparticles according to an embodiment of the present disclosure.

The iron hydroxide nanoparticles according to an embodiment of the present disclosure may be included in at least one of a pollutant adsorbent, a battery catalyst, an oxygen evolution reaction (OER) catalyst, a thermal therapy material, bioplastics, a construction material, a pigment, and a dye.

For example, when used as a pollutant adsorbent, in the iron hydroxide nanoparticles according to an embodiment of the present disclosure, since the nanoplatelets 110 are stacked in the b-axis direction in a state in which the octahedrons are twisted by the organic anions 121, the wide interlayer spacing 120 is formed, and thus contaminants are more easily introduced into the wide interlayer spacing 120, thereby improving the removal efficiency of the contaminants.

In addition, when used as a battery catalyst, in the iron hydroxide nanoparticles according to an embodiment of the present disclosure, since the nanoplatelets 110 are stacked in the b-axis direction in a state in which the octahedrons are twisted by the organic anions 121, the wide interlayer spacing 120 is formed, and thus large amounts of ions may be stored and transported in Na and Li batteries.

In addition, when used as an oxygen evolution reaction (OER) catalyst, in the iron hydroxide nanoparticles according to an embodiment of the present disclosure, since the nanoplatelets 110 are stacked in the b-axis direction in a state in which the octahedrons are twisted by the organic anions 121, the current density value thereof is higher than that of other FeOOH, thereby improving efficiency.

FIG. 4 schematically shows a combined structure of nanoplatelets and organic anions included in layered ferric rust according to an embodiment of the present disclosure.

Referring to FIG. 4, the $FeO_6$ octahedral structures 111 of the layered ferric rust according to an embodiment of the present disclosure are linked to each other by edge-sharing in the a-axis direction. In the c-axis direction, edge-sharing is broken at the organic anions 121 and corner-sharing is done.

In this way, the nanoplatelets including the $FeO_6$ octahedral structures 111 may be formed on the ac plane and stacked in the b-axis direction to have the large interlayer spacing 120.

When viewed in the area direction, a pair of corner-sharing $FeO_6$ octahedral structures 111 may form a zigzag layered arrangement with edge-sharing.

The organic anions 121 may form a pair of the $FeO_6$ octahedral structures 111 by bidentate bridging, and at the same time, may participate as a component of the $FeO_6$ octahedral structures 111 with carboxylate thereof.

The zigzag arrangement of the pairs of the $FeO_6$ octahedral structures 111 and the b-axis stacking induced by the organic anions 121 may determine the crystal structure of iron hydroxide.

Accordingly, the layered ferric rust according to an embodiment of the present disclosure may have a completely different atomic arrangement compared to other iron hydroxides having a layered structure.

Example 1: Synthesis of layered ferric rust having novel crystal structure

LFR was obtained using a polyol method. Iron chloride hexahydrate ($FeCl_{3.6}H_2O$) was used as an iron ion precursor, ethylene glycol (EG) was used as a reducing agent and a solvent, and sodium acetate ($CH_3COONa$) and $H_2O$ were used as adjuvants to impart a hydroxyl group (OH—).

Using an ultrasonic generator, 3 mmol $FeCl_3{\cdot}6H_2O$ was dissolved in 400 mmol of $H_2O$ and 15 mmol $CH_3HOONa$ was dissolved in 50 mL of EG, and the prepared solutions were placed in a three-neck flask, followed by mechanical stirring for 15 minutes until yellowish brown turned reddish brown. Then, after rapidly heating to 200° C. for 15 minutes, reaction was allowed for 8 hours while maintaining the temperature. After cooling the reaction solution, washing was performed three or more times using ethanol.

FIG. 5 shows a bright-field transmission electron microscope image of layered ferric rust according to an embodiment of the present disclosure, FIG. 6 shows a scanning transmission electron microscope image of layered ferric rust according to an embodiment of the present disclosure taken at a low voltage of 80 kV, and FIG. 7 shows a selected-area electron diffraction analysis image of layered ferric rust according to an embodiment of the present disclosure.

Referring to FIGS. 5 to 7, it can be confirmed that the layered ferric rust according to an embodiment of the present disclosure exhibits a ring pattern at d=1.14 nm.

At this time, the appearance of a strong pattern at d=1.134 nm through electron diffraction analysis means that the stack of disc-shaped 2D layers has crystallographic regularity, and the wide interlayer spacing between layers is formed through acetate. In Fourier transform infrared analysis, strong vibration of acetate molecules was observed. It was confirmed that acetate and iron were combined by bidentate bridging. Then, the coordination numbers of acetate and iron were confirmed.

FIG. 8 is an intensity profile representing the interlayer spacing of layered ferric rust according to an embodiment of the present disclosure, FIG. 9 includes graphs showing the surface properties of layered ferric rust according to an embodiment of the present disclosure, FIGS. 10 to 14 are graphs showing the compositional analysis of layered ferric rust according to an embodiment of the present disclosure, FIG. 15 shows a Fourier transform infrared spectrum representing the coordination of acetate of layered ferric rust according to an embodiment of the present disclosure, and FIG. 16 shows Raman analysis spectra of layered ferric rust according to an embodiment of the present disclosure and ferric hydroxide polymorphs.

Table 3 shows the peak parameters of the Fourier transform infrared spectrum.

TABLE 3

| Wavelength ($cm^{-1}$) | Peaks (Peak assignment) |
|---|---|
| 3425 | —OH stretching ν(—OH) |
| 2939, 2920, 2868 | $sp^3$ (—$CH_3$)<br>C—H<br>Stretching<br>ν(—$CH_3$) |
| 1580 | $COO^-$<br>Asymmetry<br>$\nu_{as}COO^-$ (Fe) |
| 1446 | $COO^-$ symmetry<br>$\nu_sCOO^-$ (Fe) |
| 1334 | $CH_3$ deformation<br>δ(—$CH_3$) bending |
| 1222 | C—H wagging |
| 1127, 1091,<br>1065, 1025 | ρ($CH_3$)<br>O—C—C stretching, C—O—C stretching,<br>C—CH3, C—O stretching |
| 903, 888 | ν(C—C)<br>C—C stretching, C—H bending |

Referring to Table 3 and FIGS. 8 to 16, the spectrum for each element (Fe, C, O) was analyzed through X-ray photoelectron spectroscopy analysis. Based on these results, it was confirmed that the LFR is a type of ferric hydroxide.

Based on the results of comparing the Raman peaks of known ferric hydroxide polymorphs and the Raman peaks of the LFR through Raman analysis, it can be confirmed that the LFR has a different crystal structure. Next, the crystal structure of the LFR was analyzed by performing high-resolution powder neutron diffraction using a synchrotron. Based on the analysis results, it can be seen that the crystal structure of the LFR is different from that of green rust and lepidocrocite, which have a layered structure among existing ferric hydroxides.

FIG. 17 shows Rietveld analysis of synchrotron high-resolution powder neutron diffraction analysis that analyzes the crystal structure of layered ferric rust according to an embodiment of the present disclosure and an LFR crystal structure image thereof, and FIG. 18 is a graph showing the Rietveld analysis results of synchrotron high-resolution powder neutron diffraction analysis of layered ferric rust according to an embodiment of the present disclosure compared to a conventional crystal structure.

Referring to FIGS. 17 and 18, the composition of the LFR was analyzed by in-situ X-ray diffraction, thermogravimetric analysis/differential thermal analysis, and Rutherford back scattering spectroscopy/elastic recoil detection analysis.

In the composition analysis, the composition of each element is $FeOOH{\cdot}0.5CH_3COO$, indicating that the LFR is a polymorph of ferric hydroxide.

In addition, since the layered ferric rust according to an embodiment of the present disclosure does not match the graph line of the conventional crystal structure, it can be seen that the layered ferric rust has a completely different crystal structure.

Based on the HRPD data, the crystal structure of the LFR was analyzed by an ab-initio method, and the results are shown in Tables 1 and 2 below. The crystal structure of the layered ferric rust according to an embodiment of the present disclosure satisfies the following conditions: (a) a crystal system belongs to a monoclinic system, (b) a space group belongs to Pn (No. 7), and (c) unit cell parameters are a=3.854 (2) Å, b=11.491 (7) Å, c=9.818 (4) Å, and β=88.47 (5) ° (here, b is the distance between layers in the axial direction).

FIG. 19A is a flowchart for explaining a method of preparing layered ferric rust according to an embodiment of the present disclosure, and FIG. 19B is a schematic diagram showing a process of forming an LFR crystal structure.

According to an embodiment, the layered ferric rust according to an embodiment of the present disclosure may be prepared by the following method.

Since the method of preparing the layered ferric rust according to an embodiment of the present disclosure includes the same components as the layered ferric rust according to an embodiment of the present disclosure, description of the same components will be omitted.

First, in the method of preparing the layered ferric rust according to an embodiment of the present disclosure, step S110 of mixing an iron ion precursor, a reducing agent, and a solvent to prepare a mixed solution is performed.

Iron chloride hexahydrate ($FeCl_3 \cdot 6H_2O$) is preferably used as the iron ion precursor, without being limited thereto.

In addition to the role of a reducing agent, the reducing agent may simultaneously act as a solvent. Ethylene glycol (EG) is preferably used as the reducing agent, without being limited thereto. Specifically, the reducing agent may include at least one of ethylene glycol, di-ethylene glycol, tri-ethylene glycol, and tetra-ethylene glycol.

The solvent may be water ($H_2O$).

According to an embodiment, a hydrolysis adjuvant may be further included, and the hydrolysis adjuvant may be sodium acetate ($CH_3COONa$).

Next, step S120 of heating the mixed solution to grow layered ferric rust is performed.

Step S120 of heating the mixed solution to grow layered ferric rust may include first heat treatment step S121 of heating for 15 minutes to increase the temperature of the mixed solution to 200° C. and second heat treatment step S122 of maintaining the temperature of the mixed solution at 200° C. for 8 hours.

The first heat treatment step S121 is a process of reaching the temperature of the second heat treatment step S122. In the first heat treatment step S121, the temperature of the mixed solution may be increased to 200° C. for 15 minutes.

The second heat treatment step S122 is a process of forming iron hydroxide FeOOH from ferrihydrite. In the second heat treatment step S122, crystals may be grown by heating the mixed solution at 200° C. for 8 hours.

Referring to FIG. 19B, in general, in the process of synthesizing iron hydroxide, the reaction is initiated by heat treatment, and metastable iron hydroxide phases such as green rust and ferrihydrite may be formed to form thermodynamically stable iron oxides such as hematite and magnetite by an iron ion precursor.

However, according to the method of preparing the layered ferric rust according to an embodiment of the present disclosure, the iron ion precursor may react with acetate (organic anions) supplied from ethylene glycol as the reducing agent and hydroxyl ions supplied from the solvent (water) to form ferrihydrite.

Thereafter, ferrihydrite and magnetite are formed through dehydration and reduction reactions by ethylene glycol. At this time, the layered ferric rust according to an embodiment of the present disclosure as an intermediate phase material may be prepared by adjusting the content of the solvent.

For example, after the iron ion precursor reacts with hydroxyl groups (OH) present in acetate and water to form ferrihydrite, iron hydroxide (FeOOH) is changed to magnetite through dehydration and reduction processes. At this time, when an excess of water is added, the dehydration and reduction processes that convert iron hydroxide (FeOOH) into magnetite are hindered, so that iron hydroxide remains as it is without being converted to magnetite. For example, even when hydroxyl groups are lost as water in the dehydration process, hydroxyl groups may be supplemented by adding a sufficient amount of water.

That is, in the method of preparing the layered ferric rust according to an embodiment of the present disclosure, an excess of water added during hydroxide synthesis plays a decisive role in formation of acetate and a novel crystal structure by participating in a dehydration process during a chemical reaction that converts metastable ferrihydrite into stable magnetite. Accordingly, the layered ferric rust according to an embodiment of the present disclosure may have a novel crystal structure different from the known ferric hydroxide layered structure of lepidocrocite and green rust.

Accordingly, according to the method of preparing the layered ferric rust according to an embodiment of the present disclosure, the ratio of hydroxyl group/iron ($OH^-$/Fe) may be controlled by the content of the solvent included in the mixed solution.

For example, the ratio of hydroxyl group/iron ($OH^-$/Fe) is an important factor in the process of converting iron hydroxide into magnetite. As the content of the solvent increases, the ratio of hydroxyl group/iron ($OH^-$/Fe) increases, hindering the dehydration and reduction reactions required to convert iron hydroxide (ferric oxyhydroxide) into magnetite. Accordingly, the layered ferric rust according to an embodiment of the present disclosure ($OH^-$/Fe=1) may be more stable than magnetite ($OH^-$/Fe=0).

The content of the solvent may be 150 mmol to 400 mmol. When the content of the solvent is out of the above range, the LFR is not generated.

In addition, the amount of the LFR produced may be controlled depending on the content of the solvent.

The second heat treatment step S122 may include step S122-1 of forming ferrihydrite nanocrystals in the mixed solution, step S122-2 of forming nanoplatelets on the surface of the ferrihydrite nanocrystals, and step S122-3 of attaching two or more nanoplatelet layers at different angles to grow a layered ferric rust (LFR) crystal structure.

For example, when the time of the second heat treatment step S122 reaches 30 minutes, ferrihydrite crystals having low crystallinity, which are intermediates before conversion into magnetite, may be generated (S122-1).

When the time of the second heat treatment step S122 reaches 1 hour, 7 nm nanoplatelets begin to form on the surface of ferrihydrite, and LFR is formed as the nanoplatelets grow through orientation and attachment processes with other adjacent nanoplatelets (S122-2).

When the time of the second heat treatment step S122 reaches 3 to 5 hours, all of the ferrihydrite present in the mixed solution is converted into nanoplatelets, and the nanoplatelets grow in the a-axis and c-axis directions while being attached to adjacent nanoplatelets and are stacked in the b-axis direction to grow LFR (S122-3).

When the time of the second heat treatment step S122 reaches 8 hours, the size of LFR may be stabilized. At this time, the nanoplatelet attachment method may be largely divided into three types: axial, lateral, and axial+lateral.

Accordingly, according to the method of preparing the layered ferric rust according to an embodiment of the present disclosure, even when the mixing ratio of the synthesis solution is the same, the synthesis may be controlled according to the second heat treatment time.

Then, in the method of preparing the layered ferric rust according to an embodiment of the present disclosure, step S130 of cooling the heated mixed solution is performed.

According to the method of preparing the layered ferric rust according to an embodiment of the present disclosure, by cooling the mixed solution, the process of generating LFR may be terminated.

Finally, in the method of preparing the layered ferric rust according to an embodiment of the present disclosure, step S140 of washing the cooled mixed solution to obtain layered ferric rust according to an embodiment of the present disclosure is performed.

That is, referring to FIG. 19B, LFR is synthesized through an intermediate in a stepwise transformation.

For example, thermodynamically stable iron oxide is generally synthesized through a metastable phase rather than directly synthesized from ions in a solution. When a synthesis solution is heated for 30 minutes, ferrihydrite having low crystallinity is generated as an intermediate before LFR formation. After 1 hour, 7 nm nanoplatelets (nano disks) in the form of particles having an interlayer spacing of 1.2 nm begin to form in the intermediate, and portions where adjacent nanoplatelets adhere at different angles are observed.

After 3 to 5 hours, the ferrihydrite intermediate is consumed to grow the LFR, and an SAED pattern shows a strong diffraction pattern at d=1.2 nm that originates from the wide interlayer spacing of the LFR.

Nanoplatelets are used as building blocks to grow the LFR. At this time, the LFR grows in both the thickness and stacking directions over time, and the size thereof is stabilized after about 8 hours.

FIG. 20 is a transmission electron microscope image of powder containing a high concentration of layered ferric rust according to an embodiment of the present disclosure on a glass substrate, FIG. 21 is a transmission electron microscope image of powder containing a medium concentration of layered ferric rust according to an embodiment of the present disclosure on a glass substrate, FIG. 22 is a transmission electron microscope image of powder containing a low concentration of layered ferric rust according to an embodiment of the present disclosure on a glass substrate, and FIG. 23 is a graph showing a Gaussian distribution of the width and the average length of thickness in a lamination direction of layered ferric rust according to an embodiment of the present disclosure measured using particles (n=200) obtained through a transmission electron microscope.

Referring to FIGS. 20 to 23, when the shape of the LFR was analyzed using a transmission electron microscope and a scanning electron microscope, the LFR had a disc-shaped structure in which 2D layers were stacked, and had a diameter of 26.1±3.3 nm and a thickness of 18.3±2.7 nm in the stacking direction. In addition, the LFR was uniformly synthesized into particles with about 16 layers stacked, and the average interlayer spacing between the layers was about 1.19 nm.

FIG. 24 is a graph showing the growth kinetics of layered ferric rust according to an embodiment of the present disclosure in lateral and axial directions, FIG. 25 is a schematic diagram showing growth modes observed using a scanning transmission electron microscope, and FIG. 26 is a schematic diagram showing lateral and axial alignment observed using a scanning transmission electron microscope.

Referring to FIGS. 24 to 26, it can be seen that the growth of the layered ferric rust according to an embodiment of the present disclosure proceeds mainly in the axial and lateral directions, and the size thereof is stabilized within 8 hours.

FIG. 27 includes graphs showing in-situ thermal XRD patterns for powder including layered ferric rust according to an embodiment of the present disclosure under air (oxidizing), Ar+$H_2$ (reducing), and Ar (inert) atmospheres, and FIG. 28 is a graph showing a phase change diagram for FIG. 27.

Referring to FIGS. 27 and 28, it can be seen that the layered ferric rust according to an embodiment of the present disclosure is prepared by performing the second heat treatment step at a temperature of 300° C. or less.

FIG. 29 shows transmission electron microscope images and electron diffraction patterns showing changes depending on second heat treatment time (reaction time) for layered ferric rust according to an embodiment of the present disclosure.

Referring to FIG. 29, as a result of ex-situ transmission electron microscopy analysis, the LFR is synthesized through an intermediate in a stepwise transformation. Thermodynamically stable iron oxide is generally synthesized through a metastable phase rather than directly synthesized from ions in a solution. When a synthesis solution is heated for 30 minutes, ferrihydrite having low crystallinity is generated as an intermediate before LFR formation. After 1 hour, 7 nm nanoplatelets (nano disks) in the form of particles having an interlayer spacing of 1.2 nm begin to form in the intermediate, and portions where adjacent nanoplatelets adhere at different angles are observed.

After 3 to 5 hours, the ferrihydrite intermediate is consumed to grow the LFR, and an SAED pattern shows a strong diffraction pattern at d=1.2 nm that originates from the wide interlayer spacing of the LFR.

Nanoplatelets are used as building blocks to grow the LFR. At this time, the LFR grows in both the thickness and stacking directions over time, and the size thereof is stabilized after about 8 hours.

FIG. 30 includes transmission electron microscope (TEM) images of layered ferric rust according to an embodiment of the present disclosure depending on the contents of a solvent ($H_2O$), FIG. 31 includes graphs showing the powder X-ray diffraction (XRPD) of layered ferric rust according to an embodiment of the present disclosure depending on the contents of a solvent ($H_2O$), and FIG. 32 is a graph showing the proportion of phase change from magnetite to layered ferric rust according to an embodiment of the present disclosure depending on the contents of a solvent ($H_2O$).

Formation of LFR is influenced by the conditions of the chemical components mentioned in the synthesis method. The role of excess water added in the crystallization process of magnetite and ferrihydrite is important. The iron ion precursor reacts with acetate and hydrogen ions supplied from water in ethylene glycol (EG) to generate $Fe^{3+}$ of ferrihydrite. Then, a dehydration process and reduction by ethylene glycol (EG) occur to generate ferric hydroxide ($Fe_2O_3 \cdot H_2O$) and magnetite.

Referring to FIGS. 30 to 32, when the iron ion precursor was fixed at 3 mmol, sodium acetate ($CH_3COONa$) was fixed at 15 mmol, EG was fixed at 50 ml, and the amount of water was increased from 150 mmol to 400 mmol, the final phase after the reaction changed from magnetite to LFR.

In the process of magnetite and LFR crystallization, the ratio of hydroxyl group/iron according to the amount of water is an important factor. As the amount of water increases, dehydration and reduction reactions required for conversion into magnetite are inhibited, and LFR production becomes more stable than magnetite.

The iron hydroxide nanoparticles according to an embodiment of the present disclosure may be included in at least one of a pollutant adsorbent, a battery catalyst, an oxygen evolution reaction (OER) catalyst, a thermal therapy material, bioplastics, a construction material, a pigment, and a dye.

Hereinafter, as a representative example, an arsenic adsorbent containing the iron hydroxide nanoparticles according to an embodiment of the present disclosure will be described.

The arsenic adsorbent according to an embodiment of the present disclosure may reduce the bioavailability of arsenic through strong arsenic adsorption using the organic-inorganic composite iron hydroxide nanoparticles.

FIG. 33 is a schematic diagram showing an arsenic adsorbent according to an embodiment of the present disclosure, and FIG. 34 is a schematic diagram showing the mechanism of arsenic adsorption in soil using an arsenic adsorbent according to an embodiment of the present disclosure.

The arsenic adsorbent according to an embodiment of the present disclosure includes organic-inorganic composite iron hydroxide nanoparticles 210, and the organic-inorganic composite iron hydroxide nanoparticles 210 include two or more nanoplatelet layers (nanoplatelets; 211, 211-1, 211-2) including one or more $FeO_6$ octahedral structures and organic ligands 212-1 and 212-2 intercalated between the two or more nanoplatelet layers 211.

That is, in the arsenic adsorbent according to an embodiment of the present disclosure, since the organic ligands 212-1 and 212-2 are intercalated between the nanoplatelet layers 211, the arsenic adsorbent may have the relatively wide interlayer spacing 213 compared to the size of nanoparticles.

Since the organic-inorganic composite iron hydroxide nanoparticles 210 included in the arsenic adsorbent according to an embodiment of the present disclosure has a layered ferric rust crystal structure different from the conventional layered structure of other FeOOH (green rust, lepidocrocite) materials, through new pathways and intermediates that form $Fe_3O_4$, arsenic may be adsorbed and removed by using the wide interlayer spacing 213.

The nanoplatelets 211 and the organic ligands 212-1 and 212-2 may be connected by bidentate bridging. Accordingly, the nanoplatelets 211 may have a zigzag structure due to edge-sharing of the adjacent $FeO_6$ octahedral structures 211 and corner-sharing by the organic ligands 212-1 and 212-2.

For example, the a-axis direction is similar to other FeOOH having a conventional layered structure due to edge-sharing of Fe atoms in the $FeO_6$ octahedrons. In the c-axis direction, the organic-inorganic composite iron hydroxide nanoparticles 210 have the wide interlayer spacing 213 due to distortion caused by the organic ligands 212-1 and 212-2. In addition, since edge-sharing is broken and Fe atoms are attached by corner-sharing, the organic-inorganic composite iron hydroxide nanoparticles 210 may have a crystal structure different from other FeOOH having a conventional layered structure.

The interlayer spacing 213 of the two or more nanoplatelet layers 211 may be 1.14 nm to 1.19 nm.

The number of the two or more nanoplatelet layers 211 is not particularly limited, but the number of the two or more nanoplatelet layers 211 may be preferably 2 to 16.

In addition, since the interlayer spacing 213 of the two or more nanoplatelet layers 211 and the number of the two or more nanoplatelet layers 211 are proportional to synthesis time, as the heating time of a synthesis solution increases, the number of layers increases. After 8 hours, the speed at which the size of particles increases gradually slows down, and may reach a critical point at about 8 hours (average number of layers is 16).

The nanoplatelets 211 may have a disk shape.

The nanoplatelets 211 may include iron (III) oxide-hydroxide (FeOOH).

The organic ligands 212-1 and 212-2 may preferably include an acetate ($CH_3COO^-$)-based compound, without being limited thereto.

For example, the acetate-based compound may include at least one of sodium acetate, potassium acetate, and ammonium acetate.

In the arsenic adsorbent according to an embodiment of the present disclosure, the organic ligands 212-1 and 212-2 are intercalated between the two or more nanoplatelet layers 211, and thus the arsenic adsorbent includes the organic-inorganic composite iron hydroxide nanoparticles 210 having a layered ferric rust crystal structure having the relatively wide interlayer spacing 213 compared to the size of the particles. Thus, arsenic adsorption efficiency may be significantly improved by a primary adsorption mechanism in which arsenic is adsorbed by chemisorption at the surfaces of the nanoplatelets 211 and a secondary adsorption mechanism in which arsenic is adsorbed by electrostatic intercalation by the interlayer spacing 213 between the nanoplatelets 211.

Specifically, in the organic-inorganic composite iron hydroxide nanoparticles 210, first arsenic 221 may be chemisorbed by the first organic ligands 212-1 and the second organic ligands 212-2 formed on the surfaces of the first nanoplatelets 211-1 and the second nanoplatelets 211-2, and at the same time, second arsenic 222 may be adsorbed through electrostatic intercalation by the interlayer spacing 213 formed by the second organic ligands 212-2 between the first nanoplatelets 211-1 and the second nanoplatelets 211-2.

The primary mechanism relates to chemisorption. In the primary mechanism, $H_2AsO_4^{-1}$ removes organic ligands 212-1 and 212-2 (e.g., acetate) bound to the Fe layer, and is chemically adsorbed at the site where the organic ligands are removed.

The secondary mechanism relates to layer intercalation. In the secondary mechanism, the $H_2AsO_4^{-1}$ complex is physically adsorbed in a wide interlayer spacing between the layers.

For example, in the secondary mechanism, in the arsenic adsorbent according to an embodiment of the present disclosure, since the nanoplatelets 211 are stacked in the b-axis direction in a state in which octahedrons are twisted by the organic ligands 212-1 and 212-2, the arsenic adsorbent has the wide interlayer spacing 213, and thus arsenic may be easily introduced into the wide interlayer spacing 213, thereby improving the efficiency of removing arsenic by electrostatic intercalation.

Accordingly, the arsenic adsorbent according to an embodiment of the present disclosure may maintain the soil ecosystem from the perspective of a sustainable environment and includes the organic-inorganic composite iron hydroxide nanoparticles 210 with increased adsorption of arsenic 221 and 222. Since the arsenic adsorbent is synthesized based on the structural reconstitution of hydroxide existing in nature, the arsenic adsorbent may improve arsenic adsorption efficiency while maintaining the soil environment.

Accordingly, the arsenic adsorbent according to an embodiment of the present disclosure may be used as a soil improver.

Hereinafter, the combined structure of the nanoplatelets 211 and the organic ligands 212-1 and 212-2 of the organic-inorganic composite iron hydroxide nanoparticles 210 included in the arsenic adsorbent according to an embodiment of the present disclosure will be described in detail.

The $FeO_6$ octahedral structures of the organic-inorganic composite iron hydroxide nanoparticles 210 are linked to each other by edge-sharing in the a-axis direction. In the c-axis direction, edge-sharing is broken at the organic ligands 212-1 and 212-2 and corner-sharing may be performed.

In this way, the nanoplatelets 211 including the $FeO_6$ octahedral structures may be formed on the ac plane and stacked in the b-axis direction to have the large interlayer spacing 213.

When viewed in the area direction, a pair of corner-sharing $FeO_6$ octahedral structures may form a zigzag layered arrangement with edge-sharing.

The organic ligands 212-1 and 212-2 may form a pair of the $FeO_6$ octahedral structures by bidentate bridging, and at the same time, may participate as a component of the $FeO_6$ octahedral structures with carboxylate thereof.

The zigzag arrangement of the pairs of the $FeO_6$ octahedral structures and the b-axis stacking induced by the organic ligands 212-1 and 212-2 may determine the crystal structure of iron hydroxide.

Accordingly, the organic-inorganic composite iron hydroxide nanoparticles 210 may have a completely different atomic arrangement compared to other iron hydroxides having a layered structure.

Specifically, γ-FeOOH and green rust may have boehmite arranged in a zigzag arrangement along the ac plane and brucite having a planar $FeO_3(OH)_3$ arrangement along the ab plane.

However, in the organic-inorganic composite iron hydroxide nanoparticles 210, $FeO_6$ octahedral structures are bonded in the a-axis direction through edge-sharing by organic ligands. In the c-axis direction, edge-sharing is broken and corner-sharing occurs at the organic ligands 212-1 and 212-2 to form a layered ferric rust crystal structure, and thus the organic-inorganic composite iron hydroxide nanoparticles 210 may have a completely different crystal structure.

FIG. 35 is a schematic diagram showing a method of preparing an arsenic adsorbent according to an embodiment of the present disclosure, and FIG. 36 is a schematic diagram showing a method of preparing an arsenic adsorbent according to an embodiment of the present disclosure in detail.

Since the method of preparing the arsenic adsorbent according to an embodiment of the present disclosure includes the same components as the arsenic adsorbent according to an embodiment of the present disclosure, description of the same components will be omitted.

First, in the method of preparing the arsenic adsorbent according to an embodiment of the present disclosure, step S210 of mixing an iron ion precursor, a reducing agent, an organic ligand precursor, and a solvent to prepare a mixed solution is performed.

Iron chloride hexahydrate ($FeCl_{3.6}H_2O$) is preferably used as the iron ion precursor, without being limited thereto.

In addition to the role of a reducing agent, the reducing agent may simultaneously act as a solvent. Ethylene glycol (EG) is preferably used as the reducing agent, without being limited thereto. Specifically, the reducing agent may include at least one of ethylene glycol, di-ethylene glycol, triethylene glycol, and tetra-ethylene glycol.

The solvent may be water ($H_2O$).

The organic ligand precursor preferably includes an acetate ($CH_3COO^-$)-based compound, without being limited thereto. The acetate-based compound may include at least one of sodium acetate, potassium acetate, and ammonium acetate.

Next, in the method of preparing the arsenic adsorbent according to an embodiment of the present disclosure, step S220 of heating the mixed solution to grow organic-inorganic composite iron hydroxide nanoparticles is performed.

Step S220 of heating the mixed solution to grow organic-inorganic composite iron hydroxide nanoparticles may include first heat treatment step S221 of heating for 15 minutes to increase the temperature of the mixed solution to 200° C. and second heat treatment step S222 of maintaining the temperature of the mixed solution at 200° C. for 8 hours.

The first heat treatment step S221 is a process of reaching the temperature of the second heat treatment step S222. In the first heat treatment step S221, the temperature of the mixed solution may be increased to 200° C. for 15 minutes.

The second heat treatment step S222 is a process of forming iron hydroxide FeOOH from ferrihydrite. In the second heat treatment step S222, crystals may be grown by heating the mixed solution at 200° C. for 8 hours.

In general, in the process of synthesizing iron hydroxide nanoparticles, the reaction is initiated by heat treatment, and metastable iron hydroxide phases such as green rust and ferrihydrite may be formed to form thermodynamically stable iron oxides such as hematite and magnetite by an iron ion precursor.

However, according to the method of preparing the arsenic adsorbent according to an embodiment of the present disclosure, the iron ion precursor may react with acetate (organic anions) supplied from ethylene glycol as the reducing agent and hydroxyl ions supplied from the solvent (water) to form ferrihydrite.

Thereafter, ferrihydrite and magnetite are formed through dehydration and reduction reactions by ethylene glycol. At this time, the organic-inorganic composite iron hydroxide nanoparticles having a layered ferric rust crystal structure as an intermediate phase material may be prepared by adjusting the content of the solvent.

For example, after the iron ion precursor reacts with hydroxyl groups (OH—) present in acetate and water to form ferrihydrite, iron hydroxide (FeOOH) is changed to magnetite through dehydration and reduction processes. At this time, when an excess of water is added, the dehydration and reduction processes that convert iron hydroxide (FeOOH) into magnetite are hindered, so that iron hydroxide remains as it is without being converted to magnetite. For example, even when hydroxyl groups are lost as water in the dehydration process, hydroxyl groups may be supplemented by adding a sufficient amount of water.

That is, in the method of preparing the arsenic adsorbent according to an embodiment of the present disclosure, an excess of water added during hydroxide synthesis plays a decisive role in formation of acetate and a novel crystal structure by participating in a dehydration process during a chemical reaction that converts metastable ferrihydrite into stable magnetite. Accordingly, the arsenic adsorbent according to an embodiment of the present disclosure may have a novel crystal structure different from the known ferric hydroxide layered structure of lepidocrocite and green rust.

Accordingly, according to the method of preparing the arsenic adsorbent according to an embodiment of the present disclosure, the ratio of hydroxyl group/iron ($OH^-/Fe$) may be controlled by the content of the solvent included in the mixed solution.

For example, the ratio of hydroxyl group/iron ($OH^-/Fe$) is an important factor in the process of converting iron hydroxide into magnetite. As the content of the solvent increases, the ratio of hydroxyl group/iron ($OH^-/Fe$) increases, hindering the dehydration and reduction reactions required to convert iron hydroxide (ferric oxyhydroxide) into magnetite. Accordingly, the organic-inorganic composite iron hydroxide nanoparticles ($OH^-/Fe=1$) may be more stable than magnetite ($OH^-/Fe=0$).

The content of the solvent may be 150 mmol to 400 mmol. When the content of the solvent is out of the above range, the organic-inorganic composite iron hydroxide nanoparticles (For example; Layered ferric rust) are not generated.

In addition, the amount of the organic-inorganic composite iron hydroxide nanoparticles produced may be controlled by the content of the solvent.

The second heat treatment step S222 may include step S222-1 of forming ferrihydrite nanocrystals in the mixed solution, step S222-2 of forming nanoplatelets on the surface of the ferrihydrite nanocrystals, and step S222-3 of attaching two or more nanoplatelet layers at different angles to grow a layered ferric rust crystal structure.

For example, when the time of the second heat treatment step S222 reaches 30 minutes, ferrihydrite crystals having low crystallinity, which are intermediates before conversion into magnetite, may be generated (S222-1).

When the time of the second heat treatment step S222 reaches 1 hour, 7 nm nanoplatelets begin to form on the surface of ferrihydrite, and organic-inorganic composite iron hydroxide nanoparticles are formed as the nanoplatelets grow through orientation and attachment processes with other adjacent nanoplatelets (S222-2).

When the time of the second heat treatment step S222 reaches 3 to 5 hours, all of the ferrihydrite present in the mixed solution is converted into nanoplatelets, and the nanoplatelets grow in the a-axis and c-axis directions while being attached to adjacent nanoplatelets and are stacked in the b-axis direction to grow organic-inorganic composite iron hydroxide nanoparticles (S222-3).

When the time of the second heat treatment step S122 reaches 8 hours, the size of organic-inorganic composite iron hydroxide nanoparticles may be stabilized. At this time, the nanoplatelet attachment method may be largely divided into three types: axial, lateral, and axial+lateral.

Accordingly, according to the method of preparing the arsenic adsorbent according to an embodiment of the present disclosure, even when the mixing ratio of the synthesis solution is the same, the synthesis may be controlled according to the second heat treatment time.

According to an embodiment, step S210 of mixing an iron ion precursor, a reducing agent, an organic ligand precursor, and a solvent to prepare a mixed solution may further include a step of adjusting the pH of the mixed solution.

Referring to FIG. 36, after synthesizing ferrihydrite at pH 7 using the iron ion precursor (preferably iron chloride hexahydrate ($FeCl_3 \cdot 6H_2O$)), goethite is formed through a typical crystallization method without a reducing agent and organic ligands. Even when goethite is formed, when the goethite is mixed with the reducing agent and the organic ligand precursor, pH was adjusted to 1.5 or less, and then first heat treatment and second heat treatment are performed, organic-inorganic composite iron hydroxide nanoparticles may be grown.

In addition, organic-inorganic composite iron hydroxide nanoparticles may be grown from ferrihydrite synthesized at pH 7 through particle-attached growth through heat treatment using the reducing agent and the organic ligands in the range of pH 1 to 2.

That is, according to the method of preparing the arsenic adsorbent according to an embodiment of the present disclosure, even when goethite is used as the iron ion precursor, organic-inorganic composite iron hydroxide nanoparticles may be prepared when heat treatment is performed after adjusting the pH of the mixed solution.

For example, when iron chloride hexahydrate ($FeCl_3 \cdot 6H_2O$) is used as the iron ion precursor, organic-inorganic composite iron hydroxide nanoparticles may be prepared by a particle-attached growth method when pH is adjusted to 2 or less. Even when goethite is formed through a typical crystallization method at pH 7, when the goethite is mixed with the reducing agent and the organic ligand precursor and pH is adjusted to 1.5 or less, organic-inorganic composite iron hydroxide nanoparticles may be prepared by a particle-attached growth method through heat treatment.

Accordingly, the pH of the mixed solution may be 1 to 2.

Then, in the method of preparing the arsenic adsorbent according to an embodiment of the present disclosure, step S130 of cooling the heated mixed solution is performed.

According to the method of preparing the arsenic adsorbent according to an embodiment of the present disclosure, by cooling the mixed solution, the process of generating the layered structure may be terminated.

Finally, in the method of preparing the arsenic adsorbent according to an embodiment of the present disclosure, step S140 of washing the cooled mixed solution to obtain organic-inorganic composite iron hydroxide nanoparticles is performed.

Accordingly, according to the method of preparing the arsenic adsorbent according to an embodiment of the present disclosure, by synthesizing organic-inorganic composite iron hydroxide nanoparticles using iron hydroxide, which is a mineral abundant in the earth, by reconstituting ferrihydrite and hydroxide polymorph (goethite) that exist in nature, natural-friendly and economical nanomaterials capable of arsenic immobilization may be prepared.

Comparative Example 1: Gt 180 mL of 5 M (molar concentration) KOH was mixed with 100 mL of 1 M $Fe(NO_3)_3$ as an iron ion precursor, and then the mixture was placed in an oven set to 70° C. for 60 hours to perform synthesis.

Oxyhydroxide (ferrihydrite): Oxyhydroxide was synthesized by adding 0.1 M $Fe(NO_3)_3$ to 330 mL of 1 M KOH until pH satisfies the range of 7 to 8.

Comparative Example 2: Control

The control is a soil sample containing no goethite (Gt) and organic-inorganic composite iron hydroxide nanoparticles.

Example 2: r-FAN

Organic-inorganic composite iron hydroxide nanoparticles were prepared by chemically reacting $FeCl_3 \cdot 6H_2O$, ethylene glycol, and acetate as a surface ligand under an acidic condition (pH<2) through Pathway 1 of FIG. 4.

First, for chemical synthesis, $FeCl_3 \cdot 6H_2O$ was reacted with acetate in a mixture of water and ethylene glycol at 200° C. for 8 hours.

FIG. 38 includes scanning electron microscope (SEM) and transmission electron microscope (TEM) images showing the layer structure of an arsenic adsorbent according to Example 2 of the present disclosure.

Referring to FIG. 38, the organic-inorganic composite iron hydroxide nanoparticles included in the arsenic adsorbent according to Example 2 of the present disclosure may have a length of 22.4±2.59 nm, a thickness of 16.3±3.35 nm, and an interlayer spacing of 1.14 nm.

FIG. 39 includes an image showing the selected-area electron diffraction (SAED) pattern of an arsenic adsorbent according to Example 2 of the present disclosure and a graph showing powder X-ray diffraction (XRPD) results.

Referring to FIG. 39, it can be confirmed that the organic-inorganic composite iron hydroxide nanoparticles included in the arsenic adsorbent according to Example 2 of the present disclosure have a different structure from other hydroxide polymorphs in nature.

FIG. 40 is a schematic diagram showing an arsenic (As) adsorption mechanism, FIG. 41 is a graph showing inductively coupled plasma mass spectroscopy (ICP-MS) results showing the adsorption capacity of an arsenic adsorbent according to Comparative Example 1 and an arsenic adsorbent according to Example 2 of the present disclosure, and FIG. 42 is a graph showing electrokinetic potential before and after arsenic adsorption.

Referring to FIGS. 40 to 42, it can be confirmed that, when comparing the adsorption capacity of the arsenic adsorbent according to Comparative Example 1, which is goethite (Gt) used as a conventional arsenic adsorbent, and the adsorption capacity of the arsenic adsorbent according to Example 2 of the present disclosure by inductively coupled plasma mass spectroscopy (ICP-MS), the arsenic adsorbent according to Example 2 of the present disclosure adsorbs 6.7 times more arsenic than the arsenic adsorbent according to Comparative Example 1.

When surface potential (zeta potential) was measured before and after arsenic adsorption, the potential of the arsenic adsorbent according to Comparative Example 1 decreased from 39.3 mV to −14.2 mV. On the other hand, the potential of the arsenic adsorbent according to Example 2 of the present disclosure decreased from 12.1 mV to −32.1 mV.

However, when comparing with the results of inductively coupled plasma mass spectroscopy (ICP-MS), although the arsenic adsorbent according to Example 2 of the present disclosure adsorbs 6.7 times more arsenic than the arsenic adsorbent according to Comparative Example 1, the arsenic adsorbent according to Example 2 has a higher potential than that of the arsenic adsorbent according to Comparative Example 1. This data indicates that the surface coordination and adsorption mechanism of the arsenic adsorbent according to Comparative Example 1 are different from those of the arsenic adsorbent according to Example 2 of the present disclosure.

Specifically, the arsenic adsorbent according to Comparative Example 1 adsorbs arsenic through a primary mechanism in which arsenic is chemically bonded only to the outer surface. On the other hand, in addition to the primary mechanism, the arsenic adsorbent according to Example 2 of the present disclosure adsorbs arsenic through a secondary mechanism in which arsenic is chemically bonded to the surface in a wide interlayer spacing and arsenic is physically inserted into an interlayer space.

FIG. 43 is a graph showing the X-ray photoelectron spectroscopy (XPS) results of an arsenic adsorbent according to Comparative Example 1 before arsenic adsorption, FIG. 44 is a graph showing the X-ray photoelectron spectroscopy results of an arsenic adsorbent according to Comparative Example 1 after arsenic adsorption, FIG. 45 is a graph showing the X-ray photoelectron spectroscopy results of an arsenic adsorbent according to Example 2 of the present disclosure before arsenic adsorption, FIG. 46 is a graph showing the X-ray photoelectron spectroscopy results of an arsenic adsorbent according to Example 2 of the present disclosure after arsenic adsorption, FIG. 47 is a graph showing the Fourier-transform infrared spectroscopy (FT-IR) results of an arsenic adsorbent according to Example 2 of the present disclosure before and after arsenic adsorption, and FIG. 48 is a graph showing the Fourier-transform infrared spectroscopy results of an arsenic adsorbent according to Comparative Example 1 before and after arsenic adsorption.

Referring to FIGS. 43 to 48, in the case of the arsenic adsorbent according to Example 2 of the present disclosure, after arsenic is adsorbed, the highest intensity is detected at the As—O bond peak, indicating that the As—O bond peak is a main bond. On the other hand, in the case of the arsenic adsorbent according to Comparative Example 1, after arsenic is adsorbed, the Fe—OH bond is maintained as a main bond.

The fact that the Fe—OH peak is maintained in the arsenic adsorbent according to Comparative Example 1 means that only arsenic chemically bonded to the surface of the arsenic adsorbent according to Comparative Example 1 exists. On the other hand, in the case of the arsenic adsorbent according to Example 2 of the present disclosure, adsorption of arsenic is achieved through intercalation of $AsO_4$ and generation of Fe—As—O bonds.

Moreover, in the arsenic adsorbent according to Example 2 of the present disclosure, intercalation of $AsO_4$ and chemical bonding of Fe—As—O may be confirmed by FT-IR analysis.

Specifically, in the case of the arsenic adsorbent according to Example 2 of the present disclosure, since the bond strength of As—O is relatively higher than that of Fe—As—O, arsenic is mainly intercalated between layers of organic-inorganic composite iron hydroxide nanoparticles included in the arsenic adsorbent according to Example 2 of the present disclosure in the form of $AsO_4$.

FIG. 49 is a graph showing the bioassay results of *A. kimi* in the absence of arsenic in artificial soil, and FIG. 50 is a graph showing the bioassay results of *B. juncea* in artificial soil that is not treated with arsenic.

Referring to FIGS. 49 and 50, it was investigated whether treatment of the arsenic adsorbent according to Comparative Example 1 or the arsenic adsorbent according to Example 2 of the present disclosure had a significant effect on As bioavailability. For breeding and phytotoxicity analysis in arsenic-contaminated artificial soil to investigate the suitability of bioindicator species in the soil ecosystem, and to investigate the effect of treatment of the arsenic adsorbent according to Comparative Example 1 or the arsenic adsorbent according to Example 2 of the present disclosure on test populations of *Allonychiurus kimi* and *Brassica juncea* in uncontaminated soil, a control experiment was performed in artificial soil without prior arsenic contamination.

Referring to FIGS. 49 and 50, it can be seen that there is no significant difference between the control groups.

FIG. 51 is a graph showing the bioassay results of *A. kimi* in artificial soil treated with arsenic (Circles represent adults, and bars represent larvae), FIG. 52 is a graph showing arsenic contents in artificial soil treated with arsenic, FIG. 53 includes images of *A. kimi* in artificial soil treated with arsenic, FIG. 54 is a graph showing *B. juncea* in artificial soil, FIG. 55 is a graph showing the contents of arsenic in *B. juncea* in artificial soil, and FIG. 56 includes images of *B. juncea* in artificial soil.

Referring to FIG. 51, in a springtail breeding test using arsenic-contaminated artificial soil, the number (9.2±0.8) of live adult specimens according to treatment of the arsenic adsorbent according to Comparative Example 1 or the arsenic adsorbent according to Example 2 of the present disclosure was higher than the number (5.6±0.9) of live adult specimens according to treatment of the control sample according to Comparative Example 2.

In treatment of the control sample according to Comparative Example 2, *A. kimi* adults showed a small number (1.4±2.2) of larvae, whereas treatment of the arsenic adsorbent according to Comparative Example 1 showed a slight increase (27.8±13.4). However, this increase was not statistically significant.

On the other hand, in the case of treatment of the arsenic adsorbent according to Example 2 of the present disclosure, the number (113.6±39.7) of born larvae was significantly increased.

Referring to FIG. 52, after 28 days exposure of *A. kimi* specimens, the concentration of arsenic in the body was 22.3±10.1 mg/kg, 37.2±21.2 mg/kg, and 5.1±2.9 mg/kg for treatment of the arsenic adsorbent according to Comparative Example 1, the control sample according to Comparative Example 2, and the arsenic adsorbent according to Example 2 of the present disclosure, respectively.

Referring to FIG. 53, the concentration of arsenic in the body of *A. kimi* was significantly low in the arsenic adsorbent according to Example 2 of the present disclosure. In addition, in the case of Example 2 of the present disclosure, *A. kimi* adults produced noticeably more offspring than Comparative Example 1 and Comparative Example 2 (white dots).

Referring to FIG. 54, in a phytotoxicity test using arsenic-contaminated artificial soil, the average weights of roots and shoots varied in the range of 0.008±0.002 to 0.13±0.02 and 0.1±0.01 to 0.36±0.02, respectively. The weight was significantly increased when treated with the arsenic adsorbent according to Example 2 of the present disclosure.

Referring to FIG. 55, the accumulated arsenic concentrations of *B. juncea* were 5.29±1.10, 5.13±1.39, and 0.34±0.04 mg/kg for treatment of the arsenic adsorbent according to Comparative Example 1, the control sample according to Comparative Example 2, and the arsenic adsorbent according to Example 2 of the present disclosure, respectively.

Referring to FIG. 56, compared to the other treatments, the accumulated arsenic concentration of *B. juncea* was significantly low and the specimens grew noticeably fast when treated with the arsenic adsorbent according to Example 2 of the present disclosure.

Accordingly, according to the bioanalysis results in arsenic-contaminated artificial soil, it can be seen that the arsenic adsorbent according to Example 2 of the present disclosure reduces the arsenic bioavailability of *A. kimi* and *B. juncea* in the arsenic-contaminated soil, thereby increasing the fitness thereof.

FIGS. 57 to 62 are graphs and images showing biological test results for treatment of an arsenic adsorbent (Gt) according to Comparative Example 1, an arsenic adsorbent (Control) according to Comparative Example 2, and an arsenic adsorbent (r-FAN) according to Example 2 of the present disclosure as modifiers for As-contaminated mine soil in Collembolan breeding (*A. kimi*) and phytotoxicity (*B. juncea*) tests.

In FIGS. 57 to 62, since the artificial soil results included old mine sites and were not representative of all arsenic-contaminated soils, biotests using *A. kimi* and *B. juncea* were conducted on arsenic-contaminated mine soil.

FIG. 57 is a graph showing the number of surviving *A. kimi* adults (circles) and larvae (bars) after exposure to As-contaminated mine soil for 28 days.

Referring to FIG. 57, in the springtail breeding test, the number of surviving adults in soil treated with the arsenic adsorbent according to Comparative Example 1, the control sample according to Comparative Example 2, and the arsenic adsorbent according to Example 2 of the present disclosure was 8.0±0.0, 6.8±1.3, and 8.75±1.0, respectively. The number of offspring was 50.8±24.5, 56.5±8.9, and 97.0±21.1, respectively.

FIG. 58 is a graph showing the average As concentration (mg/kg) of surviving adults after arsenic exposure.

Referring to FIG. 58, soil treated with the arsenic adsorbent according to Example 2 of the present disclosure had the highest number of surviving adults and the highest number of offspring. In addition, after 28 days of exposure, the arsenic body concentrations of *A. kimi* were 70.1±25.1, 62.5±9.5, and 41.0±14.5 mg/kg under treatment of the arsenic adsorbent according to Comparative Example 1, the control sample according to Comparative Example 2, and the arsenic adsorbent according to Example 2 of the present disclosure, respectively.

FIG. 59 includes images of larval specimens produced after arsenic exposure.

Referring to FIG. 59, there was no statistically significant difference, but the lowest arsenic concentration was found in the body of *A. kimi* adults in soil treated with the arsenic adsorbent according to Example 2 of the present disclosure. In addition, *A. kimi* adults treated with the arsenic adsorbent according to Example 2 of the present disclosure produced significantly more offspring.

FIG. 60 is a graph showing the weight (g) of roots and shoots of *B. juncea* after arsenic exposure.

Referring to FIG. 60, in the phytotoxicity test, the average root weights of groups treated with the arsenic adsorbent according to Comparative Example 1, the control sample according to Comparative Example 2, and the arsenic adsorbent according to Example 2 of the present disclosure were 0.08±0.01, 0.06±0.01, and 0.10±0.01 g, respectively. The group treated with the arsenic adsorbent according to Example 2 of the present disclosure showed significantly higher root weight.

In addition, the group treated with the arsenic adsorbent according to Comparative Example 1 exhibited an average sprout weight of 0.39±0.04, and the control group of Comparative Example 2 exhibited an average sprout weight of 0.49±0.03. The group treated with the arsenic adsorbent according to Comparative Example 1 exhibited the lowest average sprout weight.

However, there was no significant difference between the group treated with the control sample of Comparative Example 2 and the group treated with the arsenic adsorbent according to Example 2 of the present disclosure.

FIG. 61 is a graph showing the average As concentration (mg/kg) of *B. juncea* after arsenic exposure.

Referring to FIG. 61, in treatment of the arsenic adsorbent according to Comparative Example 1, the control sample of Comparative Example 2, and the arsenic adsorbent according to Example 2 of the present disclosure, the accumulated arsenic concentrations of *B. juncea* were 6.6±0.5, 8.7±1.1, and 6.3±0.3 mg/kg, respectively.

FIG. 62 includes images showing *B. juncea* growth after arsenic exposure.

Referring to FIG. 62, the accumulated arsenic concentration of *B. juncea* was significantly low in the groups treated with the arsenic adsorbent according to Comparative Example 1 and the arsenic adsorbent according to Example 2 of the present disclosure compared to the group treated with the control sample of Comparative Example 2. Despite significant differences in root weight and accumulated arsenic concentration in *B. juncea* after arsenic exposure, there was no appreciable change in shoot appearance between the treatment groups.

Accordingly, referring to FIGS. 57 to 62, it can be seen that the arsenic adsorbent according to Example 2 of the present disclosure significantly reduces arsenic bioavailability in old mine soil having a high arsenic concentration.

FIG. 63 includes images showing the morphological characteristics of an arsenic adsorbent according to Example 2 of the present disclosure in artificial soil (a) and arsenic-contaminated soil (b).

Referring to FIG. 63, the shape and phase of the arsenic adsorbent according to Example 2 of the present disclosure lasted for 28 days. However, treatment with the arsenic adsorbent according to Comparative Example 1 and the arsenic adsorbent according to Example 2 of the present disclosure did not change soil pH and EC significantly enough to affect soil microbes or plant.

Table 4 shows the pH and EC of arsenic-contaminated mine soil and artificial soil 28 days after adding the arsenic adsorbent according to Comparative Example 1 and the arsenic adsorbent according to Example 2 of the present disclosure.

TABLE 4

| | pH | | | EC | | |
|---|---|---|---|---|---|---|
| | Comparative Example 2 | Comparative Example 1 | Example 2 | Comparative Example 2 | Comparative Example1 | Example 2 |
| Artificial Soil | 7.5 ± 0.02 | 7.2 ± 0.02 | 7.3 ± 0.04 | 119 ± 1.5 | 105.0 ± 2.0 | 67.7 ± 2.3 |
| Gilgok Mine Soil | 6.3 ± 0.02 | 6.6 ± 0.02 | 6.9 ± 0.04 | 91.7 ± 3.1 | 86.7 ± 1.2 | 54.0 ± 4.6 |

Referring to Table 4, soil treated with the arsenic adsorbent according to Example 2 of the present disclosure exhibited the lowest pH and EC because the ionic strength of pore water was reduced by adsorption and intercalation of a significant amount of bioavailable arsenic in a soil improver.

FIG. 64 includes graphs showing Olsen extraction results in arsenic-contaminated artificial soil (a) and arsenic-contaminated mine soil (b) according to treatment of an arsenic adsorbent (Gt) according to Comparative Example 1, an arsenic adsorbent (Control) according to Comparative Example 2, and an arsenic adsorbent (r-FAN) according to Example 2 of the present disclosure.

In FIG. 64, Olsen extractable arsenic was measured after 28 days of exposure to observe the immobilization effect of the arsenic adsorbent according to Example 2 of the present disclosure on bioavailable arsenic.

Referring to FIG. 64, in both arsenic-contaminated artificial and mine soils, the arsenic adsorbent according to Example 2 of the present disclosure showed three times greater arsenic-immobilization than the arsenic adsorbent according to Comparative Example 1.

Wenzel's sequential extraction process (SEP) was used to evaluate arsenic fractions (F1-F5) in which the arsenic adsorbent according to Comparative Example 1 and the arsenic adsorbent according to Example 2 of the present disclosure were in equilibrium with the other constituents of soil, and the results are shown in Table 5.

TABLE 5

| | pH | | | EC | | |
|---|---|---|---|---|---|---|
| | Comparative Example 2 | Comparative Example1 | Example 2 | Comparative Example 2 | Comparative Example1 | Example 2 |
| Artificial Soil | 7.5 ± 0.02 | 7.2 ± 0.02 | 7.3 ± 0.04 | 119 ± 1.5 | 105.0 ± 2.0 | 67.7 ± 2.3 |
| Gilgok Mine Soil | 6.3 ± 0.02 | 6.6 ± 0.02 | 6.9 ± 0.04 | 91.7 ± 3.1 | 86.7 ± 1.2 | 54.0 ± 4.6 |

In arsenic-contaminated artificial soil, the ratio of fraction 1 (F1; non-specific absorption) was greatly reduced in both the arsenic adsorbent according to Comparative Example 1 and the arsenic adsorbent according to Example 2 of the present disclosure.

Treatment with the arsenic adsorbent according to Example 2 of the present disclosure drastically reduced F1 from 63.4±4.4 to 2.4±0.6%. At the same time, the fraction of F1 reduced by the arsenic adsorbent according to Comparative Example 1 and the arsenic adsorbent according to Example 2 of the present disclosure shifted the equilibrium state of the As fraction towards stronger chemisorption, increasing F2 (especially chemisorbed As).

In addition, in soil treated with the arsenic adsorbent according to Example 2 of the present disclosure, the F3 ratio (low crystalline functional metal oxide) increased to a level similar to that of F2. This indicated two states of arsenic species bound to the arsenic adsorbent according to Example 2 of the present disclosure with different binding strengths.

The arsenic adsorbent according to Example 2 of the present disclosure converted F1 to F3 species by incorporating arsenic into the crystal structure through an intercalation mechanism in addition to surface adsorption.

In this case, arsenic was fixed more strongly than the arsenic adsorbent according to Comparative Example 1, which depends only on surface chemisorption.

Contrary to the behavior observed in artificial soil, the As fraction distribution in mine soil included a small proportion of bioavailable F1-F2 and a high proportion of crystallized As in the form of F3-F5.

It was unclear whether the treatment of the arsenic adsorbent according to Comparative Example 1 and the arsenic adsorbent according to Example 2 of the present disclosure had a significant effect on the proportion of F2-F5 in mine soil samples. The arsenic adsorbent according to Example 2 of the present disclosure reduced the proportion of F1 by 33%, but the arsenic adsorbent according to Comparative Example 1 did not induce a change in F1.

Overall, the arsenic adsorbent according to Example 2 of the present disclosure effectively reduced F1, which is the most toxic bioavailable form to plants and animals, by retaining arsenic in stationary forms corresponding to F2 and F3. Accordingly, the arsenic adsorbent according to Example 2 of the present disclosure showed a mechanism to restore ecological health in both soil types.

FIG. 65 is a graph showing average percentage ratios for different forms of arsenic in artificial soil, and FIG. 66 is a graph showing average percentage ratios for different forms of arsenic in mine soil.

F1 is a form of non-specifically bound arsenic, F2 is a form of specifically chemically bound arsenic, and F3 is a form of amorphous arsenic hydroxide.

Table 6 shows the results of FIGS. 65 and 66.

can be seen that, compared to the arsenic adsorbent according to Comparative Example 1 (Gt), the arsenic adsorbent according to Example 2 of the present disclosure (r-FAN) removes 33% more arsenic.

According to an embodiment of the present disclosure, layered ferric rust having a novel crystal structure in which organic anions are intercalated between nanoplatelet layers to have a relatively wide interlayer spacing compared to a nanoparticle size, and iron hydroxide nanoparticles including the layered ferric rust can be provided.

According to an embodiment of the present disclosure, layered ferric rust in which organic anions induce distortion in the arrangement of $FeO_6$ octahedrons included in nanoplatelets and form a stacked structure of the nanoplatelets, and iron hydroxide nanoparticles including the layered ferric rust can be provided.

According to an embodiment of the present disclosure, iron hydroxide nanoparticles having a layered ferric rust crystal structure that forms a stacked structure of nanoplatelets by a mechanism in which solvent molecules participate in a dehydration process during a chemical reaction of converting metastable ferrihydrite into stable magnetite by adjusting the amounts of organic anions and a solvent when preparing iron hydroxide nanoparticles, and a method of preparing the iron hydroxide nanoparticles can be provided.

According to an embodiment of the present disclosure, an arsenic adsorbent including natural-friendly and economical

TABLE 6

| Soil type | Treatment | F1 | F2 | F3 | F4 | F5 | Sum of As fraction 1-5 |
|---|---|---|---|---|---|---|---|
| As-spiked artificial soil | Comparative Example 2 | 63.4 ± 4.4a (29.9 ± 3.5) | 18.5 ± 0.7c (8.7 ± 0.8) | 4.6 ± 1.0b (2.2 ± 0.6) | 5.6 ± 0.6b (2.6 ± 0.2) | 7.9 ± 3.7a (3.7 ± 1.5) | 47.1 ± 3.3 |
| | Comparative Example 1 | 37.4 ± 3.7b (18.5 ± 0.7) | 27.5 ± 0.5b (13.7 ± 1.3) | 9.6 ± 1.4b (4.8 ± 1.1) | 16.6 ± 1.0a (8.3 ± 1.2) | 9.0 ± 1.2a (4.5 ± 1.0) | 49.8 ± 4.6 |
| | Example 2 | 2.4 ± 0.6c (1.6 ± 0.4) | 37.1 ± 1.0a (23.7 ± 3.3) | 37.6 ± 2.7a (23.8 ± 0.9) | 16.1 ± 2.2a (10.4 ± 2.6) | 6.7 ± 1.0a (4.3 ± 0.6) | 63.8 ± 7.1 |
| As-contaminated mine soil | Comparative Example 2 | 0.31 ± 0.04a (11.8 ± 1.2) | 9.3 ± 0.6b (352.7 ± 17.6) | 46.0 ± 2.8a (1744.8 ± 191.2) | 24.3 ± 1.5a (920.6 ± 31.4) | 20.0 ± 3.7a (760.5 ± 1701) | 3790.6 ± 286.8 |
| | Comparative Example 1 | 0.35 ± 0.02a (13.1 ± 0.5) | 10.6 ± 0.07b (394.8 ± 8.7) | 41.9 ± 0.7a (1561.4 ± 48.2) | 27.4 ± 0.7a (1019.1 ± 15.4) | 19.7 ± 0.4a (733.9 ± 15.6) | 3722.4 ± 54.4 |
| | Example 2 | 0.21 ± 0.03b (7.7 ± 1.2) | 12.2 ± 0.9a (455.1 ± 3.8) | 39.7 ± 3.0b (1483.8 ± 42.8) | 25.2 ± 1.6a (945.4 ± 90.6) | 22.7 ± 3.7a (858.3 ± 205.7) | 3750.4 ± 284.4 |

Referring to FIGS. 65 and 66 and Table 6, in the case of artificial soil, there is a lot of movable (bioavailable) arsenic, so the amount of F1 removed by the arsenic adsorbent according to Example 2 of the present disclosure (r-FAN) and the arsenic adsorbent according to Comparative Example 1 (Gt) is high, and accordingly, the amount of arsenic adsorption in the form of F2 is also high.

Moreover, in the case of the arsenic adsorbent according to Example 2 of the present disclosure (r-FAN), unlike the arsenic adsorbent according to Comparative Example 1 (Gt), the adsorption amount of arsenic in the form of F3 is significantly high, indicating that the arsenic adsorbent according to Example 2 includes an arsenic adsorption mechanism by interlayer intercalation, which is different from the mechanism of the arsenic adsorbent according to Comparative Example 1 (Gt).

In addition, an F1 value was low in mine soil because there was little movable (bioavailable) arsenic. However, it organic-inorganic composite iron hydroxide nanoparticles capable of immobilizing arsenic using iron hydroxide, which is a mineral abundant in the earth, and a method of preparing the arsenic adsorbent can be provided.

According to an embodiment of the present disclosure, an arsenic adsorbent capable of immobilizing arsenic through a primary adsorption mechanism that adsorbs arsenic by chemical adsorption through the surfaces of nanoplatelets and a secondary adsorption mechanism that intercalates/immobilizes arsenic by electrostatic intercalation through interlayer spacing formed by organic ligands intercalated between layers of nanoplatelets, and a method of preparing the arsenic adsorbent can be provided.

According to an embodiment of the present disclosure, an arsenic adsorbent capable of preparing organic-inorganic composite iron hydroxide nanoparticles including organic ligands intercalated between layers of nanoplatelets through colloidal assembly of nano-scale building blocks through a particle-directed attachment process, and a method of preparing the arsenic adsorbent can be provided.

Although the present disclosure has been described through limited examples and figures, the present disclosure is not intended to be limited to the examples. Those skilled in the art will appreciate that various modifications, additions, and substitutions are possible, without departing from the scope and spirit of the invention. Therefore, the scope of the present disclosure should not be limited by the embodiments, but should be determined by the following claims and equivalents to the following claims.

DESCRIPTION OF SYMBOLS

| | |
|---|---|
| 110: NANOPLATELETS | 111: $FEO_6$ OCTAHEDRAL STRUCTURES |
| 120: INTERLAYER SPACING | 121: ORGANIC ANIONS |
| 210: ORGANIC-INORGANIC COMPOSITE IRON HYDROXIDE NANOPARTICLES | |
| 211: NANOPLATELETS | |
| 211-1: FIRST NANOPLATELETS | 211-2: SECOND NANOPLATELETS |
| 212-1: FIRST ORGANIC LIGANDS | 212-2: SECOND ORGANIC LIGANDS |
| 221: FIRST ARSENIC | 222: SECOND ARSENIC |

What is claimed is:

1. Layered ferric rust having a novel crystal structure that satisfies conditions (a) to (c) below:

(a) a crystal system belongs to a monoclinic system;

(b) a space group belongs to Pn (No. 7); and (c) unit cell parameters are a=3.854±0.002 Å, b=11.491±0.007 Å, c=9.818±0.004 Å, and β=88.47±0.005° (b is a distance between layers in a axial direction).

2. The layered ferric rust according to claim 1, wherein atomic coordinates and equivalent isotropic displacement parameters in a lattice of the layered ferric rust satisfy Table 1 below:

TABLE 1

| Element | x | y | z | $B_{eq}$ | Occ. |
|---|---|---|---|---|---|
| Fe(1) | 0.4096(19) | 0.4207(15) | 0.293(7) | 1 | 1 |
| Fe(2) | 0.409(2) | 0.4391(16) | 0.606(7) | 1 | 1 |
| C(1) | 0.318(2) | 0.669(5) | 0.455(5) | 2 | 1 |
| C(2) | 0.220(3) | 0.789(5) | 0.411(7) | 2 | 1 |
| O(1) | 0.507(3) | 0.239(8) | 0.252(10) | 2 | 1 |
| O(2) | 0.2716(16) | 0.638(4) | 0.577(5) | 2 | 1 |
| O(3) | 0.899(5) | 0.451(7) | 0.298(17) | 2 | 0.75 |
| O(4) | 0.426(4) | 0.521(6) | 0.104(17) | 2 | 0.75 |
| O(5) | 0.424(3) | 0.593(7) | 0.371(5) | 2 | 1 |
| O(6) | 0.258(2) | 0.257(8) | 0.637(10) | 2 | 1 |
| O(7) | 0.563(3) | 0.044(5) | 0.322(5) | 2 | 1 |
| O(8) | 0.584(2) | 0.320(9) | 0.454(14) | 2 | 0.5 |
| H(1) | 0.343(4) | 0.846(5) | 0.461(8) | 2 | 1 |
| H(2) | 0.267(4) | 0.799(7) | 0.317(7) | 2 | 1 |
| H(3) | 0.56(3) | 0.05(6) | 0.227(8) | 2 | 1 |
| H(4) | 0.63(3) | -0.04(2) | 0.32(6) | 2 | 1 |
| H(5) | -0.026(3) | 0.801(7) | 0.428(8) | 2 | 1 |
| H(6) | 0.42905 | 0.17156 | 0.64026 | 2 | 1 |
| H(7) | 0.50683 | 0.18654 | 0.19587 | 2 | 1 |

3. The layered ferric rust according to claim 1, wherein the layered ferric rust is represented by Chemical Formula 1 below:

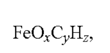

$FeO_xC_yH_z$, [Chemical Formula 1]

wherein x is a prime number between 3 and 3.5 (3≤x≤3.5), y is a prime number between 0.67 to 1 (0.67≤y≤1), and z is a prime number between 1.94 to 3.5 (1.94≤z≤3.5).

4. The layered ferric rust according to claim 1, wherein the layered ferric rust comprises two or more nanoplatelet layers comprising one or more $FeO_6$ octahedral structures; and organic anions intercalated between the two or more nanoplatelet layers, wherein, in the two or more nanoplatelet layers, an interlayer spacing is created by the organic anions.

5. The layered ferric rust according to claim 1, wherein the nanoplatelets and the organic anions are bonded to each other by bidentate bridging.

6. The layered ferric rust according to claim 2, wherein the nanoplatelets comprise corner-sharing and edge-sharing of the adjacent $FeO_6$ octahedral structures in a zigzag pattern by the organic anions.

7. The layered ferric rust according to claim 1, wherein the interlayer spacing of the two or more nanoplatelet layers is 1.14 nm to 1.19 nm.

8. The layered ferric rust according to claim 1, wherein the number of the two or more nanoplatelet layers is 2 to 16.

9. The layered ferric rust according to claim 1, wherein the nanoplatelets comprise iron (III) oxide-hydroxide (FeOOH).

10. The layered ferric rust according to claim 1, wherein the organic anions comprise an acetate ($CH_3COO^-$)-based compound.

11. Iron hydroxide nanoparticles, comprising the layered ferric rust according to claim 1.

12. The iron hydroxide nanoparticles according to claim 11, wherein the iron hydroxide nanoparticles are comprised in at least one of a pollutant adsorbent, a battery catalyst, an oxygen evolution reaction (OER) catalyst, a thermal therapy material, bioplastics, a construction material, a pigment, and a dye.

* * * * *